(12) United States Patent
Kano et al.

(10) Patent No.: US 8,256,289 B2
(45) Date of Patent: Sep. 4, 2012

(54) ANGULAR RATE SENSOR

(75) Inventors: Kazuhiko Kano, Toyoake (JP); Akihiko Teshigahara, Nisshin (JP); Kazuki Arakawa, Kariya (JP); Kazushi Asami, Okazaki (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 12/923,971

(22) Filed: Oct. 19, 2010

(65) Prior Publication Data

US 2011/0041605 A1 Feb. 24, 2011

Related U.S. Application Data

(62) Division of application No. 11/878,441, filed on Jul. 24, 2007, now Pat. No. 7,900,512.

(30) Foreign Application Priority Data

| Jul. 25, 2006 | (JP) | 2006-202399 |
| Jul. 25, 2006 | (JP) | 2006-202400 |
| Jul. 25, 2006 | (JP) | 2006-202401 |

(51) Int. Cl.
   *G01P 9/04* (2011.01)
(52) U.S. Cl. .................................. 73/504.01
(58) Field of Classification Search ............... 73/504.01, 73/504.12

See application file for complete search history.

(56) References Cited

U.S. PATENT DOCUMENTS

| 6,516,665 B1 | 2/2003 | Varadan et al. |
| 6,984,332 B2 | 1/2006 | Varadan et al. |
| 2003/0167841 A1 | 9/2003 | Varadan et al. |

FOREIGN PATENT DOCUMENTS

| DE | 44 03 646 | 6/2005 |
| JP | A-61-247914 | 11/1986 |
| JP | A-62-148812 | 7/1987 |
| JP | UM-A-H04-038513 | 3/1992 |
| JP | A-H06-174476 | 6/1994 |
| JP | A-06-281465 | 10/1994 |
| JP | A-H08-035981 | 2/1996 |
| JP | A-08-145687 | 6/1996 |
| JP | A-08-233577 | 9/1996 |

(Continued)

OTHER PUBLICATIONS

Notification of Reasons for Rejection mailed on Feb. 1, 2011 issued from the Japanese Patent Office in the corresponding Japanese patent application No. 2006-202399 (and English translation).

(Continued)

*Primary Examiner* — John Chapman, Jr.
(74) *Attorney, Agent, or Firm* — Posz Law Group, PLC

(57) ABSTRACT

An angular rate sensor comprises a piezoelectric film having a first and a second surfaces forming an x-y plane and utilizes a perturbation mass coherently vibrating elastic acoustic waves on which a Coriolis force acts when the angular rate sensor undergoes a rotary motion about an x-direction. A first elastic acoustic wave is excited in the piezoelectric film by a driving transducer and a second elastic acoustic wave generated by the Coriolis force proportional to an angular rate of the rotary motion of the angular rate sensor itself is detected by the detecting transducer. The angular rate sensor further comprises at least a first electrode disposed on the first surface of the piezoelectric film for discharging a surface charge caused due to piezoelectric effect at the lower surface of the film in which the first elastic acoustic wave is excited.

15 Claims, 46 Drawing Sheets

FOREIGN PATENT DOCUMENTS

| | | |
|---|---|---|
| JP | A-08-321641 | 12/1996 |
| JP | H08-334330 | 12/1996 |
| JP | A-09-178488 | 7/1997 |
| JP | A-09-264745 | 10/1997 |
| JP | A-09-321564 | 12/1997 |
| JP | A-H10-148528 | 6/1998 |
| JP | A-10-221082 | 8/1998 |
| JP | A-10-332380 | 12/1998 |
| JP | A-2000-162235 | 6/2000 |
| JP | A-2001-194156 | 7/2001 |
| JP | A-2004-282231 | 10/2004 |
| JP | A-2006-177674 | 7/2006 |

OTHER PUBLICATIONS

Notification of Reasons for Rejection mailed on Feb. 1, 2011 issued from the Japanese Patent Office in the corresponding Japanese patent application No. 2006-202400 (and English translation).

Office Action mailed Aug. 2, 2011 in corresponding JP application No. 2006-202401 (and English translation).

Office Action dated Jul. 21, 2009 from German Patent Office in corresponding DE application No. 10 2007 034 759.8-54 (and English translation).

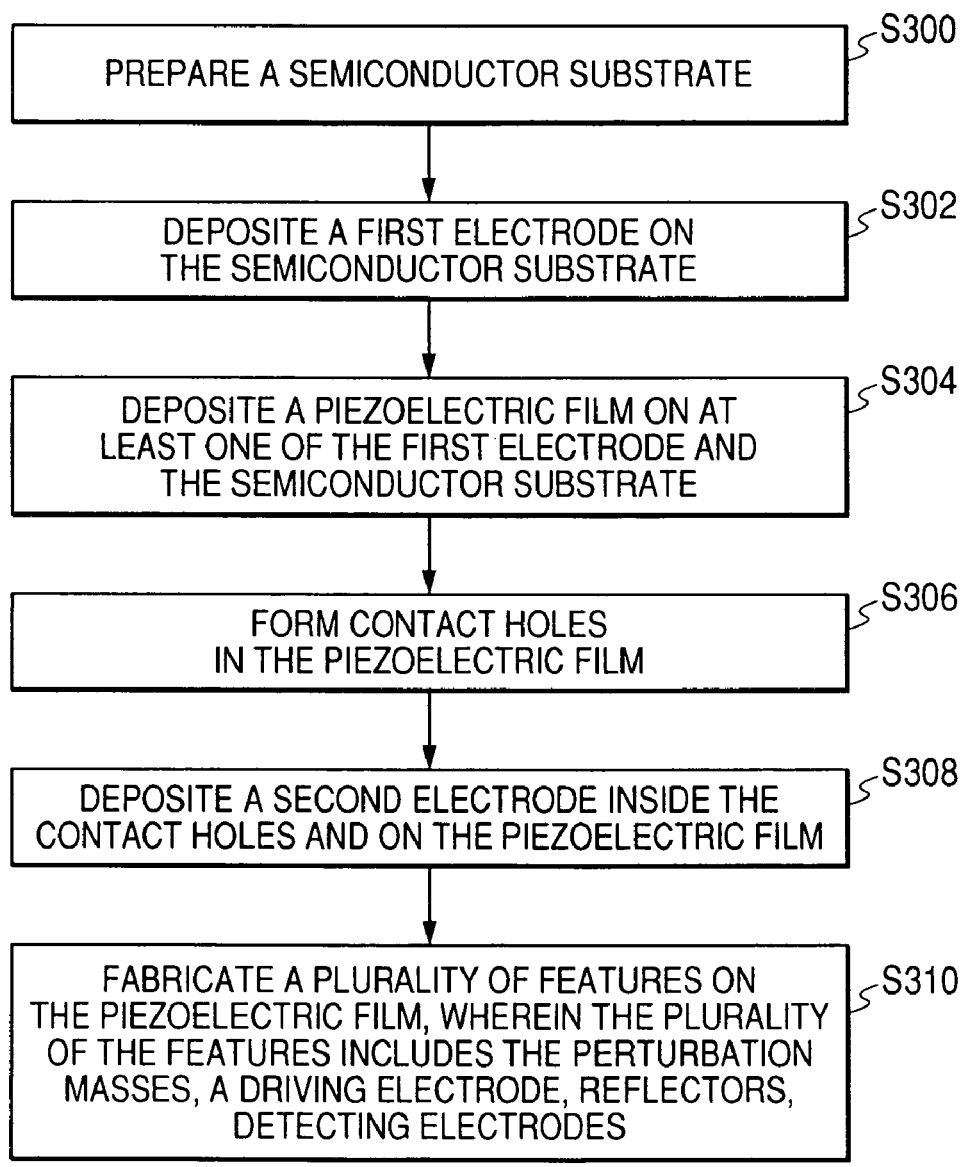

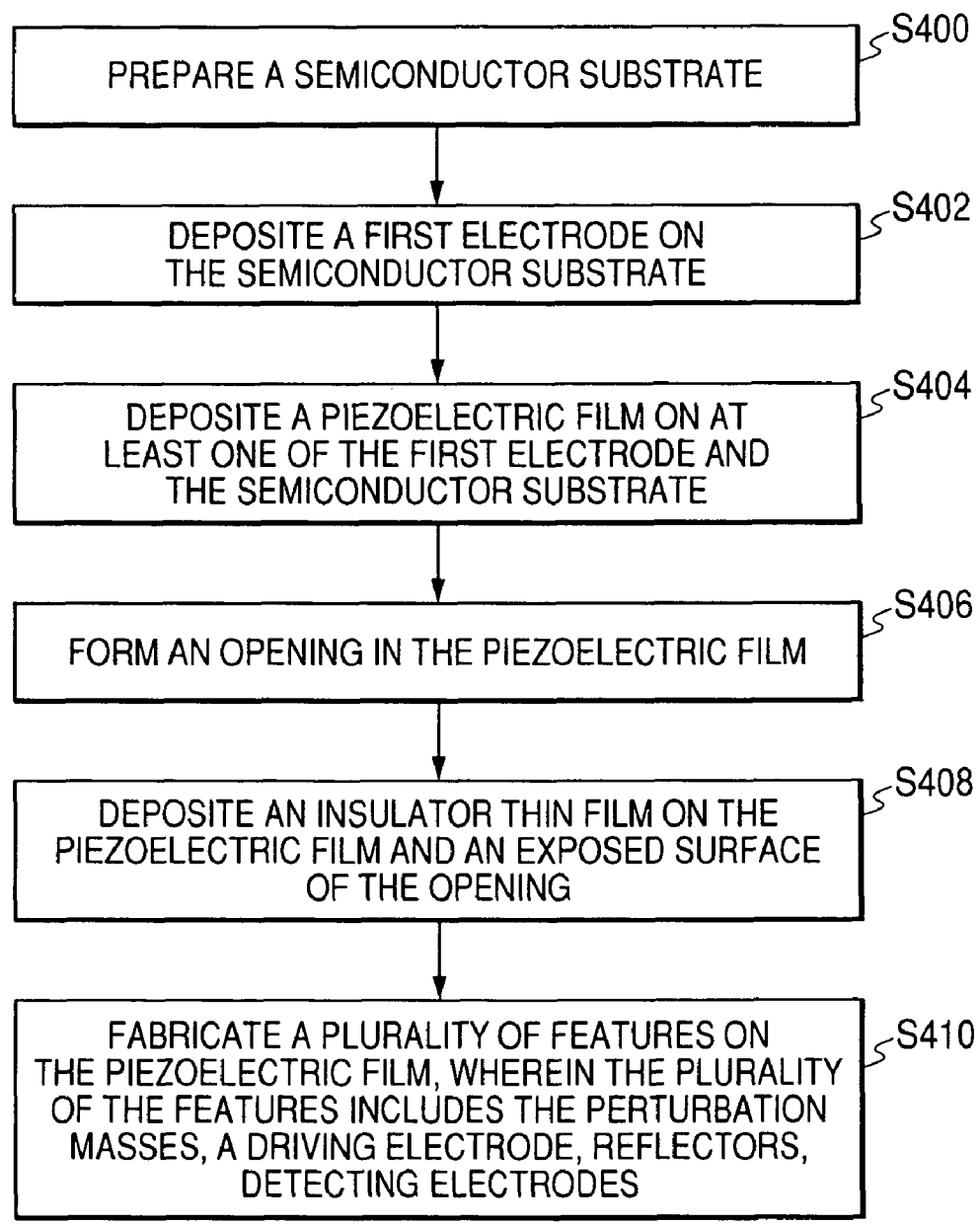

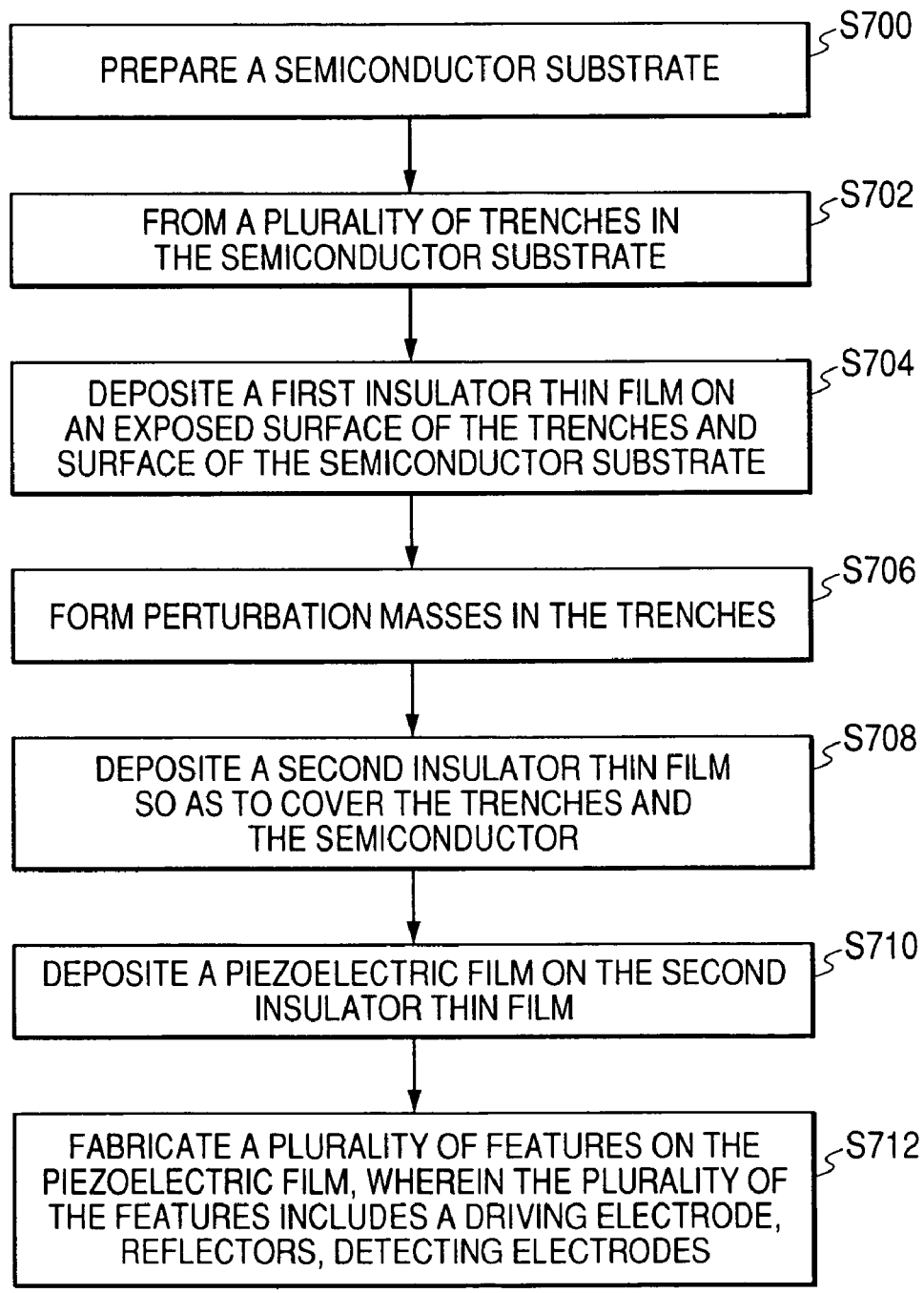

ANGULAR RATE SENSOR

CROSS-REFERENCE TO RELATED APPLICATION

The present application is a divisional of U.S. patent application Ser. No. 11/878,441 filed on Jul. 24, 2007 and entitled ANGULAR RATE SENSOR, and relates to and incorporates by references Japanese Patent Application Nos. 2006-202400 filed on Jul. 25, 2006, 2006-202399 filed on Jul. 25, 2006, and 2006-202401 filed on Jul. 25, 2006.

BACKGROUND OF THE INVENTION

1. The Field of the Invention

The present invention relates to angular rate sensors or gyroscopes, and more particularly to angular rate sensors configured to measure the rate of an angular rotation in a method for detecting a magnitude of a Coriolis force generated by interactions between a vibrating motion of a mass on a piezoelectric substrate and a rotary motion of the piezoelectric substrate by converting the Coriolis force into a voltage due to a piezoelectric effect.

2. Description of the Prior Art

There has been increasing demand for requiring angular rate information, which is also sometimes called angular velocity information not only in the field of automotive products where, for example, inertial navigation and guidance systems, air-bag systems, and anti-skid systems use angular rate information for running, but also in other fields, for example, in the field of still or video cameras where a manual blur correcting system can be found also in the field of medical products, surgical tools, and body movement monitoring apparatus, all of these require angular rate information. Generally a measuring device for obtaining angular rate information is called a gyroscope, gyro sensor, angular rate sensor, angular velocity sensor and so on. Recently, an inexpensive oscillatory type angular rate sensor has been developed in order to be used in the above mentioned fields.

There has been proposed in recent years an angular rate sensor utilizing a piezoelectric element or substrate made of quartz or lithium tantalite capable of providing a smaller and less expensive angular rate sensor.

One known prior art embodiment of an angular rate sensor utilizing a single crystalline piezoelectric element typically has a pair of arms which are joined and fixed at their individual end portions by a root member to form a tuning folk oscillator, as shown FIG. 45. Such an angular rate sensor is disclosed by, for example, U.S. Pat. No. 5,719,460. Although a angular rate sensor disclosed in U.S. Pat. No. 5,719,460 has more complex structures, a basic operation principle is as follows. A set of drive electrodes are affixed to one of the arms of the tuning folk oscillator for driving the tuning folk oscillator in a direction of a principal plane at a resonant frequency due to piezoelectric effect which convert electric energy into mechanical deformation energy and vice versa. Thus, the driving electrodes are electrically driven by an external oscillator circuit. A monitoring electrode, and a sensing electrode are affixed to the other arm. The monitoring electrode serves to detect the oscillation amplitude generated by the oscillator circuit. The sensing electrode serves to detect the stress caused by the Coriolis force acting on the tuning folk and being generated by a rotating motion of the angular rate sensor. In more detail, in order to keep the oscillation amplitude of the tuning folk constant, the electric charge generated on the monitor electrode due to the piezoelectric effect in the direction of the principal plane is amplified by the external circuit and then compared with a reference signal to control the oscillator circuit. On the other hand, the sensing electrode detects a signal generated by the Coriolis force, which is amplified synchronously with the signal detected by the monitoring electrode.

Angular rate sensors of this type suffer from an inherent performance limitation. For example, quartz is typically single crystalline piezoelectric material composed of arrayed single crystals of silicon oxide ($SiO_2$). Since silicon (Si) has a positive polarity and oxide ($O_2$) has negative polarity, symmetric arraying silicon (Si) and oxide ($O_2$) leads to establish electric neutrality. However, if a stress is applied to the silicon oxide ($SiO_2$) single crystalline piezoelectric material, the electric symmetry is broken and electric charge is generated.

In FIG. 46, the individual axes of a quartz crystal are shown. As shown, X-axes or electric axes are defined by the ridge lines and a Z-axis or optical axis is defined by an axis being perpendicular to the plane extended by the X-X axes. A single crystalline piezoelectric material such as quartz exhibits specific piezoelectric characteristic and has specific polarities with respect to the crystal axes which depend on the array of molecules of the crystalline piezoelectric material.

The oscillatory type angular rate sensor detects a rotating motion of the angular rate sensor by detecting the Coriolis force acting at a right angle with respect to the direction of the oscillations of the tuning folks. Thus, the angular rate sensor is required to have piezoelectric characteristics for orthogonal two axes and a means for applying the oscillations and a means for detecting the deformations at a right angle to the applied oscillations due to the Coriolis force. Although a single crystalline tuning folk oscillator is cut from a piezoelectric material is optimized in a view of the polarities on which the sensitivity of the sensor depends, it is not easy to obtain the high sensitivity of both directions corresponding to the oscillatory direction of the tuning folk and the direction of the deformation due to the Coriolis force. Furthermore, the pair of arms and the root member being components of the tuning folks are susceptible to external shock and external vibrations that occur at frequencies close to the arm vibrating frequency. Such disturbances may influence the vibrating structure and produce erroneous results.

Another known prior art embodiment of an angular rate sensor utilizes a surface acoustic wave (SAW) on a piezoelectric substrate, and more particularly to a micro-electro-mechanical (MEM) angular rate sensor that includes a surface acoustic wave resonator (SAWR) and a surface acoustic wave sensors (SAWS).

The basic operating principle of the angular rate sensor utilizing the surface acoustic waves (SAWs) is as follows. When two progressive SAWs which propagate on the same axis but in the opposite directions each other are added, a standing wave is generated on an elastic material surface, where the elastic material is composed of the particles such as molecules. If the standing wave is Rayleigh wave, the wave motion of the surface particles is distributed such that each particle undergoes a periodic motion whose orbit is ellipse in the plane which is orthogonal to the surface of the piezoelectric material and parallel to the propagating direction of the SAWs. Some particles seem to be stationary since an elliptical orbit is collapsed to a nodal point in the plane which is orthogonal to the surface of the piezoelectric material and parallel to the propagating direction of the SAWs. At the nodal point, the particles vibrate in the tangential direction. The Coriolis force acts on the vibrating particles. In order for the angular rate to be detected, the action of the Coriolis force on the particles has to be near the surface of the material. This occurs due to the distribution of the wave motion on the elastic material surface. The secondary wave caused by the Coriolis force can then be detected and the angular rate is quantified.

If the particle of a mass m, a member composing the elastic material, undergoes a vibrating motion $\vec{v}$, an angular rotation $\vec{\omega}$ perpendicular to the direction of the vibrating motion $\vec{v}$, causes a Coriolis force $\vec{F}$ perpendicular to the directions of both the vibrating motion $\vec{v}$, and the angular rotation $\vec{\omega}$ Where the vibrating motion $\vec{v}$, the angular rotation $\vec{\omega}$ and the Coriolis force $\vec{F}$ each has three components, in general. Therefore, the effect of the Coriolis force $$\vec{F} = 2m\vec{v} \times \vec{\omega}$$

is a measure of the rate of the angular rotation $\vec{\omega}$ Where a symbol "×" in the above equation represents an external product.

When the angular rate sensor utilizing the surface acoustic waves on a surface of the elastic substrate is rotated, i.e., the elastic substrate is rotated, the Coriolis force is applied to particles vibrating in the standing wave. The direction of the Coriolis force alternates even if the angular rate is constant in time because the velocity of the particles change temporally depending on the phase of the wave to which the particle contributes. The alternating force generates a secondary SAW in the direction orthogonal to the primary standing wave. As the Coriolis force is proportional to both particle vibration velocity and the angular rate of the substrate, the amplitude of the secondary wave is also proportional to the angular rate. The magnitude of the Coriolis force can be measured by detecting the amplitude of the secondary SAW. Therefore, the angular rate can be obtained from the magnitude of the Coriolis force. However, if an attempt of detecting the magnitude of the Coriolis force by averaging over a spatial distribution of the vibration of each particle composing the elastic material is made, it would not be effective because the Coriolis force acting on each particle cancel one another. Therefore, secondary SAWs will never be obtained due to the cancellation.

However, if perturbation masses are arranged on grids at intervals of a wavelength such that all masses are arranged at nodes of the primary standing wave, the Coriolis force acting in the area with the perturbation masses are stronger than the Coriolis force acting on the area without the perturbation masses because the total weight of the particle and the perturbation masses is heavier than that of particle alone, without the perturbation masses. The coherent alternating forces generated at each perturbation mass build up another SAW which propagates in the orthogonal direction to the primary standing wave.

If an elastic material is made of piezoelectric material which converts the elastic deformation into an electric field and the secondary wave generated by the Coriolis force is detected by two detection electrodes, the output voltage is proportional to the amplitude of the secondary wave. It is preferred that each perturbation mass is deposited with a metal forming an electrode which has a higher mass density.

An elastic surface wave gyroscope and a micro-electromechanical gyroscope both utilizing the above mentioned operating principle are disclosed in Japanese Unexamined Patent Publication No. 8-334330 to Kurosawa and Higuchi and U.S. Pat. No. 6,516,665 to Varadan et al., as shown in FIGS. 47 and 48. Both the elastic surface wave gyroscope of Kurosawa and Higuchi and the micro-electro-mechanical gyroscope of Varadan et al. include two pairs of transducers disposed on a piezoelectric substrate with a plurality of metallic dots arranged in an array, and a pair of reflectors. The plurality of metallic dots serves as a proof mass. One pair of transducers generates the primary surface acoustic wave and is called a surface acoustic wave resonator or a driving inter-digital transducer (hereinafter, "driving IDT"). A pair of reflectors is provided on the outsides of the driving IDT and are arranged to effectively generate the primary surface acoustic wave by reflecting the progressive surface wave generated by the driving IDT on one surface of a piezoelectric substrate. The secondary surface acoustic wave generated by the Coriolis force is sensed by another pair of transducers called a surface acoustic wave sensor or detecting inter-digital transducers (hereafter, "detecting IDTs"). The driving IDT and the detecting IDTs are arranged perpendicularly to each other. It is preferred that the plurality of metallic dots form square electrodes which are sandwiched by both the driving IDT and the detecting IDTs. Preferably, another pair of reflectors is provided on the outsides of the detecting IDTs and are arranged to effectively generate the secondary surface acoustic wave.

By using SAWs, it becomes possible for the angular rate sensor to have a two-dimensional construction, as it can be manufactured only by forming electrodes deposited on the surface of the piezoelectric materials in a method of production technology for very-large-scale integrated circuits (VLSIs).

FIG. 47 is a diagram of a prior art embodiment of an angular rate sensor disclosed in Japanese Unexamined Patent Publication No. 8-334330 to Kurosawa and Higuchi showing the driving IDT J2, the pairs of reflectors J3, J4, J7, and J8, the pair of the detecting IDTs J5, J6, and metallic dots J1, each metallic dot serving as a perturbation mass, formed on the surface of the piezoelectric substrate of the angular rate sensor. The driving IDT J2 and the detecting IDTs J5 are formed such that the teeth of the respective comb-shaped electrodes are located in predetermined positions corresponding to the nodes of the elastic surface wave.

The plurality of metallic dots J1 form almost square electrode on the piezoelectric substrate. The electrodes sides are parallel to an x-axis and a y-axis which are mutually orthogonal, as shown in FIG. 47. The driving IDT J2 which is composed of the comb-shaped electrodes is positioned on the side of the square electrodes along the x-axis. The plurality of metallic dots J1 and the driving IDT J2 are sandwiched by one of the pairs of reflectors J3, J4. On the surface of the piezoelectric substrate, a first standing wave of elastic surface waves are generated within a region J10 of the surface by causing the driving IDT J2 to generate elastic surface waves propagating in outward directions along the x-axis therefrom and by reflecting these elastic surface waves by the reflectors J3, J4. The plurality of metallic dots J1 is disposed on the surface within the region J10. The reflectors J3, J4 are separated from each other by an integral distance equal to one half of wavelength of the first standing wave. The driving IDT has electrodes spaced apart at a distance equal to one half of the first standing wave.

The detecting IDTs J5, J6 are disposed on the surface of the piezoelectric substrate, separated from one another by the region J8 and disposed orthogonally to the pair of the reflectors J3, J4, i.e., the x-axis. In other words, the detecting IDTs J5, J6 are positioned along the y-axis. The region J10 and the detecting IDTs J5, J6 are sandwiched by another pair of reflectors J7, J8 along the y-axis. The detecting IDTs J5, J6 are configured to sense a second surface acoustic wave and provide an output indicative of the characteristics of the second surface acoustic wave. In order to intensify the effect of the Coriolis force on metallic dots J1, each metallic dot is preferably located at an anti-node of the first standing wave.

FIG. 48 shows a simplified operating principle of the above-mentioned angular rate sensor including the driving IDT J2, the pairs of reflectors J3, J4, J7, and J8, the pair of the detecting IDTs J5, J6, and metallic dots J1. In FIG. 48, a relationship between an amplitude of the first standing wave caused by the driving IDT J2 is shown. Metallic dots J1 have individual metallic dots J11, J12, J13, J14, and J15 as shown in FIG. 48.

If the first surface acoustic wave (SAW) causes metallic dots J1 to oscillate along the x-axis, and the piezoelectric substrate of the angular rate sensor is rotated about the x-axis, the Coriolis force, which is related to the rate of rotation, is detected along the y-axis. The first surface acoustic wave (SAW) on the piezoelectric substrate is generated by applying an alternating current (AC) voltage to the driving IDT J2. The resonant frequency of the first SAW is determined by the distance between the comb-shaped electrodes which constitute the driving IDT J2, and ranged, for example, from 10 MHz to several hundreds MHz. The SAW generated by the driving IDT J2 propagates back and forth between the reflectors J3, J4 and forms a first standing wave in region J10 between the detecting IDTs J5, J6 due to the collective reflection from the reflectors J3, J4. That is, the reflectors J3 and 34 contribute to improve the efficiency of the excitation of the standing wave of the SAW along the x-axis by confining the SAW generated by the driving IDT J2 in the region J10.

Since each of metallic dots J11, J12, J13, J14, and J15 is designed to be arranged on an anti-node of the first standing wave within region J10, particles on which metallic dots J1 are disposed will experience a larger amplitude of vibration in a z-direction, which serves as the reference vibrating motion for the angular rate sensor. The z-axis is defined as a direction orthogonal to both the x-axis and the y-axis.

The metallic dots J1 can be made of a metal film of any metal, such as, for example, gold or aluminum. The metallic dots J1 are subjected to oscillatory motion due to the standing wave excited within the region J10 between the reflectors J3, J4. If metallic dots J1 are too large and too heavy, they will affect the formation of the standing wave. Hence, although the shape of the individual metallic dot is not important, the size, position, thickness, and weight are important, and their relative positions are especially important. When the angular rate sensor is rotated, the Coriolis force acting on the metallic dots J1 produces a second SAW. Thus, the metallic dots J1 are also spaced such that the phases of the second SAW are coherent and superposed to provide a sufficient signal to the detecting IDTs J5, J6.

The metallic dots J1 lie in an x-y plane, in which the x-axis runs from the reflector J3 to another reflector J4 and defines a x direction, and the y-axis runs from the reflector J8 to another reflector J7 and defines a y direction. In this case, $\lambda_1$ is the wavelength of the first SAW in the x-direction, and $\lambda_2$ is the wavelength of the second SAW in the y-direction. Since the wave length $\lambda_1$ in the x-direction and $\lambda_2$ in the y-direction are different to each other due to the wave velocity being different in the x and y directions, the spacing between the metallic dots J1 in the x and y directions is also different. The metallic dots J1 are spaced with a separation of $\lambda_1$ in the x-direction and $\lambda_2$ in the y-direction.

Furthermore, the metallic dots J1 are interlaced in both the x and y directions such that the second surface acoustic waves generated by the Coriolis force are coherently superposed. For example, as shown in FIG. 48, when the Coriolis force acts on the metallic dots J1, the metallic dots J11, J12, J13, J14 vibrate coherently with the inverse phase of the metallic dot J15 since the metallic dot J15 is located from every metallic dots J11, J12, J13, J14 by $\lambda_1/2$ in the x direction and by $\lambda_2/2$ in the y direction. So, when the angular rate sensor rotates about the x-axis with rotation rate $\vec{\Omega}_x$, then each of the metallic dots J1 experiences an acceleration of $2\vec{v} \times \vec{\Omega}_x$ in the y-direction, where $\vec{v}$ is the velocity vector of the particle on which the individual metallic dot is disposed. The acceleration $2\vec{v} \times \vec{\Omega}_x$ shows a vector quantity having three components, the first, second, and third component corresponding to the scalar quantity in the x, y, and z directions, respectively.

When the first SAW is excited in the x-direction and the angular rate sensor is rotated about x-axis, the exciting force of the SAW acting on the metallic dots J11, J12, J13, J14, J15 due to the Coriolis force leads to excite the second SAW in the y directions. The second SAW generated by the Coriolis force acting on the metallic dots J11, J12, J13, J14, J15 is detected by the detecting IDTs J5, J6 since the detecting IDTs J5, J6 which are spaced with the distance of an integer number of the wavelength $\lambda_2$ and have comb-shaped electrodes. The second SAW is strengthened being reflected back and forth by the reflectors J7 and J8 so that the second standing wave of the second SAW is generated efficiently. The reflectors J7 and J8 are located such that the detecting IDTs J5, J6 and the region J10 where the metallic dots J1 are disposed are sandwiched therebetween. The strength of the second standing wave is proportional to the Coriolis force. Therefore the strength of the second standing wave is proportional to the rotation rate of the angular rate sensor. Then the piezoelectric effect generates an electric field in the piezoelectric substrate proportional to the strength of the second standing wave which is detectable by the detecting IDTs J5, J6 as an electric voltage. Consequently, it is possible to obtain the rotation rate by measuring the voltage generated at the detecting IDTs J5, J6.

The elastic surface wave gyroscope of Kurosawa and Higuchi and the micro-electro-mechanical gyroscope of Varadan et al. are realized with technology for surface acoustic wave devices, especially, surface acoustic wave filters comprising a single crystal piezoelectric substrate for propagating a Rayleigh wave. Single crystal piezoelectric materials used as the piezoelectric substrate of the elastic surface wave gyroscope and the micro-electro-mechanical gyroscope includes but is not limited to, lithium niobate (LiNbO$_3$), lithium tantalite (LiTaO$_3$), lithium tetraborate (Li$_2$B$_4$O$_7$).

However, even though the above mentioned single crystal piezoelectric materials such as lithium niobate (LiNbO$_3$), lithium tantalite (LiTaO$_3$), lithium tetraborate (Li$_2$B$_4$O$_7$) are widely used for mechanical filters utilizing surface acoustic wave, it is not the best way to reduce the size of the device. Another option is to integrate an angular rate sensor and an external driving circuit thereof into an integrated device when the metallic dots J1 are disposed on one of the above single crystal piezoelectric materials for the angular rate sensor. However one disadvantage of the arrangement comes from the fact that high sensitivity of the angular rate sensor which needs a lot of individual metallic dots J1, and the relative positions of the metallic dots J1 need to be fine tuned so that every metallic dot is positioned at nodes of the secondary SAW caused by the Coriolis force. Furthermore, in order for the angular rate sensor to be highly sensitive, a necessary area of the region J10 where the metallic dots J1 are disposed must be larger in number. The mechanical structure of the elastic surface wave gyroscope of Kurosawa and Higuchi and the micro-electro-mechanical gyroscope of Varadan et al. is not suitable for reducing the size of the angular rate sensor and integrating an angular rate sensor and a driving circuit thereof into one integrated device.

Further, in a similar structure of the elastic surface wave gyroscope of Kurosawa and Higuchi and the micro-electro-mechanical gyroscope of Varadan et al., since it is necessary for the plurality of the metallic dots J1 to be located at the standing wave maxima in order to reduce transduction loss, each of the metallic dots J1 will never be too large or too heavy. However, small and light weight metallic dots J1 can not bring the angular rate sensor into having high sensitivity, because the Coriolis force is proportional to both mass and rotational rate.

In order to improve a downsizing achievement and the scale of integration of an angular rate sensor, an attempt has been made to fabricate on the semiconductor substrate the piezoelectric film in which the elastic acoustic waves are generated using the same principle as that of the elastic surface wave gyroscope of Kurosawa and Higuchi and the micro-electro-mechanical gyroscope of Varadan et al., as shown in FIG. 49. The angular rate sensor of this type comprises a semiconductor substrate J20, an insulator film J21, and a piezoelectric film J22. The insulator Film J21 is deposited on an upper surface of the semiconductor substrate J20, and the piezoelectric film J22 is deposited on an upper surface of the insulator film J21. The metallic dots J23 for sensing the Coriolis force are deposited on an upper surface of the piezoelectric films.

However, the angular rate sensor of the type shown in FIG. 49 is not effective for following reasons. In the structure of the angular rate sensor of this type, an electric polarization in an accumulation direction in a z-direction or surface electric charges are caused when the surface acoustic wave is generated in the piezoelectric film. Wherein, the z-direction is defined as a direction perpendicular to a surface of the piezoelectric film. When the surface acoustic wave is generated, particles of the piezoelectric film vibrate in the z-direction due to the piezoelectric effect. Since the piezoelectric effect converts an inner stress of the piezoelectric film into an electric field, an amount of the electric polarization or an amount of electric charge are proportional to amplitudes of the elastic acoustic waves, then proportional to the stress applied to the piezoelectric film. If a piezoelectric constant is positive, positive electric charge is caused in a region at which a compression stress is generated, and negative electric charge is caused in other regions at which a tensile stress is applied. As a result of the electric polarization occurred in the piezoelectric film, a displacement of particles which are located in both regions at which the compression and tensile stresses are applied is suppressed. Then, achievement of high sensitivity of the angular rate sensor is difficult in the structure of the angular rate sensor of the type which is organized in such a way that the piezoelectric film J22 and the metallic dots J23 are accumulated on the semiconductor substrate J20.

SUMMARY OF THE INVENTION

The present invention has been made in consideration of the above situation in the prior art, and has as its object to provide an angular rate sensor comprising a semiconductor substrate and a piezoelectric film accumulated on the semiconductor substrate and having features such as compactness, high sensitivity, high reliability, high stability, high precision, and high mass-production capability by suppressing an electric polarization in the perpendicular direction to the piezoelectric film.

In order to achieve the above object, according to the first aspect of the present invention, there is provided an angular rate sensor comprising a semiconductor substrate, a first electrode formed on an upper surface of the semiconductor substrate, a piezoelectric film formed on the whole region of the first electrode, metallic dots serving as perturbation masses disposed on the opposite surface of the piezoelectric film to a surface contacting with the semiconductor substrate, each metallic dot being capable of vibrating in the perpendicular direction to the piezoelectric film, a driving IDT for causing an elastic acoustic wave in the piezoelectric film in an response to externally applied driving voltage disposed on the piezoelectric film, a pair of reflectors sandwiching the driving IDT and the metallic dots reflecting the elastic acoustic wave caused by the driving IDT to form a first standing wave of the elastic acoustic wave accompanying the vibration of the metallic dots resonating with an amplitude of the elastic acoustic wave, and detecting IDTs for detecting a second standing wave generated by a Coriolis force acting on the metallic dots which vibrate, resonating with the amplitude of the elastic acoustic wave.

In the angular rate sensor having the first electrode sandwiched between the semiconductor substrate and the piezoelectric film, the polarization in the z-direction, which is defined as a perpendicular direction to the surface of the piezoelectric film, can be suppressed even if an inner stress in the piezoelectric film is generated by the Coriolis force acting on vibrating particles in the piezoelectric substrate and then the inner stress generates an electric field in the z-direction which is an origin of a surface electric charge, i.e., the electric polarization of the piezoelectric film in the z-direction due to neutralization effect by the first electrode. In more detail, if surface electric charge is generated at the lower surface of the piezoelectric film connecting to the first electrode, surface electric charge escapes from the piezoelectric film and is thus neutralized via the first electrode. Therefore, a limitation of an amount of a displacement of the vibrating particle in the piezoelectric substrate, especially of the metallic dots vibrating in the z-direction due to the polarization in the z-direction of the piezoelectric film is eliminated. In consequence, it is possible to realize an angular rate sensor having high sensitivity.

Further, a basic structure of the angular rate sensor according to the present invention on which the driving IDT, reflectors, and the detecting IDTs take, resembles that taken by the prior arts. Hence, it becomes possible to reduce a size of the angular rate sensor because a necessary size for obtaining a sufficient sensitivity becomes smaller due to higher sensitivity of the angular rate sensor according to the present invention. Therefore the angular rate sensor having high sensitivity can be miniaturized with production technology for very-large-scale integrated circuits (VLSIs).

In order to achieve the above object, according to the second aspect of the present invention, there is provided an angular rate sensor further comprising a second electrode sandwiched between the piezoelectric film and the plurality of metallic dots and covering a whole region where the metallic dots are formed.

In the angular rate sensor having the second electrode sandwiched between the piezoelectric film and the plurality of metallic dots, the polarization in the z-direction can be suppressed due to neutralization effect by the first electrode even if an inner stress in the piezoelectric film is generated by the Coriolis force acting on vibrating particles in the piezoelectric substrate and then the inner stress generates an electric field in the z-direction which causes a surface electric charge at an upper and a lower surface of the piezoelectric film or an electric polarization of the piezoelectric film in the z-direction. In more detail, if surface electric charge is generated at the upper surface of the piezoelectric film connecting to the second electrode, surface electric charge escapes from the piezoelectric film and thus is neutralized via the second electrode. Therefore, a limitation of an amount of a displacement of the vibrating particle in the piezoelectric substrate, especially of the vibrating metallic dots in the z-direction due to the polarization in the z-direction of the piezoelectric film, is eliminated. In consequence, it is possible to realize an angular rate sensor having high sensitivity. Further the angular rate sensor having high sensitivity can be miniaturized with production technology for very-large-scale integrated circuits (VLSIs).

In order to achieve the above object, according to the third aspect of the present invention, there is provided an angular rate sensor further comprising a contact hole formed in the piezoelectric film for electrically connecting the first electrode sandwiched between the semiconductor substrate and the piezoelectric film to the second electrode formed on the upper surface of the piezoelectric film but below the metallic dots so as to keep the same electric potential of the first electrode with that of the second electrode.

The angular rate sensor in which the contact holes are formed in the piezoelectric film such a way that the electric potential of the first and second electrodes connected to the lower and upper surface of the piezoelectric film respectively maintains at the same level. This can suppress the generation of a difference of the electric potential between the upper and lower surface of the piezoelectric film. Hence, a limitation of the displacement of the vibrating particle in the piezoelectric substrate, especially of the vibrating metallic dots in the z-direction due to the polarization in the z-direction of the piezoelectric film, is eliminated. In consequence, it is possible to realize an angular rate sensor having high sensitivity.

In the angular rate sensor of this type, it is preferable that each contact hole is connecting to the corresponding metallic dot. In other words, the individual metallic dot is formed on the top of the contact hole. If the contact holes are formed at the position where the metallic dots are disposed, some portion of a weight of the contact holes contributes to a perturbation mass without affecting the characteristics of the elastic acoustic wave. Therefore, it is possible to realize an angular rate sensor having high sensitivity.

In order to achieve the above object, according to the fourth aspect of the present invention, there is provided an angular rate sensor having openings for accommodating a perturbation weight in the piezoelectric film.

In the angular rate sensor having the openings for accommodating the perturbation weight in the piezoelectric film disposed on the semiconductor substrate, the piezoelectric material is expelled from the openings. Therefore, even if the standing wave of the elastic acoustic wave generates surface electric charges at the surfaces of the piezoelectric film by the piezoelectric effect at a region where the metallic dots and the openings are positioned, the surface electric charges will never affect the vibration of the perturbation weight in the z-direction. As a result, a limitation of the displacement of the vibrating perturbation weights accommodated into the openings in the z-direction is eliminated. In consequence, it is possible to realize an angular rate sensor having high sensitivity.

In the modification of the angular rate sensor of this type, it is preferable that the angular rate sensor having the openings for accommodating the perturbation weight in the piezoelectric film further comprises the first electrode sandwiched between the semiconductor substrate and the piezoelectric film.

In all aspects of the present invention mentioned above, it is preferable that the perturbation masses or the perturbation weight are made of metal or metallic alloy whose mass density is greater than 13.5 g/cm$^3$. The metals or metallic alloys being suitable ones for the perturbation masses or the perturbation weight include platinum (Pt), tungsten (W), and gold (Au). In such a configuration of the perturbation masses or the perturbation weight, the Coriolis force acting on the perturbation masses or the perturbation weight is emphasized so as to increase the displacement of the perturbation masses or the perturbation weight in the z-direction. In consequence, it is possible to realize an angular rate sensor having high sensitivity. Further the angular rate sensor having high sensitivity can be miniaturized with production technology for very-large-scale integrated circuits (VLSIs).

In order to achieve the above object, according to the fifth aspect of the present invention, there is provided a method for manufacturing an angular rate sensor comprising steps of a preparing step for preparing the semiconductor substrate, a first electrode forming step for depositing the first electrode on the semiconductor substrate at least over a region above which a perturbation weight is formed, a piezoelectric film forming step for depositing the piezoelectric film on at least one of the first electrode and the semiconductor substrate, and a fabricating step for fabricating a plurality of features on the piezoelectric film, wherein the plurality of features includes metallic dots serving as the perturbation masses, a driving IDT for causing a elastic acoustic wave in the piezoelectric film, reflectors for reflecting the elastic acoustic wave so as to form a first and a second standing wave, and detecting IDTs for detecting a second standing wave caused by the Coriolis force acting on the first standing wave. In consequence, it is possible to realize an angular rate sensor which can be miniaturized with production technology for very-large-scale integrated circuits (VLSIs).

In a modification of the method for manufacturing an angular rate sensor, the fabricating step for fabricating a plurality of features on the piezoelectric film further comprises a first fabricating step for fabricating the driving IDT, reflectors, and the detecting IDTs, and a second fabricating step for fabricating the perturbation masses.

In order to achieve the above object, according to the sixth aspect of the present invention, there is provided a method for manufacturing an angular rate sensor further comprising a step of a second electrode forming step for depositing the second electrode sandwiched between the piezoelectric film and the metallic dots at least over a region which covers a region where the metallic dots are formed. In consequence, it is possible to realize an angular rate sensor which can be miniaturized with production technology for very-large-scale integrated circuits (VLSIs).

In order to achieve the above object, according to the seventh aspect of the present invention, there is provided a method for manufacturing an angular rate sensor having the contact hole in the piezoelectric film further comprising a step of a forming the contact hole in the piezoelectric film wherein the second electrode forming step is configured to electrically connect the second electrode to the first electrode which is sandwiched between the semiconductor substrate and the piezoelectric film via the contact hole. If the contact hole is arranged such that the metallic dot is in alignment with the contact hole in the z-direction, a weight of a portion of the second electrode which is located just below one of the metallic dots contributes to the perturbation masses. Therefore, it is possible to realize an angular rate sensor which can be miniaturized with production technology for very-large-scale integrated circuits (VLSIs).

In order to achieve the above object, according to the eighth aspect of the present invention, there is provided a method for manufacturing an angular rate sensor comprising steps of a preparing step for preparing the semiconductor substrate, a piezoelectric film forming step for depositing the piezoelectric film on the semiconductor substrate, a second electrode forming step for depositing the second electrode on the piezoelectric film at least over a region above which a perturbation weight is formed, a fabricating step for fabricating a plurality of features on the piezoelectric film, wherein the plurality of features includes a driving IDT for causing a elastic acoustic wave in the piezoelectric film, reflectors for reflecting the elastic acoustic wave so as to form a first and a second standing wave, and detecting IDTs for detecting a second standing wave caused by the Coriolis force acting on the first standing wave, and a further fabricating step for fabricating the metallic dots serving as the perturbation weight on the second electrode.

In a modification of the above methods for manufacturing angular rate sensors, it is preferable that methods further comprise a step of an insulator film forming step for forming the insulator film on the surface of the piezoelectric film. Thus, it is possible to realize an angular rate sensor which can be miniaturized with production technology for very-large-scale integrated circuits (VLSIs).

In order to achieve the above object, according to the ninth aspect of the present invention, there is provided a method for manufacturing an angular rate sensor comprising steps of a preparing step for preparing the semiconductor substrate, a piezoelectric film forming step for depositing the piezoelectric film on the semiconductor substrate, an opening forming step for forming the opening in the piezoelectric film over a region above which a perturbation masses are disposed, a fabricating step for fabricating a plurality of features on the piezoelectric film, wherein the plurality of features includes a driving IDT for causing a elastic acoustic wave in the piezoelectric film, reflectors for reflecting the elastic acoustic wave so as to form a first and a second standing wave, and detecting IDTs for detecting a second standing wave caused by the Coriolis force acting on the first standing wave, and a further fabricating step for fabricating the metallic dots serving as the perturbation masses on a surface of the opening. Hence, it is possible to realize an angular rate sensor which can be miniaturized with production technology for very-large-scale integrated circuits (VLSIs).

In a first modification of this method for manufacturing angular rate sensors, it is preferable that the method further comprise a step of a first insulator film forming step for forming the first insulator film on the surface of the piezoelectric film. In a second modification of this method for manufacturing angular rate sensors, it is preferable that the method further comprises a first electrode forming step for forming the first electrode either on an upper surface of the semiconductor substrate or on an upper surface of the first insulator film wherein the piezoelectric film forming step is configured to form the piezoelectric film on the surface of the first electrode. In a third modification of this method for manufacturing angular rate sensors, it is preferable that the method further comprising a second insulator film forming step for forming the second insulator film either on an upper surface of the piezoelectric film exposed due to the existence of the opening in the piezoelectric film or on am upper surface of the piezoelectric film. In consequence, it is possible to realize an angular rate sensor which can be miniaturized with production technology for very-large-scale integrated circuits (VLSIs).

In order to achieve the above object, according to the tenth aspect of the present invention, there is provided an angular rate sensor comprising a semiconductor substrate, a first electrode formed on an upper surface of the semiconductor substrate, a piezoelectric film formed on the whole region of the first electrode, metallic dots serving as perturbation masses disposed on the opposite surface of the piezoelectric film to a surface contacting with the semiconductor substrate, each metallic dot being capable of vibrating in the perpendicular direction to the piezoelectric film, a driving IDT for causing an elastic acoustic wave in the piezoelectric film in response to an externally applied driving voltage disposed on the piezoelectric film, a pair of reflectors sandwiching the driving IDT and the metallic dots reflecting the elastic acoustic wave caused by the driving IDT to form a first standing wave of the elastic acoustic wave with accompanying the vibration of the metallic dots resonating with an amplitude of the elastic acoustic wave, and detecting IDTs for detecting a second standing wave generated by a Coriolis force acting on the metallic dots which vibrate resonating with the amplitude of the elastic acoustic wave, wherein a mass density in a region where the metallic dots are disposed is larger than that in a further region where the driving IDT, reflectors, and detecting IDTs are disposed. This configuration leads to an effect where the Coriolis force acting on the metallic dots is increased since a magnitude of the Coriolis force is proportional to the mass density. Then both amplitude of an elastic acoustic wave generated by the Coriolis force and the velocity of particles located just below the metallic dots are also increased as the magnitude of the Coriolis force increases. In consequence, it is possible to realize an angular rate sensor having high sensitivity.

In a modification of the angular rate sensor of this type, there is provided an angular rate sensor having the first electrode sandwiched between the semiconductor substrate and the piezoelectric film. In the angular rate sensor having the first electrode, an electric polarization in the z-direction can be suppressed due to neutralization effect by the first electrode even if an inner stress in the piezoelectric film is generated by the Coriolis force acting on vibrating particles in the piezoelectric substrate and then the inner stress generates an electric field in the z-direction which is a origin of a surface electric charge at an upper and a lower surface of the piezoelectric film or an electric polarization of the piezoelectric film in the z-direction. In more detail, if the surface electric charge is generated at the lower surface of the piezoelectric film being connected to the first electrode, the surface electric charge escapes from the piezoelectric film and is thus neutralized via the first electrode. Therefore, a limitation of an amount of a displacement of the vibrating particle in the piezoelectric substrate, especially of the metallic dots vibrating in the z-direction due to the polarization in the z-direction of the piezoelectric film is eliminated. In consequence, it is possible to realize an angular rate sensor having high sensitivity because a mass density in a region where the metallic dots are disposed is larger than that in a further region where the driving IDT, reflectors, and detecting IDTs are disposed. This can lead to the realization of highly sensitive angular rate sensor.

In a further modification of the angular rate sensor of this type, there is provided an angular rate sensor having a second electrode sandwiched between the piezoelectric film and the plurality of metallic dots. This can also make it possible to realize an angular rate sensor having high sensitivity. It is also preferable that the angular rate sensor having a plurality of trenches in the semiconductor substrate into which the perturbation masses are accommodated. In this configuration, the perturbation masses are located under the piezoelectric film.

In order to achieve the above object, according to the eleventh aspect of the present invention, there is provided an angular rate sensor comprising a plurality of trenches whose exposed surface is covered by an insulator film in the semiconductor substrate, a plurality of features including include the driving IDT, reflectors, and detecting IDTs and being fabricated in the trenches, and a piezoelectric film arranged so as to cover the plurality of features such as the driving IDT, reflectors, and detecting IDTs, wherein a mass density in a region where the metallic dots are disposed is larger than that in a further region where the driving IDT, reflectors, and detecting IDTs are disposed. This configuration leads to an effect where the Coriolis force acting on the metallic dots is increased since a magnitude of the Coriolis force is proportional to the mass density. Then both amplitude of an elastic acoustic wave generated by the Coriolis force and velocities of particles located just below the metallic dots are also increased as the magnitude of the Coriolis force increases. In consequence, it is possible to realize an angular rate sensor having high sensitivity.

As is in the angular rate sensor comprising the plurality of features including the driving IDT, reflectors, and detecting IDTs, and being disposed on the piezoelectric film, the same advantages are obtained in an angular rate sensor having the plurality of feature disposed below the piezoelectric film wherein a mass density in a region where the metallic dots are disposed is larger than that in a further region where the plurality of feature including the driving IDT, reflectors, and detecting IDTs are disposed.

This configuration in which the plurality of feature including the driving IDT, reflectors, and detecting IDTs are disposed below the piezoelectric film can be realized through the formation of forming trenches, accommodating the perturbation masses thereinto, and forming a piezoelectric film so as to cover the trenches.

Further, as a modification of the angular rate sensor according to the eleventh aspect of the present invention, a conductive film is formed on the piezoelectric film. It becomes possible for the angular rate sensor having the conductive film formed on the piezoelectric film to generate and keep a predetermined voltage between the driving IDT and the conductive film such that electric power is efficiently inputted into the piezoelectric film since the electric potential level of the piezoelectric film is able to be kept constant. Further, if the conductive film is connected to a ground, the conductive film acts as a shield. This fact leads to an expectation that the angular rate sensor is insensitive to external electric noise. Therefore, it becomes possible that the angular rate sensor to have high sensitivity since the electric signal level is increased due to an electronic noise reduction effect of the conduction film.

In a modification of the angular rate sensor including the conductive film, the angular rate sensor is further comprised of the openings over which the conductive film is expelled for accommodating the perturbation weight.

In the tenth and eleventh aspects of the present invention mentioned above, a mass density in a region where the perturbation masses are disposed is larger than that in a further region where the driving IDT, reflectors, and detecting IDTs are disposed. This configuration leads to an effect where the Coriolis force acting on the metallic dots is increased since a magnitude of the Coriolis force is proportional to the mass density. Then both amplitude of an elastic acoustic wave generated by the Coriolis force and velocities of particles located just below the metallic dots are also increased as the magnitude of the Coriolis force increases. In consequence, it is possible to realize an angular rate sensor having high sensitivity.

In order to achieve the just mentioned condition, there is a method in which the perturbation masses or the perturbation weight are made of metal or metallic alloy whose mass density is greater than 13.5 g/cm$^3$. The metals or metallic alloys being suitable ones for the perturbation masses or the perturbation weight include platinum (Pt), tungsten (W), and gold (Au). In such a configuration of the perturbation masses or the perturbation weight, the Coriolis force acting on the perturbation masses or the perturbation weight is emphasized so as to increase the displacement of the perturbation masses or the perturbation weight in the z-direction. In consequence, it is possible to realize an angular rate sensor having high sensitivity. Further the angular rate sensor having high sensitivity can be miniaturized with production technology for very-large-scale integrated circuits (VLSIs).

There is a further method for achieving the condition that a mass density in a region where the perturbation masses are disposed is larger than that in a further region where the driving IDT, reflectors, and detecting IDTs, thickness of the perturbation masses are larger than that in the further region. If the perturbation masses, the driving IDT, reflectors, and detecting IDTs are made of the same metal or metallic alloy, the above condition can be satisfied.

In order to achieve the above object, according to the twelfth aspect of the present invention, there is provided a method for manufacturing an angular rate sensor comprising steps of a preparing step for preparing the semiconductor substrate, a first electrode forming step for depositing the first electrode on the semiconductor substrate at least over a region above which a perturbation weight is formed, a piezoelectric film forming step for depositing the piezoelectric film on the first electrode or the semiconductor substrate, a further preparing step for preparing a first and a second materials, a mass density of the second material is larger than that of the first material, a fabricating step for fabricating a plurality of features made of the first material on the piezoelectric film, wherein the plurality of features includes a driving IDT for causing a elastic acoustic wave in the piezoelectric film, reflectors for reflecting the elastic acoustic wave so as to form a first and a second standing wave, and detecting IDTs for detecting a second standing wave caused by the Coriolis force acting on the first standing wave, and a further fabricating step for fabricating the perturbation masses made of the second material serving as the perturbation masses on a surface of the piezoelectric film. Therefore, a mass density in a region where the perturbation masses are disposed is larger than that in a further region where the plurality of feature including the driving IDT, reflectors, and detecting IDTs are disposed. Hence, it is possible to realize an angular rate sensor which can be miniaturized with production technology for very-large-scale integrated circuits (VLSIs).

In an angular rate sensor manufactured by a method according to the twelfth aspects of the present invention mentioned above, the Coriolis force acting on the perturbation masses is increased since a magnitude of the Coriolis force is proportional to the mass density. Then both amplitude of an elastic acoustic wave generated by the Coriolis force and velocities of particles located just below the metallic dots are also increased as the magnitude of the Coriolis force increases. In consequence, it is possible to realize an angular rate sensor having high sensitivity.

In a modification of the method for manufacturing the angular rate sensor according to the twelfth aspects of the present invention, the method further comprises a step of a first electrode forming step for forming the first electrode on the semiconductor substrate and below the piezoelectric film over a region above which the perturbation masses is disposed.

In the angular rate sensor having the first electrode, an electric polarization in the z-direction can be suppressed due to neutralization effect by the first electrode. In more detail, if surface electric charge is generated at the lower surface of the piezoelectric film connecting to the first electrode, surface electric charge escapes from the piezoelectric film and thus is neutralized via the first electrode. Therefore, a limitation of an amount of a displacement of the vibrating particle in the piezoelectric substrate, especially of the metallic dots vibrating in the z-direction due to the polarization in the z-direction of the piezoelectric film is eliminated. In consequence, it becomes possible to realize an angular rate sensor having high sensitivity.

In the method for manufacturing the angular rate sensor according to the twelfth aspects of the present invention, it is preferable that the first electrode forming step is configured to make the first electrode of one of impurity doped polysilicon, aluminum (Al), aluminum-base alloy, titanium (Ti), titanium-base alloy, tungsten, tungsten-base alloy, molybdenum, and molybdenum-base alloy.

In a modification of the method for manufacturing the angular rate sensor according to the twelfth aspects of the present invention, the first electrode forming step is configured to form the first electrode on the piezoelectric film and below the perturbation masses. In this case the first electrode covers a region over which the perturbation masses are disposed.

In a further modification of the method for manufacturing the angular rate sensor according to the twelfth aspects of the present invention, there is provided a method for manufacturing an angular rate sensor further comprising steps of a trench forming step for forming a plurality of trenches in the semiconductor substrate, a insulator film forming step for disposing the insulator film on an exposed surface of every trench, a perturbation mass forming step for forming the perturbation masses in the trenches whose surfaces are coated by the insulator film, and a piezoelectric film forming step for forming the piezoelectric film so as to cover the plurality of the trenches, the perturbation masses and the semiconductor substrate. In this arrangement, the perturbation masses are located under the piezoelectric substrate.

In order to achieve the above object, according to the fourteenth aspect of the present invention, there is provided a method for manufacturing an angular rate sensor comprising steps of a preparing step for preparing the semiconductor substrate, a trench forming step for forming a plurality of trenches in the semiconductor substrate, a insulator film forming step for disposing the insulator film on an exposed surface of every trench, a further preparing step for preparing a first and a second materials, a mass density of the second material is larger than that of the first material, a fabricating step for fabricating a plurality of features made of the first material in some trenches, wherein the plurality of features includes a driving IDT for causing a elastic acoustic wave in the piezoelectric film, reflectors for reflecting the elastic acoustic wave so as to form a first and a second standing wave, and detecting IDTs for detecting a second standing wave caused by the Coriolis force acting on the first standing wave, and a further fabricating step for fabricating the perturbation masses made of the second material serving as the perturbation masses in other trenches, and a piezoelectric film forming step for forming the piezoelectric film so as to cover the plurality of the trenches, the perturbation masses and the semiconductor substrate. Therefore, a mass density in a region where the perturbation masses are disposed is larger than that in a further region where the plurality of feature including the driving IDT, reflectors, and detecting IDTs are disposed. Hence, it is possible to realize an angular rate sensor which can be miniaturized with production technology for very-large-scale integrated circuits (VLSIs).

In a modification of a method according to the fourteenth aspect, a fabricating step for fabricating a plurality of features made of the first material in some trenches, wherein the plurality of features includes a driving IDT, the reflectors, and the detecting IDTs, further comprises an insulator film forming step for forming the insulator film on exposed surfaces of the trenches formed in the semiconductor substrate, wherein the further fabricating step is configured to fabricate the perturbation masses in the trenches whose exposed surfaces are coated by the insulator film so as to cover the plurality of the trenches, the perturbation masses and the semiconductor substrate.

In a further modification of a method according to the fourteenth aspect, the method for manufacturing the angular rate sensor further comprises a conductive film on the piezoelectric substrate. It is possible for the angular rate sensor having the conductive film formed on the piezoelectric film to generate and keep a predetermined voltage between the driving IDT and the conductive film such that electric power is efficiently inputted into the piezoelectric film since the electric potential level of the piezoelectric film is able to be kept constant. Further, if the conductive film is connected to a ground, the conductive film acts as a shield. This fact leads to an expectation that the angular rate sensor is insensitive to external electric noise. Therefore, it is now possible that the angular rate sensor has high sensitivity since the electric signal level is increased due to an electronic noise reduction effect of the conduction film.

In a modification of the angular rate sensor including the conductive film, the angular rate sensor is further comprised of the openings over which the conductive film is expelled for accommodating the perturbation weight.

In order to achieve the above object, according to the fifteenth aspect of the present invention, there is provided an angular rate sensor comprising a piezoelectric substrate having an upper and a lower surfaces and vibrating such as an elastic wave in response to an electric signal due to a piezoelectric effect by which an electric energy is converted into a mechanical deformation energy of the piezoelectric substrate and vice versa, a first electrode formed on the lower surface of the piezoelectric substrate, a second electrode formed in the upper surface of the piezoelectric substrate such that the second electrode is opposed to the first electrode via the piezoelectric substrate and configured to serve as a perturbation mass on which a Coriolis force acts if the perturbation mass has a velocity thereof relative to the piezoelectric substrate and the piezoelectric substrate is rotated, and detectors for detecting electric signals generated by the Coriolis force and then related to physical quantities about rotation phenomena of the piezoelectric substrate.

In the angular rate sensor having the second electrode configured to serve as the perturbation mass, the second electrode vibrate in a z-direction defined as a perpendicular direction to the upper surface of the piezoelectric substrate due to the piezoelectric effect if alternative current (AC) voltage is applied between the first and second electrodes. Thus, it becomes possible that information of rotation of the piezoelectric substrate is obtained via the vibration of the second electrode formed on the upper surface of the piezoelectric substrate. One of advantages of the angular rate sensor of the above described type is that a necessary area for a perturbation mass becomes to be smaller than that for metallic dots serving as perturbation masses on which the Coriolis force acts when an elastic acoustic wave is excited along a parallel direction to the upper surface of the piezoelectric substrate since elastic acoustic wave is generated in the z-direction, i.e., in the perpendicular direction to the upper surface of the piezoelectric substrate. Another advantage of the angular rate sensor of the above described type is that a driving IDT and reflectors are not necessary. Only detecting IDTs are necessary. The driving IDT and reflectors do not necessary to be arranged such that all of the driving IDT, reflectors, and a region wherein metallic dots serving as perturbation masses on a straight line. Therefore, downsizing of angular rate sensors and integrating an angular rate sensor and an external driving circuit thereof into a small size integrated device are simultaneously achieved.

In a modification of the angular rate sensor of the above mentioned type having the second electrode configured to serve as the perturbation mass, the detecting IDTs further comprises a first detecting IDTs and a second detecting IDTs, each of the first and the second IDTs are composed of the plurality of the electrodes. The first detecting IDTs and the second detecting IDTs are located such that the region wherein the second electrode serving as the perturbation mass is sandwiched between the first and second IDTs.

In the angular rate sensor having the above mentioned arrangement, rotation rate is measured based on the difference between a measured electric power detected by the first detecting IDT and that of the second detecting IDT so that effects of external noise in elastic acoustic waves are removed from final results of the measurement.

In a further modification of the angular rate sensor of the above mentioned type having the second electrode configured to serve as the perturbation mass, the detecting IDTs further comprises a third detecting IDT and a fourth detecting IDT. Each of the third and the fourth IDTs are composed of a plurality of electrodes. The third and the fourth IDT is located such that the second electrode serving as the perturbation mass is sandwiched therebetween and the first and the second IDTs are orthogonally arranged on the upper surface of the piezoelectric substrate.

This configuration of the first, second, third, and fourth detecting IDTs leads to the possibility of detecting rotation rate about multiple orthogonal axes. Thus, this configuration is capable of reducing effects of direct elastic acoustic waves generated by applying external AC voltages on measuring voltage relating to elastic acoustic waves generated by the Coriolis force.

Further, the above configuration of the first, second, third, and fourth detecting IDTs is capable of reducing an unnecessary contribution from the direct elastic acoustic waves. The first and second detecting IDTs provide a first output including information about a difference in output voltages detected by the first and second IDTs. Similarly, the third and fourth IDTs provide a second output including information about a difference in output voltages detected by the third and fourth IDTs. If angular rate is obtained using the first and second outputs, the angular rate sensor becomes insensitive to the direct elastic acoustic waves which are not experienced of the scattering by the Coriolis force.

In a further modification of the angular rate sensor of the above mentioned type having the second electrode configured to serve as the perturbation mass, the piezoelectric substrate is replaced with a thin piezoelectric film having upper and lower surfaces. In this case, the angular rate sensor further comprises a supporting member whose upper surface is covered by the first electrode. The lower surface of the thin piezoelectric film covers the upper surface of the first electrode.

It is preferable that the supporting member is made of an insulating substrate or a semiconductor substrate having a high resistivity.

It is further preferable that a via hole is formed from the semiconductor substrate so as to obtain a structure in which the lower surface of the first electrode is exposed to the air. In this configuration of the angular rate sensor, the second electrode serving as the perturbation mass is capable of vibrating in the z-direction with large amplitude so as to obtain high sensitivity to the Coriolis force acting on the perturbation mass, i.e., to rotation rate.

In this configuration, an unnecessary vibration of the perturbation mass is generated if the via hole is too large. Thus, it is preferable that a length of the via hole along a x-direction, which is defined by a direction in which the first and second detecting IDTs are in alignment with each other, is shorter than a spacing between the first and second IDTs and the ends of the perturbation mass lie off the via hole along the x-direction, so that the unnecessary vibration of the perturbation mass is suppressed.

In a situation where direction is not in the x-direction, a longer length of the via hole overlapping edges of the first and second IDTs along the y-direction, which is defined by a direction orthogonal to the x-direction on the surface of the thin piezoelectric film, is preferable. In such a configuration of the via hole, it is possible for the first and second IDTs to output a higher lever of electric signals proportional to the Coriolis force acting on the perturbation mass when the thin piezoelectric film rotates about the x-axis. Thus, it is preferable that the ends of the via hole lie off the perturbation mass along the y-direction, so that the unnecessary vibration of the perturbation mass is suppressed.

If the angular rate sensor is arranged to have the first, second, third, and fourth detecting IDTs so as to detect rotation rate about multiple orthogonal axes, the ends of the perturbation mass both along the x-direction and the y-direction preferably lie off the via hole. In this arrangement, the unnecessary vibration of the perturbation mass is suppressed. In this arrangement, the unnecessary vibration of the perturbation mass is suppressed.

The second electrode also serving as the perturbation mass preferably consists of a single electrode so that a mass density of a region where the second electrode is formed is increased. Therefore, still preferably the second electrode is formed in a rectangular shape in order to increase the mass density of the region where the second electrode is formed. The fact that the mass density of the region where the second electrode is formed is large brings the second electrode to vibrate with large amplitude in a z-direction defined as a piezoelectric film thickness direction. When the thin piezoelectric film rotates, electric current relating to the Coriolis force acting on the second electrode vibrating along the z-direction whose amplitude is proportional to vibrating velocity thereof is generated. Therefore, the larger the amplitude of the vibrating velocity of the second electrode is, the higher the sensitivity of the angular rate sensor is, since the second electrode vibrates in the z-direction with a larger amplitude.

In a modification of the angular rate sensor of this type, a first electrode is formed on the lower surface of the thin piezoelectric film in a region above which the second electrode is disposed.

In this configuration, the first electrode is only formed on the other region above which the detecting IDTs are disposed. Therefore, a region below the detecting IDTs in the thin piezoelectric film can avoid electric fields and elastic acoustic waves because the first electrode is not there below the detecting IDTs.

In a further modification of the angular rate sensor having the second electrode also serving as the perturbation mass, a thin insulator film is formed so as to cover the upper surface of the thin piezoelectric film on which the second electrode is disposed.

Preferably, the thin insulator film is disposed on the upper surface of the thin piezoelectric film over a region on which the second electrode also serving as the perturbation mass is disposed. This arrangement of the thin insulator film enables a reduction of electric current leakage between the first and second electrodes. There is a further advantage of the angular rate sensor of this type where weight of a part of the thin insulator film located below the second electrode contributes to the perturbation mass in addition to the weight of the second electrode so that a high sensitivity of the angular rate sensor is achieved.

Still further, the angular rate sensor according to the present invention, the piezoelectric substrate and the thin piezoelectric film is made of one of aluminum nitride (AlN), zinc oxide (ZnO), zirconate titante (PZT), lead titanate (PT), lithium tantalite (LiTaO$_3$), and lithium tantalite (LT). If the thin piezoelectric film is made of AlN, an integration of the other functional device, such as complementary metal-oxide-semiconductors (CMOS), into the angular rate sensor is possible to achieve without taking account of an environmental metal pollution.

Still further, the angular rate sensor according to the present invention, if at least one of the first electrode or the second electrode also serving as the perturbation mass is made of one of aluminum (Al), aluminum (Al)-silicon (Si) alloy, aluminum (Al)-silicon (Si)-copper (Cu) alloy, and impurity-doped poly-silicon, it is possible to be form the first electrode with a semiconductor production technology with contributing prevention of environmental metal pollution.

Still further, in the angular rate sensor according to the present invention, at least one of the first electrode and the second electrode also serving as the perturbation mass is made of one of aluminum (Al), platinum (Pt), tungsten (W), and rubidium (Ru), mass density of the first and second electrodes is increased so that total weight of the first and second electrodes is grown.

Still further, in the angular rate sensor according to the present invention, it is preferable that the second electrode is composed of a plurality of metallic island films which are connected electrically to each other and are driven simultaneously by an external electric supply.

In this arrangement of the angular rate sensor, elastic acoustic waves generated at individual electrodes composing the second electrode by the Coriolis force are synchronously emphasized. Therefore, high sensitivity of the angular rate sensor is achieved.

Still further, an angular rate sensing device is provided by integrating a plurality of an angular rate sensors into a single device such that a final result of measured angular rate is obtained based on electric signals outputted from the plurality of the angular rate sensors. Therefore, an angular rate sensing device producing an accurate measured result and having high sensitivity is provided.

Still further, an angular rate sensor according to the present invention utilizes elastic acoustic wave generated in elastic materials including piezoelectric film. In the case where the elastic acoustic wave is caused in the piezoelectric film, it is possible to neglect a cutting and propagating direction of a piezoelectric material during manufacturing the angular rate sensor. This fact leads to realize the high sensitivity and high productivity of the angular rate sensor.

BRIEF DESCRIPTION OF THE DRAWINGS

These and other objects, features, and advantages of the invention, its construction and operation will be described in detail based on the accompanying drawings, in which:

FIG. 7A and FIG. 7B show an angular rate sensor according to the second embodiment, wherein FIG. 7A shows a bird's-eye view of the angular rate sensor according to the second embodiment and FIG. 7B shows a cross-sectional view taken along B-B line in FIG. 6A;

FIG. 14 is a flow chart of steps for manufacturing the angular rate sensor shown in FIG. 12 according to the third embodiment of the present invention;

FIG. 17A and FIG. 17B show an angular rate sensor according to the fourth embodiment, wherein FIG. 17A shows a bird's-eye view of the angular rate sensor according to the fourth embodiment and FIG. 14B shows a cross-sectional view taken along C-C line in FIG. 17A;

FIG. 18 is a flow chart of steps for manufacturing the angular rate sensor shown in FIG. 17A and FIG. 17B according to the fourth embodiment of the present invention;

FIG. 20A and FIG. 20B show an angular rate sensor 1 according to the fifth embodiment, wherein FIG. 20A shows a bird's-eye view of the angular rate sensor 1 and FIG. 20B shows a cross-sectional view taken along A-A line in FIG. 20A;

FIG. 29A and FIG. 29B show an angular rate sensor 1 according to the seventh embodiment, wherein FIG. 29A shows a bird's-eye view of the angular rate sensor and FIG. 29B shows a cross-sectional view taken along B-B line in FIG. 29A;

FIG. 30 is a flow chart of steps for manufacturing the angular rate sensor shown in FIG. 29A and FIG. 29B according to the seventh embodiment of the present invention;

FIG. 33A and FIG. 33B show an angular rate sensor according to the eighth embodiment, wherein FIG. 33A shows a bird's-eye view of the angular rate sensor and FIG. 33B shows a cross-sectional view taken along C-C line in FIG. 33A;

FIG. 39A and FIG. 39B show an angular rate sensor according to the ninth embodiment, wherein FIG. 39A shows a bird's-eye view of the angular rate sensor and FIG. 39B shows a cross-sectional view taken along A-A line in FIG. 39A;

FIG. 41A and FIG. 41B show an angular rate sensor according to the first modification of the ninth embodiment, wherein FIG. 41A shows a top view of the angular rate sensor and FIG. 41B shows a cross-sectional view taken along B-B line in FIG. 41A;

FIG. 42A and FIG. 42B show an angular rate sensor according to the second modification of the ninth embodiment, wherein FIG. 42A shows a top view of the angular rate sensor and FIG. 42B shows a cross-sectional view taken along C-C line in FIG. 42A;

FIG. 44A and FIG. 44B show an angular rate sensor according to the fourth modification of the ninth embodiment, wherein FIG. 44A shows a bird's-eye view of the angular rate sensor and FIG. 44B shows a top view;

DETAILED DESCRIPTION OF THE PREFERRED EMBODIMENTS

In order to describe the present invention in more detail, the various embodiments of the present invention will now be described hereafter with references to accompanying drawings.

First Embodiment

Description of a first embodiment of the present invention will be made with reference to FIGS. 1 to 6.

Figure 1A:
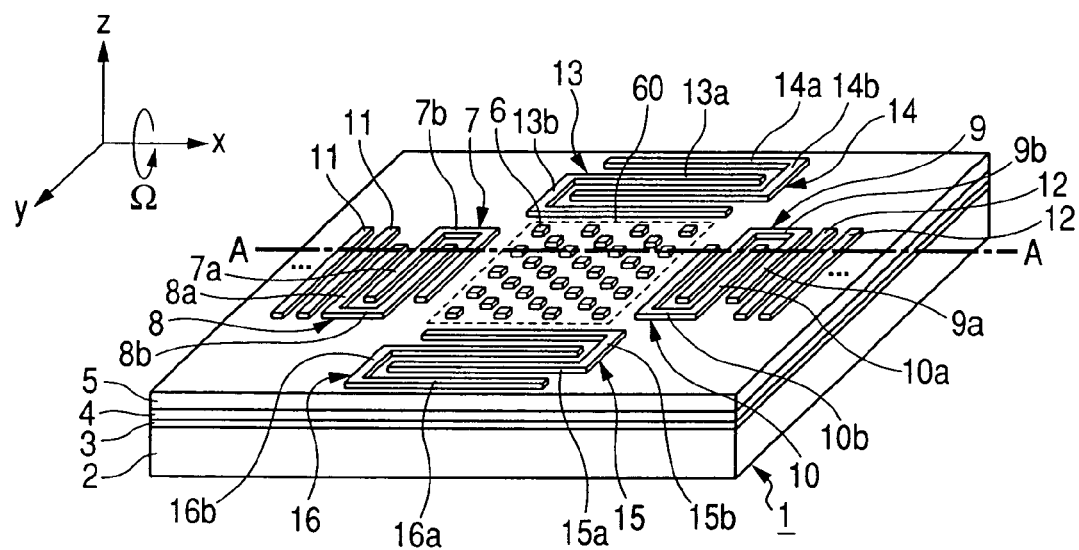
FIG. 1A and FIG. 1B show a structure of an angular rate sensor according to a first embodiment of the present invention.
Figure 1B:
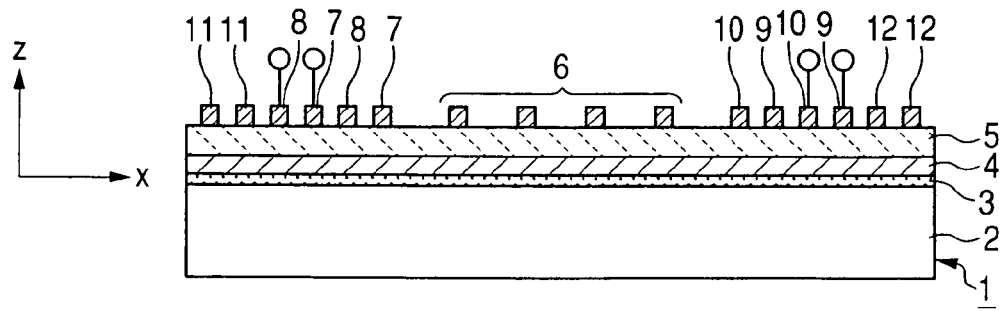

FIG. 1A and FIG. 1B show a structure of an angular rate sensor 1 according to a first embodiment of the present invention. FIG. 1A is a bird's-eye view of the angular rate sensor 1 and FIG. 1B is a cross-sectional view thereof taken along line A-A in FIG. 1A.

As shown in FIG. 1B, the angular rate sensor 1 includes a semiconductor substrate 2 having an upper surface. The semiconductor substrate is made of, for example, silicon. It is preferable that the thickness of the semiconductor substrate is larger than 400 μm. The angular rate sensor 1 has sensing components disposed on the upper surface of the semiconductor substrate 2.

An thin insulator film 3 is formed on the upper surface of the semiconductor substrate 3 so as to cover a whole surface of the semiconductor substrate 3. The thin insulator film is made of silicon oxide ($SiO_2$), for example. The thickness of the thin insulator film is thicker than 1 μm. On an opposite surface of the thin insulator film to that connecting to the semiconductor substrate 3, a first electrode 4 of several hundreds nanometer in thickness is formed. The first electrode 4 is composed of one of impurity doped poly-silicon, aluminum (Al), aluminum-base alloy, titanium (Ti), titanium-base alloy, tungsten, tungsten-base alloy, molybdenum, and molybdenum-base alloy with the semiconductor production technology for very-large-scale integrated circuits (VLSIs) while taking into account of an environmental metal pollution.

A piezoelectric film 5 is disposed on the first electrode 4 so as to cover the whole surface of the first electrode 4. The thickness of the piezoelectric film 5 is about several micrometers. For example, the piezoelectric film 5 is made of aluminum nitride (AlN) or zinc oxide (ZnO), but also of a piezoelectric and ferroelectric film such as $PTZ:Pb(ZrTi)O_3$, $PT:PbTiO_3$, and the like. In the case where the piezoelectric film is made of aluminum nitride (AlN), another functional device, such as a complementary metal-oxide-semiconductors (CMOS), is possible to integrate into the angular rate sensor while the issue of environmental metal pollution is taken into account.

Further, perturbation masses 6, driving electrodes 7-10, reflectors 11, 12, and detecting electrodes 13-16 are disposed on the piezoelectric film 5. A plurality of the driving electrodes constructs a driving inter-digital transducer (hereinafter, "driving IDT"). Similarly, a plurality of the detecting electrodes constructs a detecting inter-digital transducers (hereinafter, "detecting IDTs")

The driving electrodes 7-10 are used to excite an elastic acoustic wave in order to cause a standing wave on which a Coriolis force acts when the angular rate sensor is rotated. Each of the driving electrodes 7-10 is constructed by a comb-shaped electrode. The driving electrodes 7-8 and the driving electrodes 9-10 are separated at predetermined space defined by a frequency of the standing wave, respectively. Each of the detecting electrodes 13-16 is also constructed by a comb-shaped electrode. The reflectors 11, 12 serves to repeatedly reflect the elastic acoustic waves caused by the driving IDTs 13-16 so as to excite the standing wave between the reflectors 11, 12.

The perturbation masses 6, the driving electrodes 7-10, the reflectors 11, 12, and the detecting electrodes 13-16, are made of one of impurity doped poly-silicon, aluminum (Al), aluminum-base alloy, titanium (Ti), titanium-base alloy, tungsten, tungsten-base alloy, molybdenum, and molybdenum-base alloy. If the driving electrodes 7-10, the reflectors 11, 12, and the detecting electrodes 13-16, are made of any one of impurity doped poly-silicon, aluminum (Al), and Al—Si—Cu with the semiconductor production technology for VLSIs, it is not necessary to take into account the environmental metal pollution during manufacturing the angular rate sensor. If the perturbation mass 6 is made of metals or metallic alloys including platinum (Pt), tungsten (W), and gold (Au). In such a configuration of the perturbation masses 6, the Coriolis force acting on the perturbation masses 6 is emphasized so as to increase the displacement of the perturbation masses 6. In consequence, it is possible to realize an angular rate sensor having high sensitivity.

As shown in FIG. 1A, the perturbation masses 6 are composed of metallic dots and are scattered over a predetermined region 60 on the piezoelectric film 5. Each of the perturbation masses 6 are formed in the shape of a square as seen from the top view. The perturbation masses 6 are arrayed so as to from a staggered lattice which is covered by the predetermined region 60.

More concretely, consider that the perturbation masses 6 lie in an x-y plane, in which the x-axis runs from the reflector 11 to another one 12, and the y-axis runs from the detecting electrodes 13, 14 to another ones 15, 16. The perturbation masses 6 are interlaced in both the x-direction and y-directions such that the elastic acoustic waves generated by the Coriolis force are coherently superposed. When the Coriolis force acts on the perturbation masses 6, the perturbation masses which are in alignment along the y-direction vibrate coherently and the perturbation masses 6 in the neighboring row in the x-direction vibrate coherently with the inverse phase since the perturbation masses 6 is located from every metallic dots by $\lambda_1/2$ in the x-direction and by $\lambda_2/2$ in the y-direction, where $\lambda_1$ is a wavelength of the standing wave caused by the driving electrodes 7-10 and organized by the reflectors 11, 12, and $\lambda_2$ is a wavelength of an elastic acoustic wave generated by the Coriolis force acting on the perturbation masses 6. So, when the angular rate sensor 1 rotates about the x-axis with rotation rate $\vec{\Omega}_x$, then each of the perturbation masses 6 experiences an acceleration of $2\vec{v} \times \vec{\Omega}_x$, in the y-direction, where $\vec{v}$, is the velocity vector of particle on which the individual perturbation masses 6 is disposed.

The driving electrodes 7-10 are arranged on the piezoelectric film 5 so that the predetermined region 60 is sandwiched between the driving electrodes 7-8 and the driving electrodes 9-10 in the x-direction and is sandwiched between the detecting electrodes 13-14 and the detecting electrodes 15-16 in the y-direction. The driving electrodes 7-10 are connected to the electric power supply (not shown) via driving-voltage supply lines consisting of bonding wires and the like, and are supplied electric driving voltage from the electric power supply. Driving voltage is applied between the driving electrodes 7-10 and the first electrode 4 so as to excite vibration of the driving electrodes 7-10 in the z-direction, i.e., in the perpendicular direction to the surface of the piezoelectric film 5, as in FIGS. 1A and 1B due to the piezoelectric effect by which the electric power is converted into the mechanical deformation energy.

The driving electrodes 7, 8 are coupled for constituting a first driving inter-digital transducer (driving IDT). Each driving electrodes 7, 8 is formed in a comb-shape, that is, the driving electrodes 7, 8 include tooth components 7a, 8a, which are disposed to be parallel to the y-axis and connecting components 7b, 8b, which are disposed to be perpendicular to the y-direction and serves as connectors of a plurality of the tooth components 7a, 8a. The first driving IDT composed of the driving electrodes 7, 8, is positioned on a side of the predetermined region 60 on which the perturbation masses 6 are disposed. In the driving electrodes 7, 8, the tooth components 7a, 8a, are arranged to be interlaid with each other. The connecting components 7b, 8b, are located face to face across the tooth components 7a, 8a. A spacing of tooth components 7a, 8a, of the driving electrodes 7, 8, in the x-direction determines a wavelength of an elastic acoustic wave generated by the first driving IDTs 7, 8, themselves.

Similarly to the driving electrodes 7, 8, the driving electrodes 9, 10 are coupled for constituting a second driving inter-digital transducer (driving IDT). The second driving IDT composed of detecting electrodes 9, 10, is positioned on an opposite side of the predetermined region 60 to the first driving IDT composed of the detecting electrodes 7, 8. Each driving electrodes 9, 10 is formed in a comb-shape. The driving electrodes 9, 10 include tooth components 9a, 10a, which are disposed to be parallel to the y-axis and connecting components 9b, 10b, which are perpendicular to the y-direction. The connecting components 9b, 10b bridge the tooth components 9a, 10a, thereby. As is the case of the driving electrodes 7, 8, the tooth components 9a, 10a, are arranged to be interlaid with each other and located to be spaced apart with a periodicity of one half the wavelength of the elastic acoustic wave generated by the driving IDTs 7-10 themselves.

The reflectors 11, 12 are disposed on the surface of the piezoelectric film 5 such that the perturbation masses 6 and the driving electrodes 7-10 are located between the reflector 11 and 12 along the x-direction. The reflectors 11, 12 are disposed on the piezoelectric film 5 and fabricated in a rod shape. A longitudinal direction of both reflectors 11, 12 runs parallel to the y-axis, that is, to the tooth components 7a-10a of the driving electrodes 7-10.

The detecting electrodes 13, 14 are coupled in order to contribute a first detecting inter-digital transducer (detecting IDT). The detecting electrodes 13, 14 are located on the piezoelectric film 5. Each detecting electrodes 13, 14 is formed in a comb-shape. The detecting electrodes 13, 14 include tooth components 13a, 14a, which are disposed to be parallel to the x-axis and further include connecting components 13b, 14b, which are perpendicular to the x-direction. The connecting components 13b, 14b bridge the tooth components 13a, 14a, thereby. The tooth components 13a, 14a, are arranged to be interlaid with each other and located to be spaced apart with a periodicity of one half the wavelength of the elastic acoustic wave generated by the Coriolis force.

Similarly to the detecting electrodes 13, 14, the detecting electrodes 15, 16 are coupled in order to constitute a second detecting inter-digital transducer (detecting IDT). The detecting electrodes 15, 16 are located on the piezoelectric film 5. Each detecting electrodes 15, 16 is formed in a comb-shape. The detecting electrodes 15, 16 include tooth components 15a, 16a, which are disposed to be parallel to the y-axis and further include connecting components 15b, 16b, which are perpendicular to the y-direction. The connecting components 15b, 16b bridge the tooth components 15a, 16a, thereby. The tooth components 15a, 16a, are arranged to be interlaid with each other and located to be spaced apart with a periodicity of one half the wavelength of the elastic acoustic wave generated by the Coriolis force.

The perturbation masses 6, the driving electrodes 7-10, reflectors 11, 12, the detecting electrodes 13-16 consist of a sensing unit of the angular rate sensor 1 according to the first embodiment of the present invention.

In the following, the operations of the angular rate sensor 1 according to the first embodiment of the present invention will be described.

Figure 2:
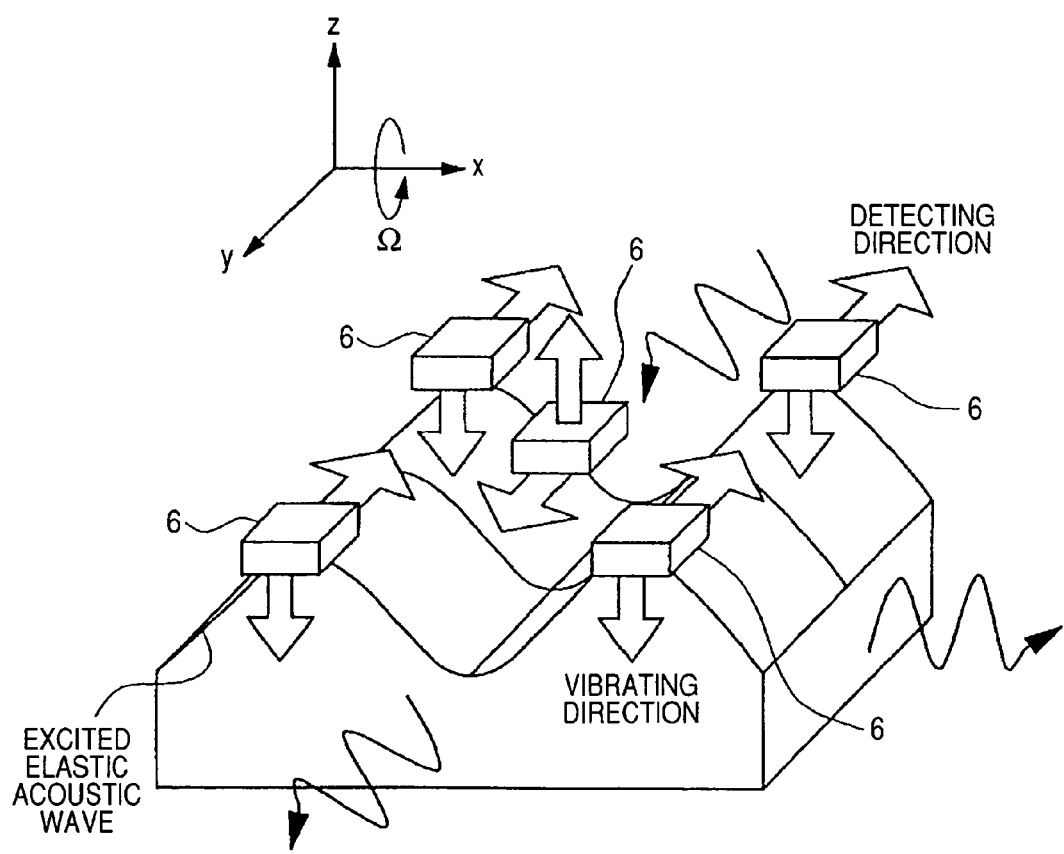
FIG. 2 shows a Coriolis force acting on each of the perturbation masses produces, if the angular rate sensor according to the first embodiment of the present invention undergoes a rotary motion while an elastic acoustic waves of the piezoelectric film is generated by the driving electrodes.

As shown in FIG. 2, if the angular rate sensor 1 according to the first embodiment of the present invention undergoes a rotary motion while an elastic acoustic waves caused at least in the piezoelectric film 5 is generated by the driving electrodes 7-10, the rotation perpendicular to the vibrating velocity of each of the perturbation masses 6 produces the Coriolis force in the direction perpendicular to both directions. The elastic acoustic wave is sometimes caused in the first electrode 4, and a surface of the semiconductor substrate in addition to the piezoelectric film 5. Generally, the elastic acoustic wave penetrates an elastic material in order of one wave length depth from the driving electrodes 7-10.

In the angular rate sensor 1 according to this embodiment, the sensing unit is driven by applying a driving voltage to the driving electrodes 7-10. For example, an alternating current (AC) voltage +B[V] is supplied to the driving electrodes 7 and 9, whereas an alternating current (AC) voltage −B[V] is applied to the driving electrodes 8 and 10. In other words, the phase of the AC voltage applied to the driving electrodes 7 and 9 is different by a half of the periodicity of the driving AC voltage from that applied to the driving electrodes 8 and 10. If necessary, the first electrode 4 is established a ground so that a difference in an electric potential between the driving electrodes 7-10 and the first electrode 4 is generated. This means that electric fields exist in the piezoelectric film 5 which has the lower surface covering the first electrode 4 and has the upper surface on which the driving electrodes 7-10 are disposed. By the piezoelectric effect, the driving electrodes 7-10 are vibrated in the z-direction so that elastic acoustic waves are caused and propagated along the x-direction.

The operating frequency of the angular rate sensor 1 is determined by the separation of the driving electrodes 7-10, physical characteristics of the piezoelectric film 5 and the semiconductor substrate 2, for example, a silicon substrate and so on. The driving electrodes 7-10 generate an elastic acoustic wave of the piezoelectric film having a frequency ranging from several MHz to several hundreds MHz.

In contrast to a usual case where a propagating wave is generated in a transmission channel, the driving electrodes 9, 10 and the reflectors 11, 12 reflect the propagating wave generated by the driving electrodes 7-10 and confine the propagating wave into the transmission channel to establish a first standing wave in the piezoelectric film. The plurality of the perturbation masses 6 is arranged to locate at the antinodal points of this standing wave in order to amplify the magnitude of the Coriolis force to excite an elastic acoustic wave orthogonal to both directions of the first standing wave and the Coriolis force and therefore to improve the sensitivity of the angular rate sensor.

If each perturbation mass 6 has a mass, m, and a velocity of each perturbation mass 6, $\vec{v}$, when the angular rate sensor 1 undergoes a rotary motion with an angular rotation $\vec{\Omega}$ perpendicular to the direction of the velocity of each perturbation mass 6. $\vec{v}$, causes the Coriolis force $\vec{F}$ perpendicular to the directions of both the vibrating motion $\vec{v}$, and the angular rotation $\vec{\Omega}$ Where the velocity of each perturbation mass 6, $\vec{v}$, and the angular rotation $\vec{\Omega}$ Thus, the effect of the Coriolis force is written in a form, $$\vec{F} = 2m \vec{v} \times \vec{\Omega}$$

Where a symbol "×" in the above equation represents an external product. If it is assumed that the resonant frequency of the first standing wave is $\vec{\omega}(=2\pi f_0)$ and the amplitude of the first standing wave is written by r, thus, the velocity of each perturbation mass 6, $\vec{v}$, can be written by $\vec{v} = r\vec{\omega}$ In this case, the elastic acoustic wave generated by the driving electrodes 7-10 is rectified by reflecting back and forward between the reflectors 11, 12, so as to synchronize the frequency of the first standing wave with that of the of the externally applied Ac voltage.

Since the perturbation masses 6 are arranged to form a staggered lattice so as to act the Coriolis force effectively, a coherent alternating force generated at each perturbation mass 6 by the Coriolis force creates another vibrating motion of each perturbation mass 6 in the y-direction. In other words, the Coriolis force generates a second propagating wave in the piezoelectric film 5 along the y-direction. In the y-direction, the detecting electrodes 13-16 are positioned at both sides of the predetermined region 60 on which the perturbation masses 6 are disposed. The second propagating wave is sensed by the detecting electrodes 13-16 as an electric signal converted due to the piezoelectric effect. Therefore, the angular rotation $\vec{\Omega}$ can be obtained.

In the angular rate sensor 1 according to this embodiment, the first electrode 4 is formed so as to be covered by the piezoelectric film 5. Above a region on which the first electrode 4 is formed, the predetermined region 60 on which the perturbation masses 6 are disposed is located.

Figure 3:
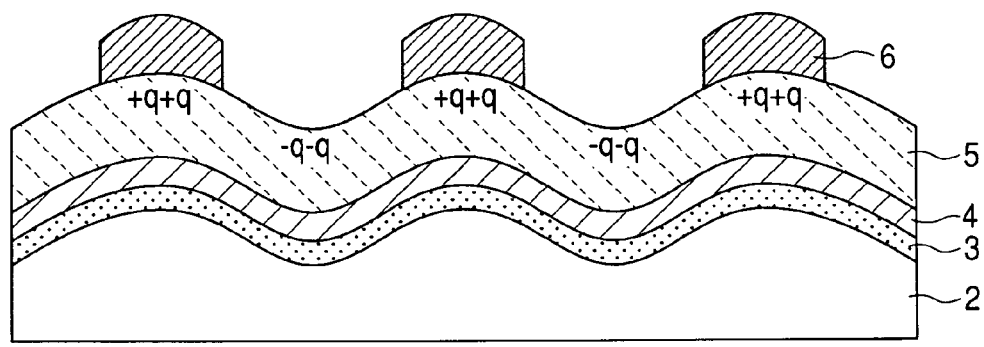
FIG. 3 shows a cross-sectional view of the angular rate sensor according to the first embodiment taken along line A-A in FIG. 1A.

FIG. 3 shows a cross-sectional view of the angular rate sensor 1 according to this embodiment taken along line A-A in FIG. 1A while the first standing wave is excited in the piezoelectric film 5 so that a stress force is generated in the piezoelectric film 5 due to the piezoelectric effect. Due to this stress force generated in the piezoelectric film 5, a polarization in the piezoelectric film 5 along the z-direction is exhibited such that positively or negatively charged regions near the upper surface of the piezoelectric film 5 appears wherein a sign of the electric charge is depended on a piezoelectric constant of the material making the piezoelectric film 5. An oppositely charged region also appears near the lower surface of the piezoelectric film 5.

However, the angular rate sensor 1 according to this embodiment includes the first electrode 4 on which the piezoelectric film 5 is formed. Thus, near the lower surface of the piezoelectric film 5, the polarization exhibited due to the first standing wave in the piezoelectric film is neutralized via the first electrode 4. Therefore, even if surface electric charge is generated at the lower surface of the piezoelectric film 5 connecting to the first electrode 4, surface electric charge escapes from the piezoelectric film 5 and thus is neutralized via the first electrode 4. Therefore, limitations of an amount of a displacement of the vibrating particle in the piezoelectric film 5 and each perturbation mass 6 vibrating in the z-direction due to the polarization in the z-direction of the piezoelectric film 5 are eliminated.

When the angular rate sensor 1 undergoes a rotary motion with an angular rotation $\vec{\Omega}$ under which each perturbation mass 6 has a vibrating velocity vector $\vec{V}_r$, the Coriolis force whose amplitude is proportional to the vibrating velocity $\vec{V}_r$, acts on particles in the piezoelectric film 5 and the perturbation masses 6. Thus, an addition to the limitations of an amount of a displacement of the vibrating particle in the piezoelectric film 5 and each perturbation mass 6 vibrating in the z-direction due to the polarization in the z-direction of the piezoelectric film 5, limitations of a vibrating velocities of the vibrating particle in the piezoelectric film 5 and each perturbation mass 6 are removed. In consequence, it is possible to realize an angular rate sensor having high sensitivity.

A method for fabricating the angular rate sensor 1 with production technology for very-large-scale integrated circuits (VLSIs) will be described.

Figure 4:
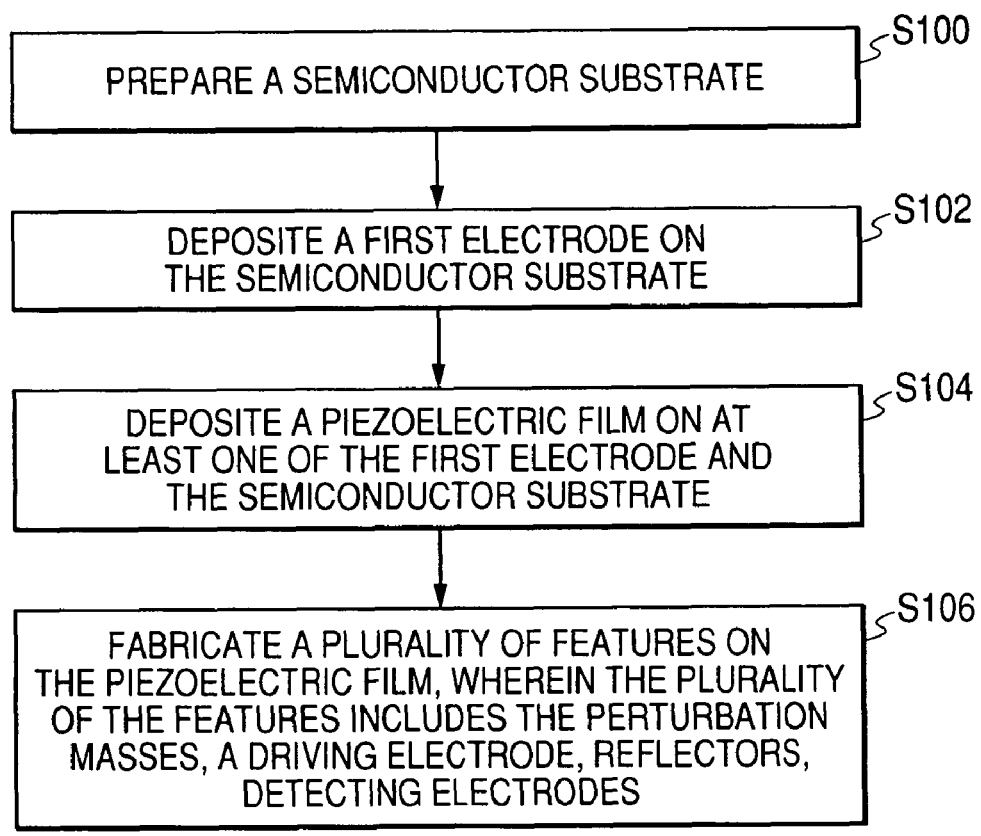
FIG. 4 is a flow chart of steps for manufacturing the angular rate sensor shown in FIG. 1A and FIG. 1B according to the first embodiment of the present invention.

FIG. 4 shows a flow chart of steps for manufacturing the angular rate sensor 1 includes a preparing step (S100) for preparing the semiconductor substrate 2, a first electrode forming step (S102) for depositing the first electrode 3 on the semiconductor substrate 2 at least over a region above which perturbation masses 6 is formed, a piezoelectric film forming step (S104) for depositing the piezoelectric film 5 on at least one of the first electrode 3 and the semiconductor substrate 2, and a fabricating step (S106) for fabricating a plurality of features on the piezoelectric film 5, wherein the plurality of features includes the perturbation masses 6, a driving electrode 7-10 for causing a elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave with production technology for very-large-scale integrated circuits (VLSIs).

Figure 5A:
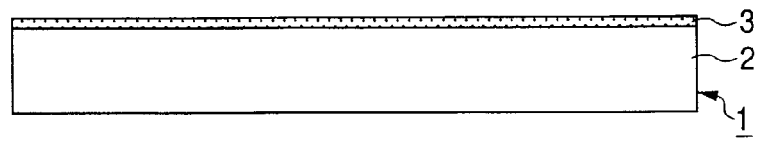
FIGS. 5A to 5C illustrate the steps performed in the method for manufacturing the angular rate sensor according to the first embodiment.
Figure 5B:
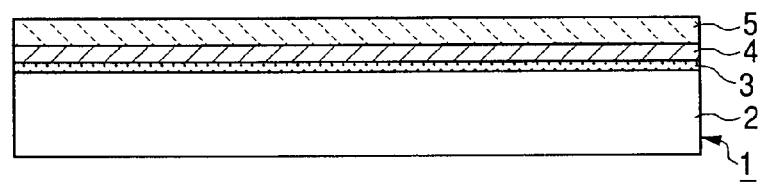
Figure 5C:
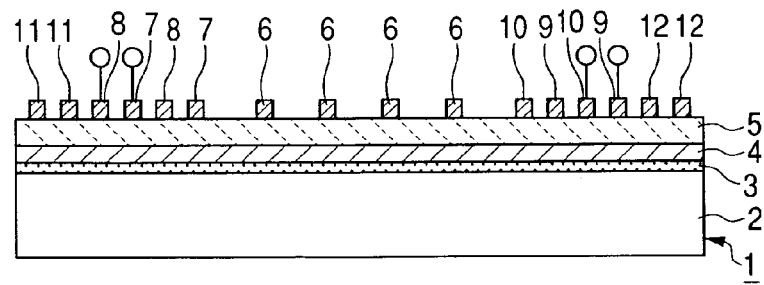

FIGS. 5A to 5C illustrate the steps performed in the method for manufacturing the angular rate sensor 1.

First, a (100)-oriented silicon substrate of 400 μm thickness is prepared (S100 in FIG. 4). The thickness of a silicon substrate is not so important, therefore silicon substrate being thicker than 400 μm is not forbidden. As for the substrate, it is possible to use not only a single crystal substrate made of single crystal such as silicon or sapphire, but also a substrate other than a single crystal, such as a glass substrate, a polycrystalline ceramic substrate, a metal substrate or a resin substrate. Using the semiconductor substrate such as silicon has an advantage that it is possible to integrate the angular rate sensor 1 and an external driving circuit thereof into a single device so that a large-scale integration can be achieved.

Next, as shown in FIG. 4A, a thin silicon dioxide film which is thinner than 1 μm is grown on the silicon substrate. The silicon dioxide film is formed, for example, by sputtering.

As shown in FIG. 4B, a several hundreds nanometer thick film of impurity-doped polycrystalline silicon is deposited by low pressure chemical vapor deposition (LPCVD) for forming a first electrode 4 (S102 in FIG. 4). For example, phosphor-doped polycrystalline silicon is used for the first electrode 4. In this case, phosphor-doped polycrystalline silicon film is patterned using reactive ion etching technique with a fluoride-based gas. If the first electrode 4 is composed of one of aluminum (Al), aluminum-base alloy, titanium (Ti), titanium-base alloy, tungsten, tungsten-base alloy, molybdenum, and molybdenum-base alloy, sputtering technique is suitable one for depositing the first electrode 4 on the semiconductor substrate 3.

In the next step, a several micrometer thick film of a piezoelectric film such as aluminum nitride (AlN), zinc oxide (ZnO), zirconate titante (PZT), lead titanate (PT), lithium tantalite ($LiTaO_3$), and lithium tantalite (LT), is disposed so as to cover the whole region of an upper surface of the first electrode 4 (S104 in FIG. 4). If an aluminum nitride (AlN) film is used as the first electrode 4, the AlN film is patterned by a tetra methyl ammonium hydroxide-based solvent.

Then, as shown in FIG. 4C, a several hundreds thick film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the perturbation masses 6, the driving electrodes 7-10, reflectors 11, 12, and the detecting electrodes 13-16 on an upper surface of the piezoelectric film 5 (S105 in FIG. 4). Further, the supplying driving voltage lines and ground lines are formed and connected to the driving electrodes 7-10, reflectors 11, 12, and the detecting electrodes 13-16 by wire bonding.

In the angular rate sensor 1 having the first electrode 4 sandwiched between the semiconductor substrate 3 and the piezoelectric film 5, the polarization in the z-direction can be suppressed even if an inner stress in the piezoelectric film 5 is generated by the Coriolis force acting on vibrating particles in the piezoelectric film 5 and then the inner stress generates an electric field in the z-direction which is a origin of a surface electric charge, i.e., the electric polarization of the piezoelectric film 5 in the z-direction due to neutralization effect by the first electrode 4. In more detail, if surface electric charge is generated at the lower surface of the piezoelectric film 5 connecting to the first electrode 4, surface electric charge escapes from the piezoelectric film 5 and thus is neutralized via the first electrode 4. Therefore, a limitation of an amount of a displacement of the vibrating particle in the piezoelectric film 5, especially of the perturbation masses 6 vibrating in the z-direction due to the polarization in the z-direction of the piezoelectric film 5 is eliminated. In consequence, it is possible to realize an angular rate sensor having high sensitivity.

Further, the angular rate sensor 1 according to this embodiment, the first electrode 4 is formed below the driving electrodes 7-10 via the piezoelectric film 5. Therefore, there exits electric fields between the driving electrodes 7-10 and the first electrode 4 generated by the externally driving AC voltage so that it is possible to vibrate the driving electrodes 7-10 with a larger amplitude in the z-direction. In consequence, it is possible to realize an angular rate sensor having high sensitivity.

Further, a basic structure of the angular rate sensor 1 according to this embodiment on which the driving electrodes 7-10, reflectors, 11, 12, and the detecting electrodes 13-16 take, resembles that taken by the prior arts. Hence, it becomes possible to reduce a size of the angular rate sensor because a necessary size for obtaining a sufficient sensitivity becomes smaller due to higher sensitivity of the angular rate sensor 1 according to this embodiment. Therefore the angular rate sensor having high sensitivity can be miniaturized with production technology for very-large-scale integrated circuits (VLSIs).

Further it is preferable that the perturbation masses 6 are made of metal or metallic alloy whose mass density is greater than 13.5 g/cm$^3$. The metals or metallic alloys being suitable ones for the perturbation masses or the perturbation weight include platinum (Pt), tungsten (W), and gold (Au). In such a configuration of the perturbation masses 6, the Coriolis force acting on the perturbation masses 6 is emphasized so as to increase the displacement of the perturbation masses 6t in the z-direction. In consequence, it is possible to realize an angular rate sensor having high sensitivity. Further the angular rate sensor having high sensitivity can be miniaturized with production technology for very-large-scale integrated circuits (VLSIs).

Further it is easy to be recommended for size reduction of the device or integration an angular rate sensor 1 and an external driving circuit thereof into an integrated device since the angular rate sensor 1 according to this embodiment use the semiconductor substrate 2 such as silicon substrate.

Modification of First Embodiment

Figure 6:
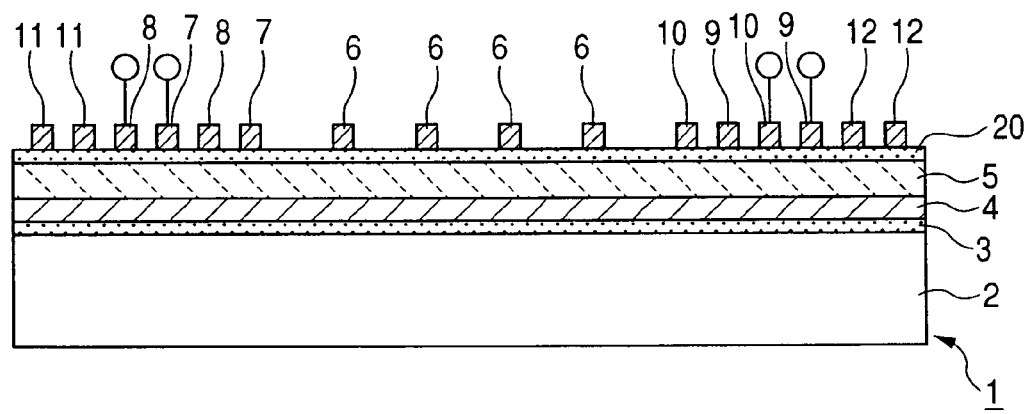
FIG. 6 shows a cross-sectional view of the angular rate sensor according to the modification of the first embodiment taken along line A-A in FIG. 1A.

FIG. 6 shows a cross-sectional view of the angular rate sensor 1 according to the modification of the first embodiment taken along line A-A in FIG. 1A.

In the first embodiment described above in which the perturbation masses 6, the driving electrodes 7-10, the reflectors 11, 12, and the detecting electrodes 13-16 are disposed directly on the upper surface of the piezoelectric film 5, if necessary, an thin insulator film 20 is formed and inserted between the upper surface of the piezoelectric film 5 and the perturbation masses 6, the driving electrodes 7-10, the reflectors 11, 12, and the detecting electrodes 13-16. In this configuration, the perturbation masses 6, the driving electrodes 7-10, the reflectors 11, 12, and the detecting electrodes 13-16 are disposed on the thin insulator film 20. It is especially preferable in a case where the piezoelectric film 5 is made of AlN that the thin insulator film 20 is formed on the supper surface of the piezoelectric film 5 in order to suppress a leakage electric current flowing along the z-direction in the piezoelectric film 5 from the driving electrodes 7-10 toward the first electrode 4, when the driving AC voltage is supplied between the driving electrodes 7-10 and the first electrode 4.

Second Embodiment

Referring to FIGS. 7A-11, an angular rate sensor according to the second embodiment of the present invention will now be explained. In this second embodiment, the identical components in structure to those in the first embodiment are assigned to the same reference numerals for simplicity and the description of these components are omitted from the detailed explanations.

The angular rate sensor according to the second embodiment has a structure capable of improving a neutralization effect of the surface charge generated at the upper and lower surfaces of the piezoelectric film 5 while the elastic acoustic wave is excited in the piezoelectric film 5 by the applying the driving AC voltage between the driving electrodes 7-10 and the first electrode 4. Thus, since the operating principle of the angular rate sensor is the same to that of the angular rate sensor according to the first embodiment, the difference of the angular rate sensor according to this embodiment from that according to the first embodiment will be described.

Figure 7A:
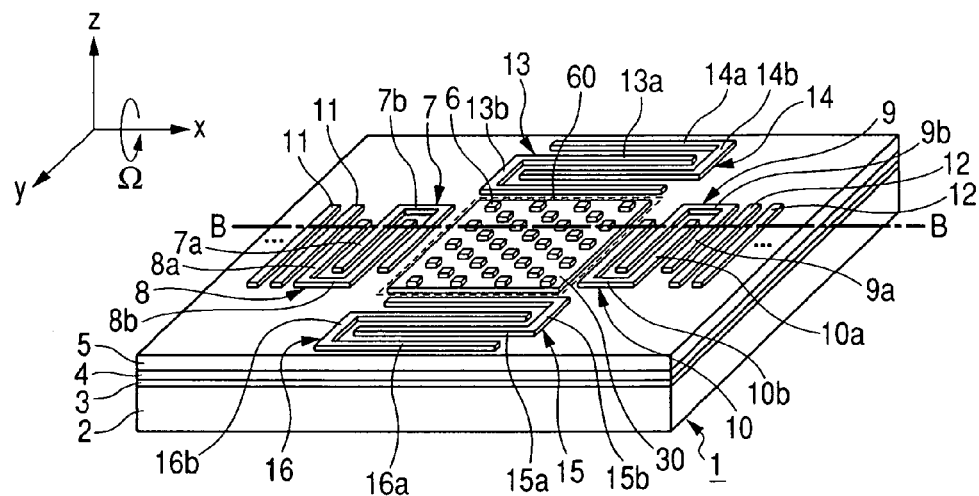
Figure 7B:
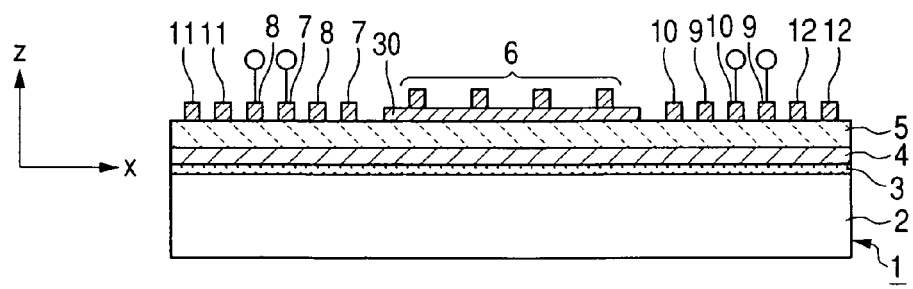

FIG. 7A and FIG. 7B show an angular rate sensor 1 according to the second embodiment. FIG. 7A shows a bird's-eye view of the angular rate sensor 1 and FIG. 7B shows a cross-sectional view taken along B-B line in FIG. 7A.

As shown in FIG. 7A, an angular rate sensor in this embodiment further comprises a second electrode 30 disposed on the upper surface of the piezoelectric film 5. This configuration is enabled to neutralize a surface charge generated at the upper surface of the piezoelectric film 5. In more detail, the second electrode 30 is disposed on the piezoelectric film 5 so as to cover a predetermined region 60 on which the perturbation masses 6 are formed.

Figure 8:
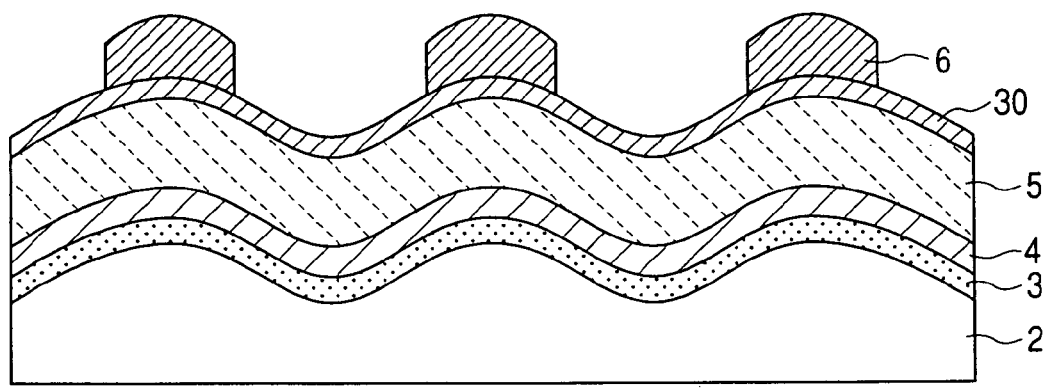
FIG. 8 shows a cross sectional view illustrating a snap shot of vibrating components of the angular rate sensor according to the second embodiment.

FIG. 8 shows a cross sectional view illustrating a snap shot of vibrating components of the angular rate sensor 1 when the angular rate sensor 1 undergoes a rotary motion after the first standing wave is caused at least in the piezoelectric film 5.

In the angular rate sensor 1 having the second electrode 30 sandwiched between the piezoelectric film 5 and the perturbation masses 6, the polarization in the z-direction can be suppressed due to neutralization effect by the second electrode 30 even if an inner stress in the piezoelectric film 5 is generated by the Coriolis force acting on vibrating particles in the piezoelectric film 5. The inner stress generates an electric field in the z-direction which causes a surface electric charge at an upper and a lower surface of the piezoelectric film or an electric polarization of the piezoelectric film in the z-direction. In more detail, if surface electric charge is generated at the upper surface of the piezoelectric film 5 connecting to the second electrode 30, surface electric charge escapes from the piezoelectric film 5 and thus is neutralized via the second electrode 30. Therefore, a limitation of an amount of a displacement of the vibrating particle in the piezoelectric film 5, especially of the vibrating perturbation masses 6 in the z-direction due to the polarization in the z-direction of the piezoelectric film 5, is eliminated. In consequence, it is possible to realize an angular rate sensor having high sensitivity. Further the angular rate sensor having high sensitivity can be miniaturized with production technology for very-large-scale integrated circuits (VLSIs).

A method for fabricating the angular rate sensor 1 according to the second embodiment with production technology for very-large-scale integrated circuits (VLSIs) will be described.

Figure 9:
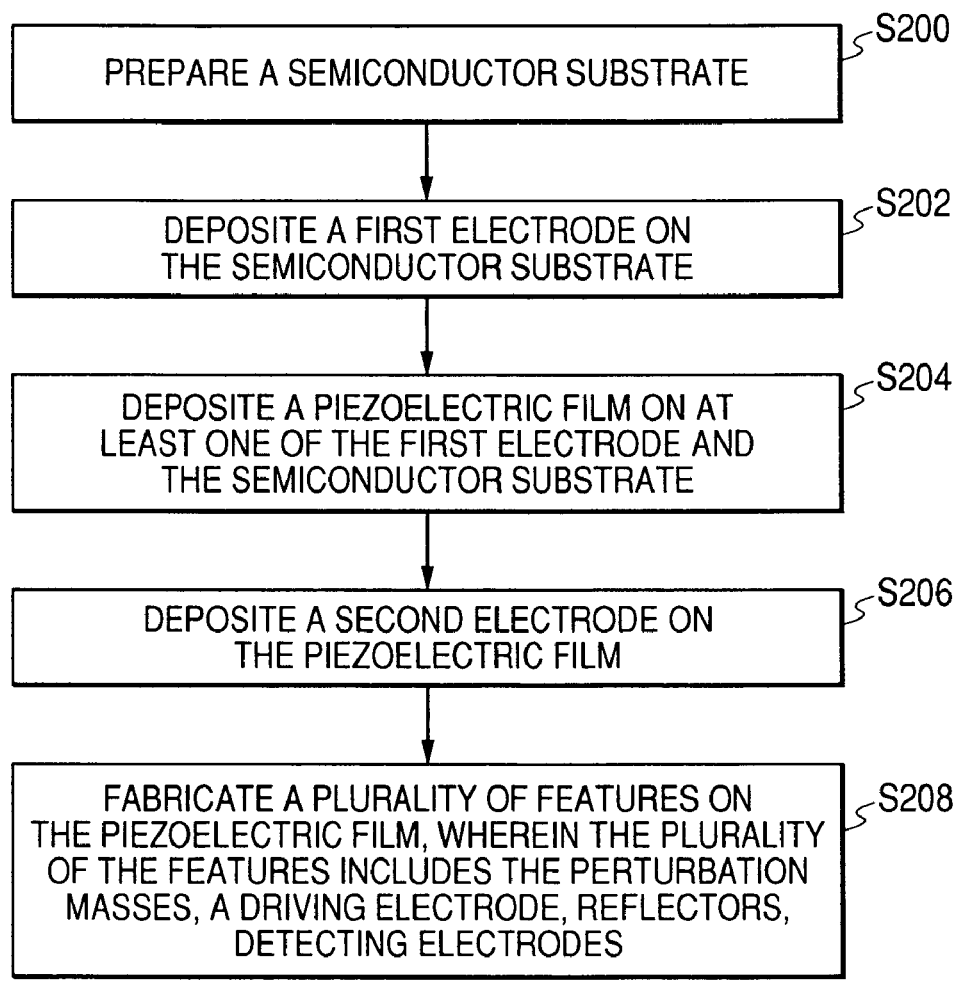
FIG. 9 is a flow chart of steps for manufacturing the angular rate sensor shown in FIG. 7A and FIG. 7B according to the second embodiment of the present invention.

FIG. 9 shows a flow chart of steps for manufacturing the angular rate sensor 1 includes a preparing step (S200) for preparing the semiconductor substrate 2, a first electrode forming step (S202) for depositing the first electrode 3 on the semiconductor substrate 2 at least over a region above which perturbation masses 6 is formed, a piezoelectric film forming step (S204) for depositing the piezoelectric film 5 on at least one of the first electrode 3 and the semiconductor substrate 2, a second electrode forming step (S206) for depositing the second electrode 30 on the upper surface of the piezoelectric film 5, and a fabricating step (S208) for fabricating a plurality of features on the piezoelectric film 5, wherein the plurality of features includes the perturbation masses 6, a driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave with production technology for very-large-scale integrated circuits (VLSIs).

FIGS. 10A to 10D illustrate the steps performed in the method for manufacturing the angular rate sensor 1 according to this embodiment.

First, as in the method for manufacturing the angular rate sensor according to the first embodiment, a 400 μm or the more thick (100)-oriented silicon substrate is prepared (S200 in FIG. 9).

Figure 10A:
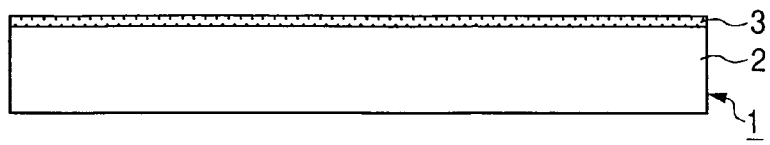
FIGS. 10A to 10D illustrate the steps performed in the method for manufacturing the angular rate sensor according to the second embodiment.

Next, as shown in FIG. 10A, a thin silicon dioxide film which is thinner than 1 μm is grown on the silicon substrate in the same way shown in FIG. 4A.

Figure 10B:
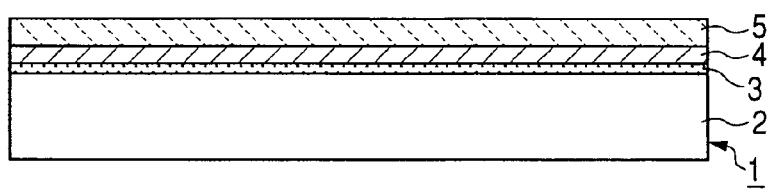

As shown in FIG. 10B, a several hundreds nanometer thick film of impurity-doped polycrystalline silicon is deposited in the same way shown in FIG. 4B (S202 in FIG. 9). This thick film becomes to a first electrode 4. The first electrode 4 has an upper surface which is an opposite surface connecting the silicon substrate.

In the next step, a several micrometer thick film of a piezoelectric film such as aluminum nitride (AlN), zinc oxide (ZnO), zirconate titante (PZT), lead titanate (PT), lithium tantalite (LiTaO$_3$), and lithium tantalite (LT), is disposed so as to cover the whole region of an upper surface of the first electrode 4 (S204 in FIG. 9). If an aluminum nitride (AlN) film is used as the first electrode 4, the AlN film is patterned by a tetra methyl ammonium hydroxide-based solvent.

Figure 10C:
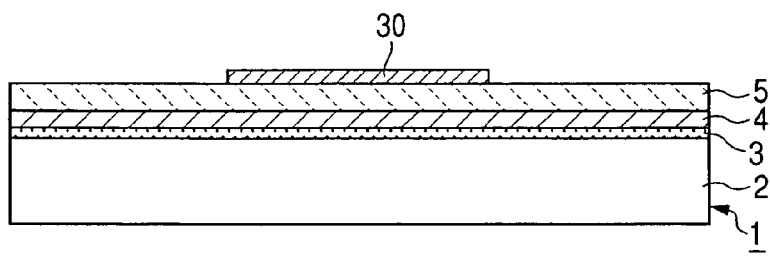

Then, as shown in FIG. 10C, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited on the piezoelectric film 5 using an e-beam evaporator, and patterned by a phosphoric (H$_3$PO$_4$)-based acid to form the second electrode 30. Thus, the second electrode 30 is formed (S206 in FIG. 9). The second electrode 30 has an upper surface which is an opposite surface connecting with the piezoelectric film 5.

Figure 10D:
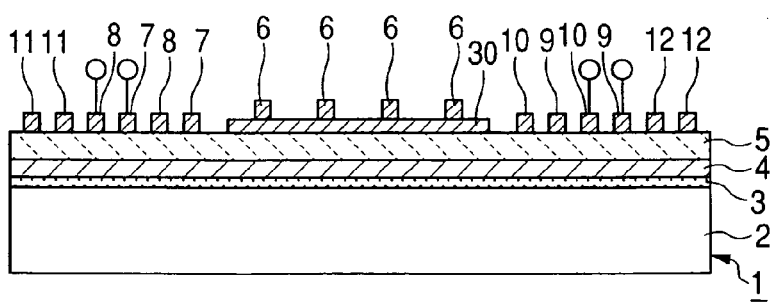

Next, as shown in FIG. 10D, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric (H$_3$PO$_4$)-based acid to form the perturbation masses 6, the driving electrodes 7-10, reflectors 11, 12, and the detecting electrodes 13-16 on an upper surface of the piezoelectric film 5 (S208 in FIG. 9), in the same way shown in FIG. 4C.

In this step, it is preferable that a selective etching technique having the proper etching ratio of one material of the second electrode 30 to another material of the perturbation masses 6 and the driving electrodes 7-10, is used. If it is not possible to use the selective etching technique, etching time is adjusted to prevent etching the second electrode 30 while the thin film of metal or conductive metallic alloy is patterned to form the perturbation masses 6 and the driving electrodes 7-10.

Finally, the supplying driving voltage lines and ground lines are formed and connected to the driving electrodes 7-10, reflectors 11, 12, and the detecting electrodes 13-16 by wire bonding.

Modification of Second Embodiment

In the second embodiment described above in which the second electrode 30, the driving electrodes 7-10, the reflectors 11, 12, and the detecting electrodes 13-16 are disposed directly on the upper surface of the piezoelectric film 5.

Figure 11:
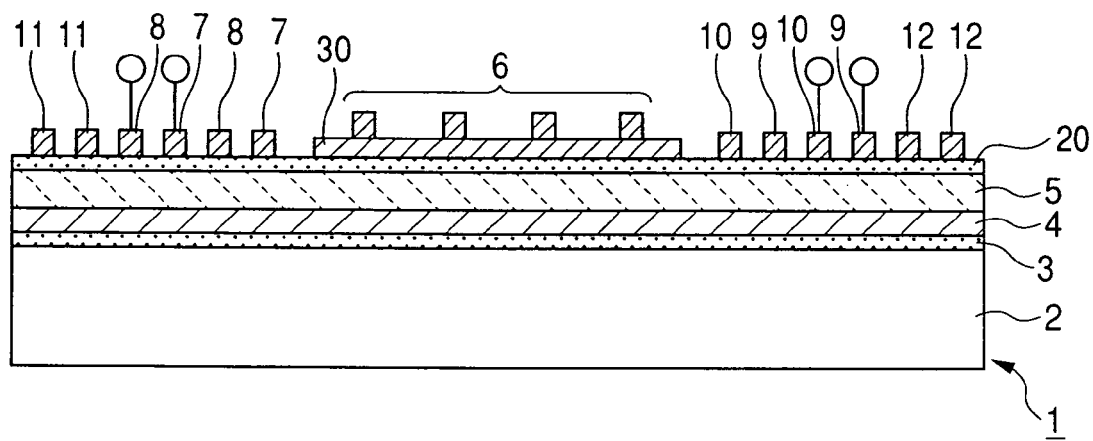
FIG. 11 shows a cross-sectional view of the angular rate sensor according to the modification of the second embodiment taken along line B-B in FIG. 7A.

As shown in FIG. 11, if necessary, a thin insulator film 20 is formed and inserted between the upper surface of the piezoelectric film 5. Consequently, the second electrode 30, the driving electrodes 7-10, the reflectors 11, 12, and the detecting electrodes 13-16 are formed on the thin insulator film 20. In this configuration, the second electrode 30, the driving electrodes 7-10, the reflectors 11, 12, and the detecting electrodes 13-16 are disposed on the thin insulator film 20. In this configuration, it is possible to prevent etching the piezoelectric film 5 while the thin film of metal or conductive metallic alloy is patterned to form the second electrode 30, the perturbation masses 6, and the driving electrodes 7-10.

Third Embodiment

Referring to FIGS. 12-16, an angular rate sensor according to the third embodiment of the present invention will now be explained. In this embodiment, the identical components in structure to those in the previous embodiments are assigned to the same reference numerals for simplicity and the description of these components are omitted from the detailed explanations.

The angular rate sensor 1 according to the third embodiment, includes the semiconductor substrate 2 such as silicon substrate, the insulator film 3 such as silicon dioxide film disposed on the semiconductor substrate 2, the first electrode 4 disposed on the first insulator film 3, the piezoelectric film 5 disposed on the first electrode 4, the second insulator film 20 disposed on the piezoelectric film 5, the second electrode 30 disposed on the second insulator film 20 on which the perturbation masses 6 are located, the driving electrode 7-10 for causing a first elastic acoustic wave in the piezoelectric film 5, the reflectors 11, 12 for reflecting the elastic acoustic wave caused by the driving electrodes 7-10 to form a standing wave of the elastic acoustic wave in the piezoelectric film 5, the detecting electrodes 13-16 for detecting a second elastic wave generated by the Coriolis force acting on the perturbation masses 6, wherein the driving electrodes 7-10, the reflectors 11, 12, the detecting electrodes 13-16 are formed on the second insulator film 20, as for the angular rate sensor according to the second embodiment.

The angular rate sensor 1 according to the third embodiment further comprises a contact hole 5a formed in the piezoelectric film 5 for electrically connecting the first electrode 4 sandwiched between the first insulator film 3 and the piezoelectric film 5 to the second electrode 30 formed on the second insulator film 20 but below the perturbation masses 6 so as to keep the same electric potential of the first electrode 4 with that of the second electrode 30.

Figure 12:
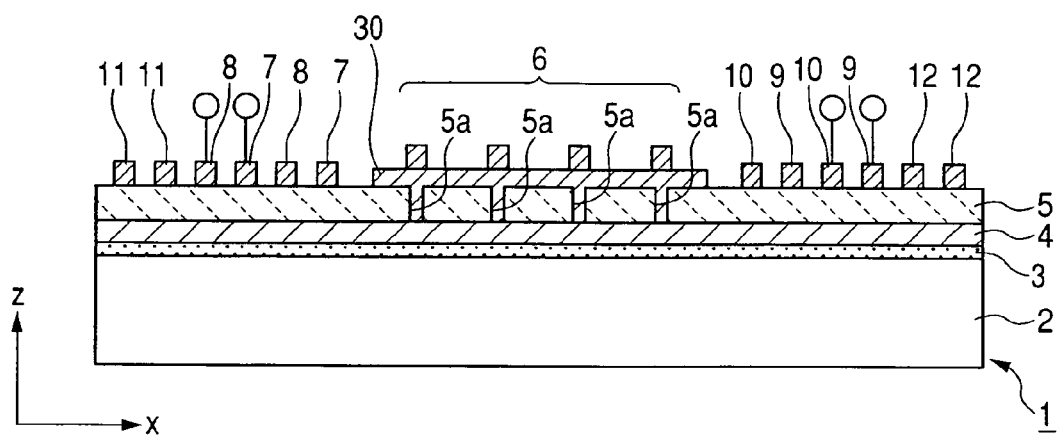
FIG. 12 shows a cross-sectional view of the angular rate sensor according to the third embodiment.

FIG. 12 shows a cross-sectional view of the angular rate sensor according to the third embodiment of the present invention. As shown in FIG. 12, the angular rate sensor has a plurality of contact holes 5a is formed in the piezoelectric film 5 such that the perturbation masses 6 are located on the individual top of the contact holes 5a. For example, each contact holes 5a is in shape of a pole.

Even if the contact holes 5a are absent. the second electrode 30 formed on the piezoelectric film 5 is configured to neutralize the surface charged generated at the upper surface of the piezoelectric film 5 due to the piezoelectric effect. However, the first electrode 4 and the second one 30 are not directly connected and are separated through the piezoelectric film 5, a difference in electric potential between the first and second electrodes 5, 30 may be appeared so that electric fields are generated by the surface charges at upper and lower surfaces of the piezoelectric film. The contact holes 5a improves such the situation by keeping the electric potentials of the first and second electrodes 5, 30 at the same level and preventing for appearing the difference of the electric potentials of the first and second electrodes 5, 30. Therefore, a limitation of an amount of a displacement of the vibrating particle in the piezoelectric film 5, especially of the vibrating perturbation masses 6 in the z-direction due to the polarization in the z-direction of the piezoelectric film 5, is eliminated. In consequence, it is possible to realize an angular rate sensor having high sensitivity. Further the angular rate sensor having high sensitivity can be miniaturized with production technology for very-large-scale integrated circuits (VLSIs).

Figure 13:
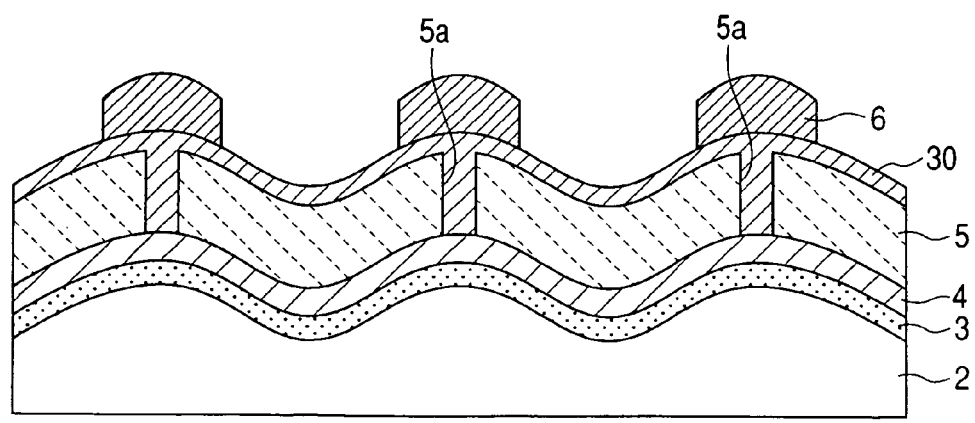
FIG. 13 shows a cross sectional view illustrating a snap shot of vibrating components of the angular rate sensor according to the third embodiment.

Further, in the angular rate sensor 1 of this type, it is preferable that the each contact hole 5a is connecting to the corresponding perturbation mass 6. In other words, the individual perturbation masses 6 are formed on the top of the contact hole 5a, as shown in FIG. 13. If the contact holes 5a are formed at the position where the perturbation masses 6 are disposed, some portion of a weight of the contact holes 5a contributes to perturbation masses 6 without affecting characteristics of the elastic acoustic wave. Therefore, it is possible to realize an angular rate sensor having high sensitivity.

FIG. 14 shows a flow chart of steps for manufacturing the angular rate sensor 1 includes a preparing step (S300) for preparing the semiconductor substrate 2, a first electrode forming step (S302) for depositing the first electrode 3 on the semiconductor substrate 2 at least over a region above which perturbation masses 6 is formed, a piezoelectric film forming step (S304) for depositing the piezoelectric film 5 on at least one of the first electrode 3 and the semiconductor substrate 2, a contact holes forming step (S306) for forming the contact holes 5a in the piezoelectric film 5, a second electrode forming step (S308) for depositing the second electrode 30 on the upper surface of the piezoelectric film 5, and a fabricating step (S310) for fabricating a plurality of features on the piezoelectric film 5, wherein the plurality of features includes the perturbation masses 6, a driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave with production technology for very-large-scale integrated circuits (VLSIs).

FIG. 15 shows illustrates the steps performed in the method for manufacturing the angular rate sensor 1 according to this embodiment.

First, as in the method for manufacturing the angular rate sensor according to the first embodiment, a 400 µm or the more thick (100)-oriented silicon substrate is prepared (S300 in FIG. 14).

Figure 15A:
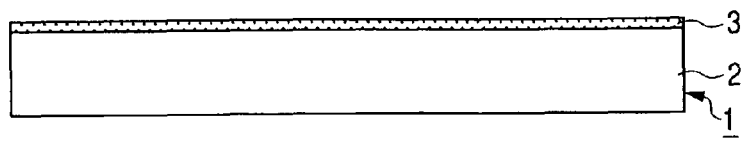
FIGS. 15A to 15E illustrate the steps performed in the method for manufacturing the angular rate sensor according to third embodiment.

Next, as shown in FIG. 15A, a thin silicon dioxide film which is thinner than 1 µm is grown on the silicon substrate in the same way shown in FIG. 4A.

Figure 15B:
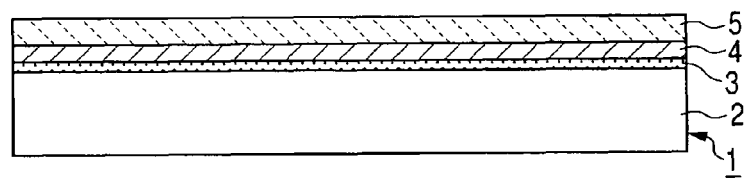

As shown in FIG. 15B, a several hundreds nanometer thick film of impurity-doped polycrystalline silicon is deposited in the same way shown in FIG. 4B (S302 in FIG. 14). After this step, a formation of the first electrode 4 is finished.

In the next step, a several micrometer thick film of a piezoelectric film such as aluminum nitride (AlN), zinc oxide (ZnO), zirconate titante (PZT), lead titanate (PT), lithium tantalite (LiTaO$_3$), and lithium tantalite (LT), is disposed so as to cover the whole region of an upper surface of the first electrode 4 (S304 in FIG. 14). If an aluminum nitride (AlN) film is used as the first electrode 4, the AlN film is patterned by a tetra methyl ammonium hydroxide-based solvent.

Figure 15C:
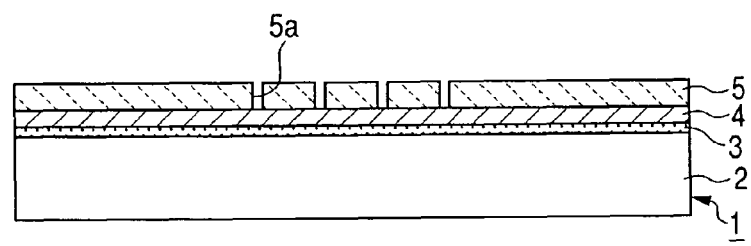
Figure 15D:
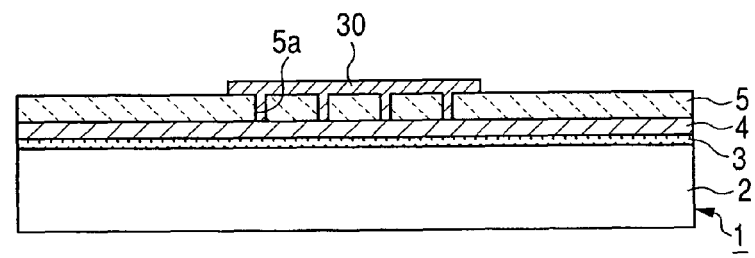
Figure 15E:
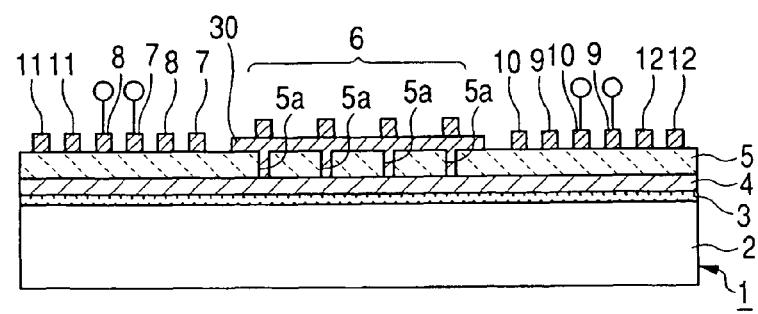

Then, as shown in FIG. 15C, contact holes 5a are formed having a plurality of the apertures through the piezoelectric film 5 (S306 in FIG. 14). The piezoelectric film 5 is soaked in photoresist and developed until the sections which have been exposed to ultra-violet (UV) light and are therefore soluble, are etched away.

Next, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the second electrode 30 and the contact holes 5a. Thus, the second electrode 30 and the contact holes 5a are formed (S308 in FIG. 14).

Next, as shown in FIG. 12D, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the perturbation masses 6, the driving electrodes 7-10, reflectors 11, 12, and the detecting electrodes 13-16 on an upper surface of the piezoelectric film 5 (S310 in FIG. 14), in the same way shown in FIG. 4C.

Finally, the supplying driving voltage lines and ground lines are formed and connected to the driving electrodes 7-10, reflectors 11, 12, and the detecting electrodes 13-16 by wire bonding.

Modification of Third Embodiment

In the third embodiment described above in which the second electrode 30, the driving electrodes 7-10, the reflectors 11, 12, and the detecting electrodes 13-16 are disposed directly on the upper surface of the piezoelectric film 5.

Figure 16:
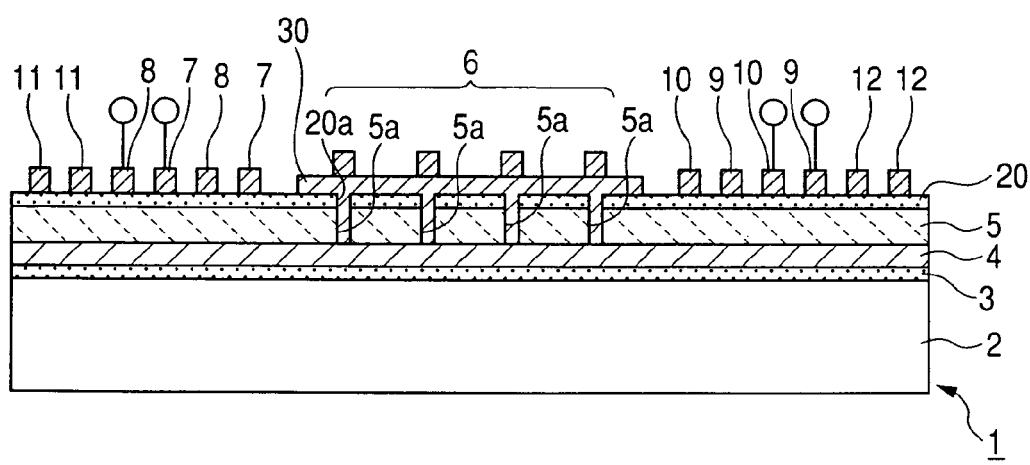
FIG. 16 shows a cross-sectional view of the angular rate sensor according to the modification of the third embodiment.

As shown in FIG. 16, if necessary, a thin insulator film 20 is formed and inserted between the upper surface of the piezoelectric film 5. Consequently, the second electrode 30, the driving electrodes 7-10, the reflectors 11, 12, and the detecting electrodes 13-16 are formed on the thin insulator film 20. In this configuration, the second electrode 30, the driving electrodes 7-10, the reflectors 11, 12, and the detecting electrodes 13-16 are disposed on the thin insulator film 20. In this configuration, the contact holes 5a penetrate the thin insulator film 20 so as to electrically connect the first electrode 4 to the second electrode 30.

Fourth Embodiment

Referring to FIGS. 17A-19D, an angular rate sensor according to a fourth embodiment of the present invention will now be explained. In the fourth embodiment, the identical components in structure to those in the first embodiment are assigned to the same reference numerals for simplicity and the description of these components are omitted from the detailed explanations.

In the angular rate sensor according to the fourth embodiment, there is provided an angular rate sensor 1 having openings for accommodating perturbation masses 6 in the piezoelectric film 5 so as to resolve a question how a polarization occurred along the z-direction in the piezoelectric film 5 or surface charges generated at the upper and lower surfaces of the piezoelectric film 5 should be removed.

Figure 17A:
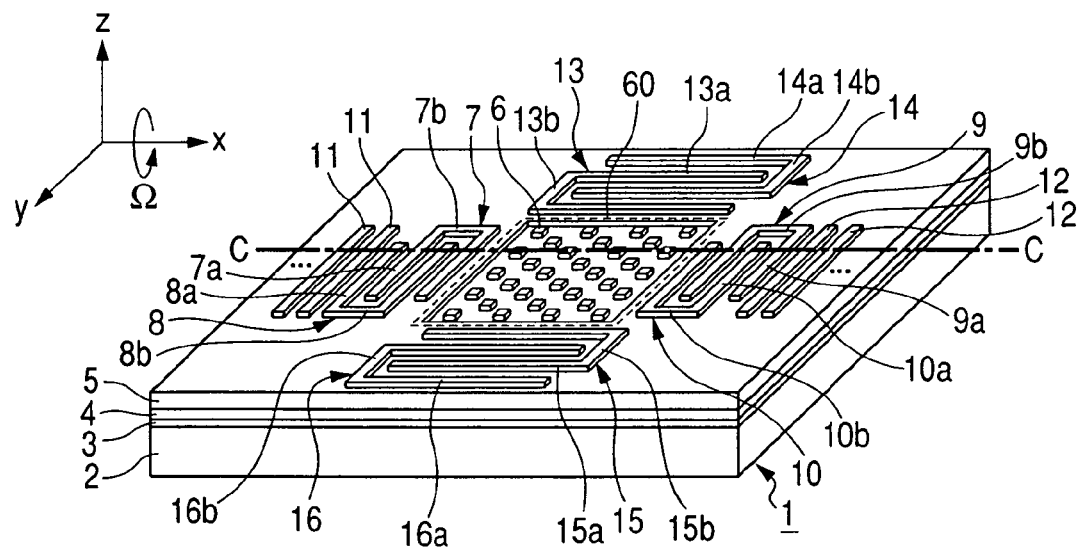
Figure 17B:
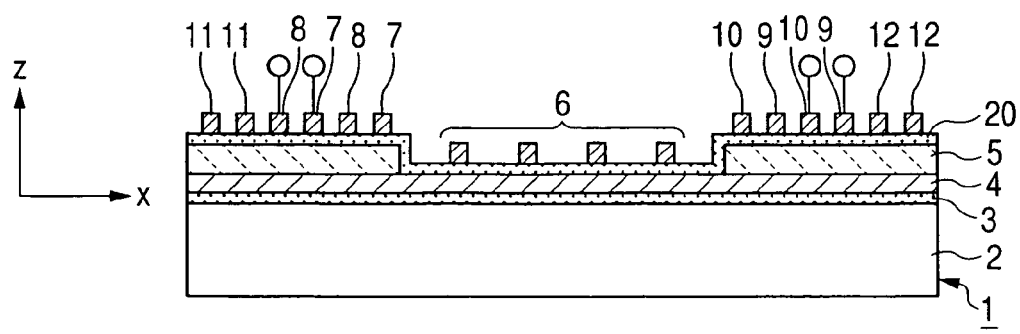

FIG. 17A and FIG. 17B show an angular rate sensor 1 according to the fourth embodiment. FIG. 17A shows a bird's-eye view of the angular rate sensor 1 and FIG. 17B shows a cross-sectional view taken along C-C line in FIG. 17A.

As shown in FIG. 17A, in the angular rate sensor 1 has the openings over the predetermined region 60 for accommodating the perturbation masses 6, the piezoelectric material composing the piezoelectric film 5 is expelled from the openings.

Even though the angular sensor 1 has the opening over the predetermined region 60 such that the piezoelectric film 5 is not formed over the predetermined region 60 on which the perturbation masses 6 are disposed, a standing wave generated and rectified by the driving electrodes 7-10 and the reflectors 11, 12, exist within the predetermined region 60 such that the Coriolis force acting on the perturbation masses 6 generate a second elastic acoustic wave in the y-direction and then is detected by the detecting electrodes 13-16 being alignment along the y-direction.

The angular rate sensor according to the fourth embodiment, includes the semiconductor substrate 2 such as silicon substrate, the insulator film 3 such as silicon dioxide film disposed on the semiconductor substrate 2, the first electrode 4 disposed on the first insulator film 3, the piezoelectric film 5 disposed on the first electrode 4 in which the opening is formed by expelling the piezoelectric film 5 from the predetermined region 60, the second insulator film 20 disposed on the piezoelectric film 5 or the first electrode 4, the perturbation masses 6 disposed on the predetermined region 60, the driving electrode 7-10 for causing a first elastic acoustic wave in the piezoelectric film 5, the reflectors 11, 12 for reflecting the elastic acoustic wave caused by the driving electrodes 7-10 to form a standing wave of the elastic acoustic wave in the piezoelectric film 5, the detecting electrodes 13-16 for detecting a second elastic wave generated by the Coriolis force acting on the perturbation masses 6, wherein the driving electrodes 7-10, the reflectors 11, 12, the detecting electrodes 13-16 are formed on the second insulator film 20.

In this configuration of the angular rate sensor 1, within the predetermined region 60, the perturbation masses 6 is not formed on the piezoelectric film 5 but on the thin insulator film 4. Thus, even if the polarization between the upper and the lower surfaces of the piezoelectric film 5 is generated since particles in the piezoelectric film 5 which are associated with the standing wave are displaced from corresponding neutral positions, the polarization in the piezoelectric film does not contribute to the vibration of the perturbation masses 6 in the z-direction. As a result, a limitation of the displacement of the vibrating perturbation masses 6 accommodated into the openings in the z-direction is eliminated.

In this case the standing wave is excited in the first electrode 4 and the thin insulator film 3, and at the upper surface of the semiconductor substrate 2. Thus, the perturbation masses 6 at the anti-nodes of the standing wave are subject to an oscillation used as a reference vibration of the angular rate sensor. In consequence, it is possible to measure an angular rate in the same operating principle with that utilized in the previous embodiments.

A method for fabricating the angular rate sensor 1 according to the fourth embodiment will be described.

FIG. 18 is a flow chart of steps for manufacturing the angular rate sensor 1 includes a preparing step (S400) for preparing the semiconductor substrate 2, a first electrode forming step (S402) for depositing the first electrode 3 on the semiconductor substrate 2 at least over a square region above which perturbation masses 6 is formed, a piezoelectric film forming step (S404) for depositing the piezoelectric film 5 on at least one of the first electrode 3 and the semiconductor substrate 2, an opening forming step (S406) for forming the opening in the piezoelectric film 5 over the predetermined region 60 above which a perturbation masses 6 are disposed, an insulator thin film forming step (S408) for forming the insulator thin film on the piezoelectric film 5 and an exposed surface of the opening, and a fabricating step (S410) for fabricating a plurality of features on the piezoelectric film 5, wherein the plurality of features includes the perturbation masses 6, a driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave with production technology for very-large-scale integrated circuits (VLSIs).

FIGS. 19A to 19D illustrate the steps performed in the method for manufacturing the angular rate sensor 1 according to this embodiment.

First, as in the method for manufacturing the angular rate sensor 1 according to the first embodiment, a (100)-oriented silicon substrate of 400 μm thickness is prepared (S400 in FIG. 18).

Figure 19A:
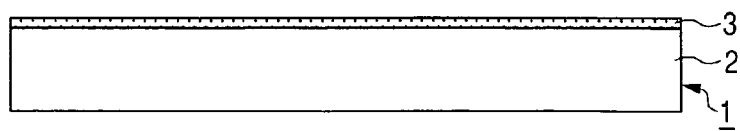
FIGS. 19A to 19D illustrate the steps performed in the method for manufacturing the angular rate sensor according to the fourth embodiment.

Next, as shown in FIG. 19A, a thin silicon dioxide film which is thinner than 1 μm, is grown on the silicon substrate in the same way shown in FIG. 4A.

Figure 19B:
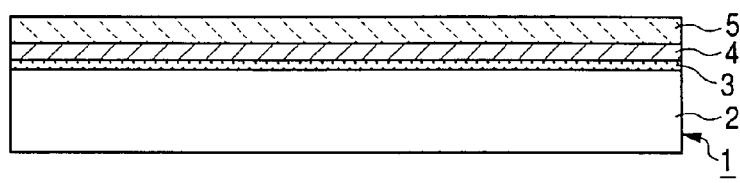

As shown in FIG. 19B, a thick film which is of order of several hundreds nanometer of impurity-doped polycrystalline silicon is deposited in the same way shown in FIG. 4B. After this step, a formation of a first electrode 4 is finished (S402 in FIG. 18).

In the next step, a several micrometer thick film of a piezoelectric film such as aluminum nitride (AlN), zinc oxide (ZnO), zirconate titante (PZT), lead titanate (PT), lithium tantalite (LiTaO$_3$), and lithium tantalite (LT), is disposed so as to cover the whole region of an upper surface of the first electrode 4 (S404 in FIG. 18). If an aluminum nitride (AlN) film is used as the first electrode 4, the AlN film is patterned by a tetra methyl ammonium hydroxide-based solvent.

Figure 19C:
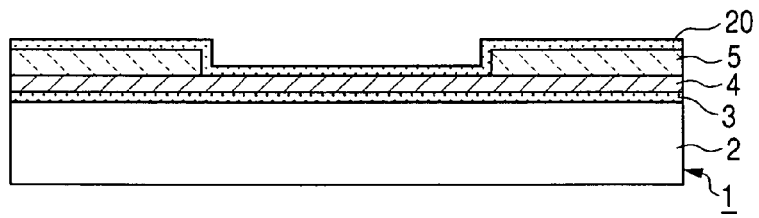

Then, as shown in FIG. 19C, the opening is formed within the predetermined region 60 through the piezoelectric film 5 (S406 in FIG. 18). The piezoelectric film 5 is soaked in photoresist and developed until the sections which have been exposed to ultra-violet (UV) light and are therefore soluble, are etched away.

Next, a thin silicon dioxide film 20 is formed on the piezoelectric film 5 or the first electrode 4 within the predetermined region 60 on which the opening is formed (S408 in FIG. 18).

Figure 19D:
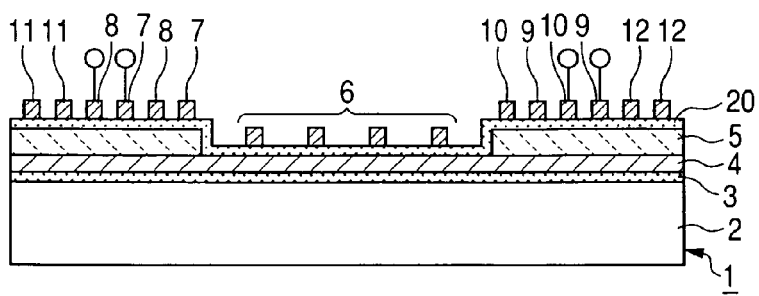

Next, as shown in FIG. 19D, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric (H$_3$PO$_4$)-based acid to form the second electrode 30 and perturbation masses 6 (S410 in FIG. 18).

Finally, the supplying driving voltage lines and ground lines are formed and connected to the driving electrodes 7-10, reflectors 11, 12, and the detecting electrodes 13-16 by wire bonding.

Modification of First to Fourth Embodiments

In the first to fourth embodiments, the first electrode 4 is formed over the whole upper surface of the thin insulator film covering the surface of the semiconductor substrate 2. That is, the first electrode 4 is disposed below the driving electrodes 7-10. In the configurations according to the first to third embodiments, the perturbation masses 6 vibrates in the z-direction with large amplitude since the driving electrode 7-10 generates the elastic acoustic wave in the piezoelectric film 5 over a wide region including not only the predetermined region 60 on which the perturbation masses 6 are disposed but also an outer region of the predetermined region 60 on which the driving electrodes 7-10, the reflectors 11, 12 are disposed. However, the first electrode 4 can be formed only below the predetermined region 60. In this configuration, the same effects obtained by the angular rate sensors according to the first to third embodiments are attained.

Further, in the angular rate sensors according to the first to fourth embodiments, the driving IDTs and detecting IDTs consists of the comb-shaped electrode 7-10, 13-16. However, the driving IDTs and detecting IDTs are limited to these configurations but other shaped electrodes can be used for the components of the driving IDTs and the detecting IDTs.

Further, in the angular rate sensors according to the first to third embodiments, the driving electrodes 7-10 are located such that the driving electrodes 7-8 are disposed at one side of the predetermined region 60 and the driving electrodes 9-10 are disposed at another side of the predetermined region 60. However, it is not necessary to form the driving electrodes 7-10 at both sides of the predetermined region 60. In a modification of the angular rate sensor according to the first to third embodiments, at least one pairs of the driving electrodes 7-8 and the driving electrodes 9-10 is formed.

Still further, in the modification of the angular rate sensor according to the fourth embodiment, the opening is filled with some elastic material including metal, metallic alloy, semiconductor, and insulator with the exception of piezoelectric material. The perturbation masses 6 are formed on the above mentioned elastic material. In this configuration, even if elastic acoustic waves are caused within the predetermined region 60, electric polarization is not generated below the predetermined region 60. Therefore, a high sensitive angular rate sensor is achieved.

Fifth Embodiment

Referring to FIGS. 20A-22D, an angular rate sensor according to the fifth embodiment of the present invention will now be explained. In this embodiment, the identical components in structure to those in the previous embodiments are assigned to the same reference numerals for simplicity and the description of these components are omitted from the detailed explanations.

Figure 20A:
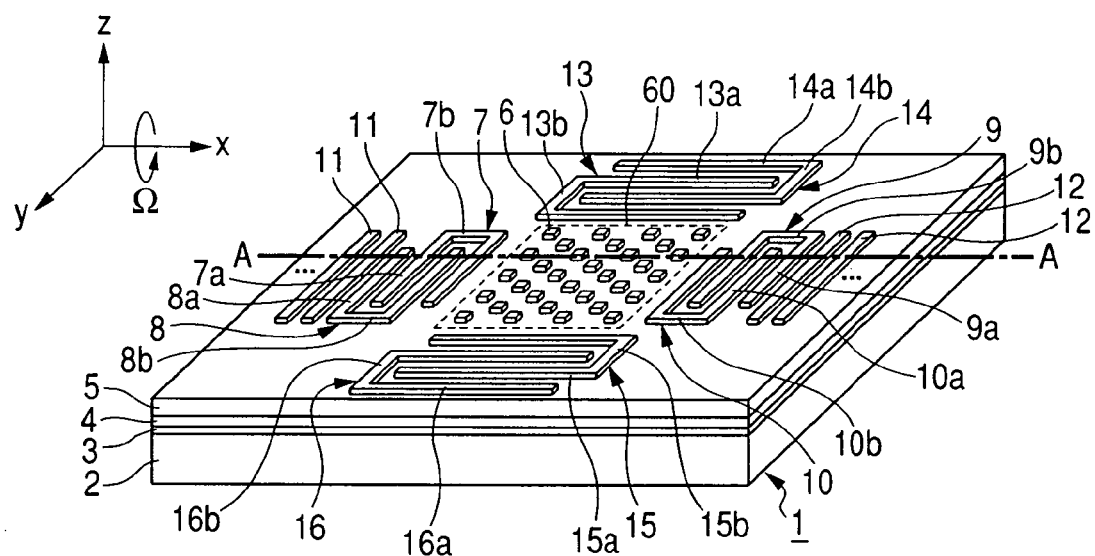
Figure 20B:
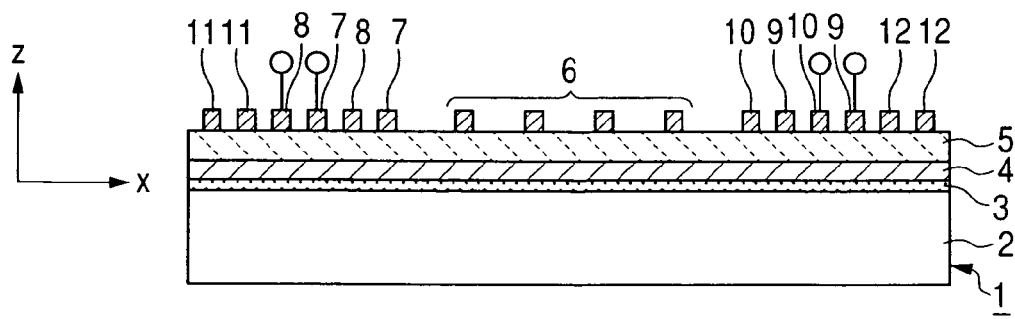

FIG. 20A and FIG. 20B show an angular rate sensor 1 according to the fifth embodiment. FIG. 20A shows a bird's-eye view of the angular rate sensor 1 and FIG. 20B shows a cross-sectional view taken along A-A line in FIG. 20A.

The angular rate sensor 1 according to the fifth embodiment has perturbation masses 6 whose mass density is larger than that of the previous embodiments. In, more detail, a material of which the perturbation masses 6 is made has higher mass density than that of another material of which the driving electrodes 7-10, the reflectors 11, 12, and the detecting electrodes 13-16. If the driving electrodes 7-10, the reflectors 11, 12, and the detecting electrodes 13-16 are made of phosphor-doped polycrystalline silicon, it is suitable that the perturbation mass is made of one of platinum (Pt), gold (Au), and tungsten (W). Platinum (Pt), gold (Au), and tungsten (W) have mass density of 21.4 g/cm$^3$, 19.3 g/cm$^3$, and 19.1 g/cm$^3$, respectively. Further it is preferable that thickness of the perturbation masses 6 is larger than twice of that of the driving electrodes 7-10.

In such a configuration of the perturbation masses 6, the Coriolis force acting on the perturbation masses 6 is emphasized so as to increase the displacement of the perturbation masses 6 in the z-direction. In consequence, it is possible to realize an angular rate sensor 1 having high sensitivity. Further the angular rate sensor having high sensitivity can be miniaturized with production technology for very-large-scale integrated circuits (VLSIs).

In more detail, the perturbation masses 6 are usually made of aluminum (Al) whose mass density is 2.69 g/cm$^3$ that is also widely used for wiring. However the mass density of aluminum (Al) is not enough to generate the large Coriolis force that is proportional to both velocity and mass density. If the perturbation masses 6 are made of one of one of platinum (Pt), gold (Au), and tungsten (W), whose mass densities have five times larger than that of aluminum (Al) and the thickness of the perturbation masses 6 has twice larger than that of the driving electrodes 7-10, the sensitivity of the angular rate sensor 1 is improved by single-digit.

In the above description, the perturbation masses 6, the driving electrodes 7-10, reflectors 11, 12, and the detecting electrodes 13-16 are made of metal or metal alloys. However, other materials whose mass density is larger are applicable.

A method for fabricating the angular rate sensor 1 according to the fifth embodiment will be described with reference to FIGS. 16 and 17.

Figure 21:
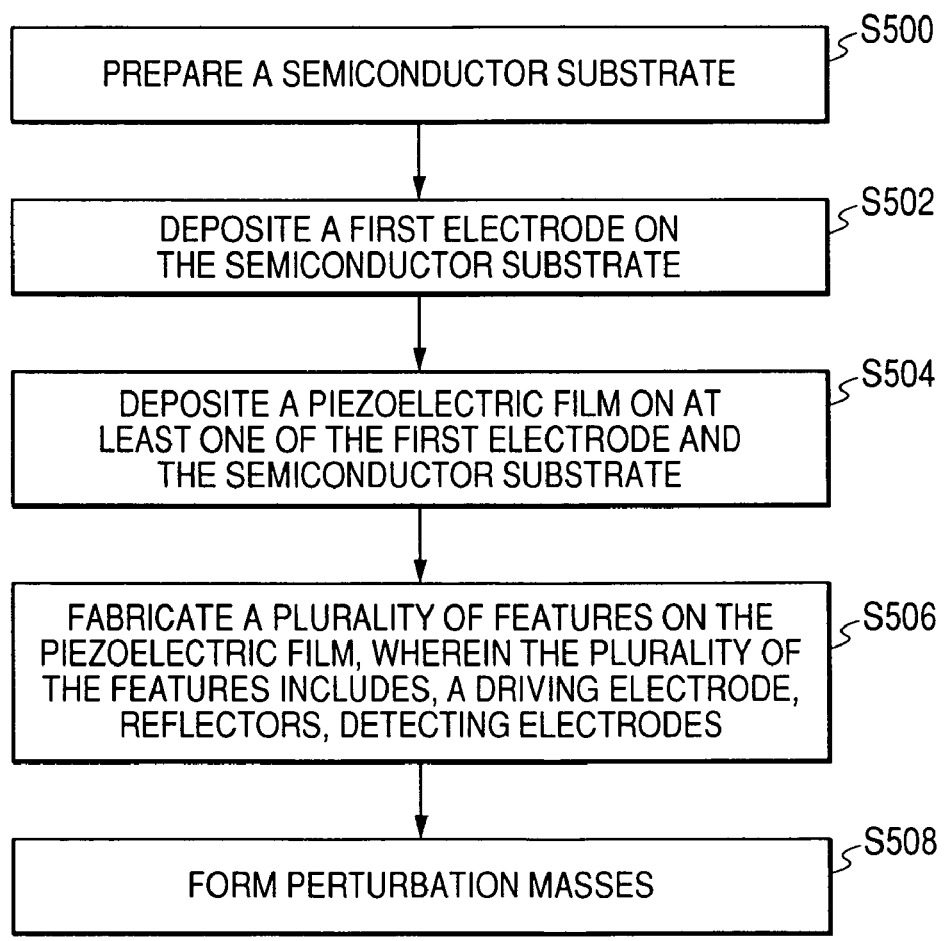
FIG. 21 is a flow chart of steps for manufacturing the angular rate sensor shown in FIG. 20A and FIG. 20B according to the fifth embodiment of the present invention.

FIG. 21 shows a flow chart of steps for manufacturing the angular rate sensor 1 includes a preparing step (S500) for preparing the semiconductor substrate 2, a first electrode forming step (S502) for depositing the first electrode 3 on the semiconductor substrate 2 at least over a square region above which perturbation masses 6 is formed, a piezoelectric film forming step (S504) for depositing the piezoelectric film 5 on at least one of the first electrode 3 and the semiconductor substrate 2, a first fabricating step (S506) for fabricating a plurality of features on the piezoelectric film 5 using a first material such as a metal and a metal alloy, wherein the plurality of features includes the driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave, a second fabricating step (S508) for fabricating the perturbation masses 6 using a second material whose mass density has larger than that of the first material. In all steps mentioned above, production technology for very-large-scale integrated circuits (VLSIs) is applicable.

FIGS. 22A to 22D illustrate the steps performed in the method for manufacturing the angular rate sensor 1 according to this embodiment.

First, as in the method for manufacturing the angular rate sensor 1 according to the first embodiment, a (100)-oriented silicon substrate of 400 μm thickness is prepared (S500 in FIG. 21).

Figure 22A:
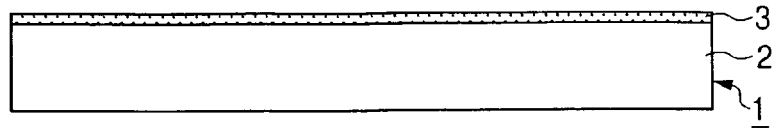
FIGS. 22A to 22D illustrate the steps performed in the method for manufacturing the angular rate sensor according to the fifth embodiment.

Next, as shown in FIG. 22A, a thin silicon dioxide film which is thinner than 1 μm, is grown on the silicon substrate in the same way shown in FIG. 4A.

Figure 22B:
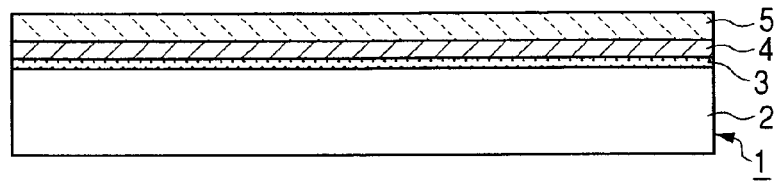
Figure 22C:
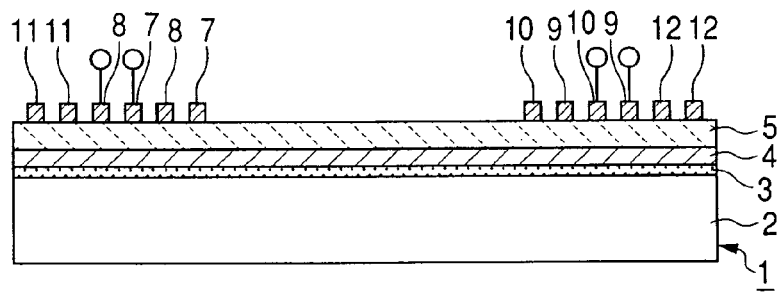

As shown in FIG. 22B, a thick film which is of order of several hundreds nanometer of impurity-doped polycrystalline silicon is deposited in the same way shown in FIG. 4B. In other words, this step is a first electrode forming step for forming the first electrode 4 on the thin silicon dioxide (S502 in FIG. 21).

In the next step, a several micrometer thick film of a piezoelectric film such as aluminum nitride (AlN), zinc oxide (ZnO), zirconate titante (PZT), lead titanate (PT), lithium tantalite (LiTaO$_3$), and lithium tantalite (LT), is disposed so as to cover the whole region of an upper surface of the first electrode 4 in order to form a piezoelectric film 5 (S504 in FIG. 21). If an aluminum nitride (AlN) film is used as the first electrode 4, the AlN film is patterned by a tetra methyl ammonium hydroxide-based solvent.

Next, as shown in FIG. 12C, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric (H$_3$PO$_4$)-based acid to form the driving electrodes 7-10, reflectors 11, 12, and the detecting electrodes 13-16 on an upper surface of the piezoelectric film 5 (S506 in FIG. 21), in the same way shown in FIG. 4C.

Figure 22D:
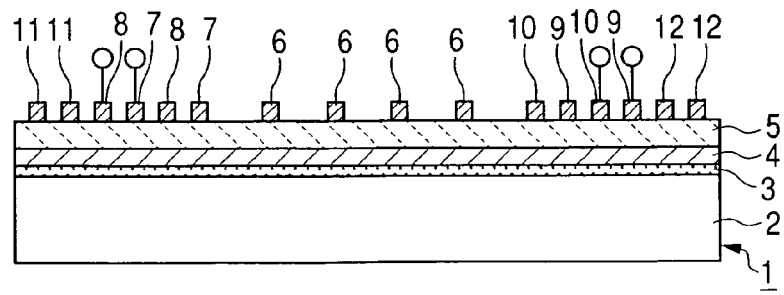

Next, as shown in FIG. 22D, a thin film of metal or conductive metallic alloy including platinum (Pt), gold (Au), and tungsten (W) is deposited using an e-beam evaporator, and patterned by a phosphoric (H$_3$PO$_4$)-based acid to form the perturbation masses 6 (S508 in FIG. 21).

In this step, it is preferable that a selective etching technique having the proper etching ratio of one material of the perturbation masses 6 to another material of the driving electrodes 7-10, reflectors 11, 12, and the detecting electrodes 13-16 is used.

Finally, the supplying driving voltage lines and ground lines are formed and connected to the driving electrodes 7-10, reflectors 11, 12, and the detecting electrodes 13-16 by wire bonding.

Modification of Fifth Embodiment

In the fifth embodiment described above in which the perturbation masses 6, the driving electrodes 7-10, the reflectors 11, 12, and the detecting electrodes 13-16 are disposed directly on the upper surface of the piezoelectric film 5.

Figure 23:
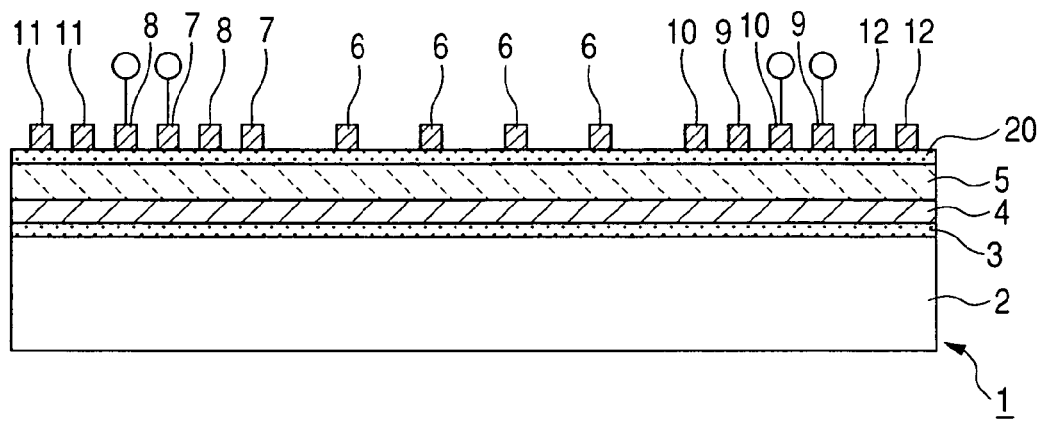
FIG. 23 shows a cross-sectional view of the angular rate sensor according to the modification of the fifth embodiment.

As shown in FIG. 23, if necessary, an thin insulator film 20 is formed and inserted between the upper surface of the piezoelectric film 5. Consequently, the second electrode 30, the driving electrodes 7-10, the reflectors 11, 12, and the detecting electrodes 13-16 are formed on the thin insulator film 20. In this configuration, the second electrode 30, the driving electrodes 7-10, the reflectors 11, 12, and the detecting electrodes 13-16 are disposed on the thin insulator film 20. In this configuration, it is possible to prevent etching the piezoelectric film 5 while the thin film of metal or conductive metallic alloy is patterned to form the second electrode 30, the perturbation masses 6, and the driving electrodes 7-10.

Further, even though the angular rate sensor according to the fifth embodiment in which the first electrode 4 is formed below the driving electrodes 7-10 and perturbation masses 6 is made of a metal or a metal alloy whose mass density is larger than that of driving electrodes 7-10, is disclosed, the first electrode 4 is not a crucial component for an angular rate sensor 1 having higher sensitivity if perturbation masses 6 of the angular rate sensor 1 is made of a metal or a metal alloy whose mass density is larger than that of driving electrodes 7-10.

Sixth Embodiment

Referring to FIGS. 24-28B, an angular rate sensor according to the sixth embodiment of the present invention will now be explained. In this embodiment, the identical components in structure to those in the previous embodiments are assigned to the same reference numerals for simplicity and the description of these components are omitted from the detailed explanations.

The angular rate sensor according to the sixth embodiment has perturbation masses 6 which have different shape from that of the first embodiment, although the angular rate sensor 1 according to this embodiment includes the semiconductor substrate 2 such as silicon substrate, the insulator film 3 such as silicon dioxide film disposed on the semiconductor substrate 2, the first electrode 4 disposed on the first insulator film 3, the piezoelectric film 5 disposed on the first electrode 4, the perturbation masses 6 which emphasis the Coriolis force during the angular rate sensor rotating, the driving electrode 7-10 for causing a first elastic acoustic wave in the piezoelectric film 5, the reflectors 11, 12 for reflecting the elastic acoustic wave caused by the driving electrodes 7-10 to form a standing wave of the elastic acoustic wave in the piezoelectric film 5, the detecting electrodes 13-16 for detecting a second elastic wave generated by the Coriolis force acting on the perturbation masses 6, wherein the driving electrodes 7-10, the reflectors 11, 12, the detecting electrodes 13-16 are formed on the piezoelectric film 5. The angular rate sensor according to this embodiment has a plurality of needle-shaped perturbation masses 6.

Figure 24:
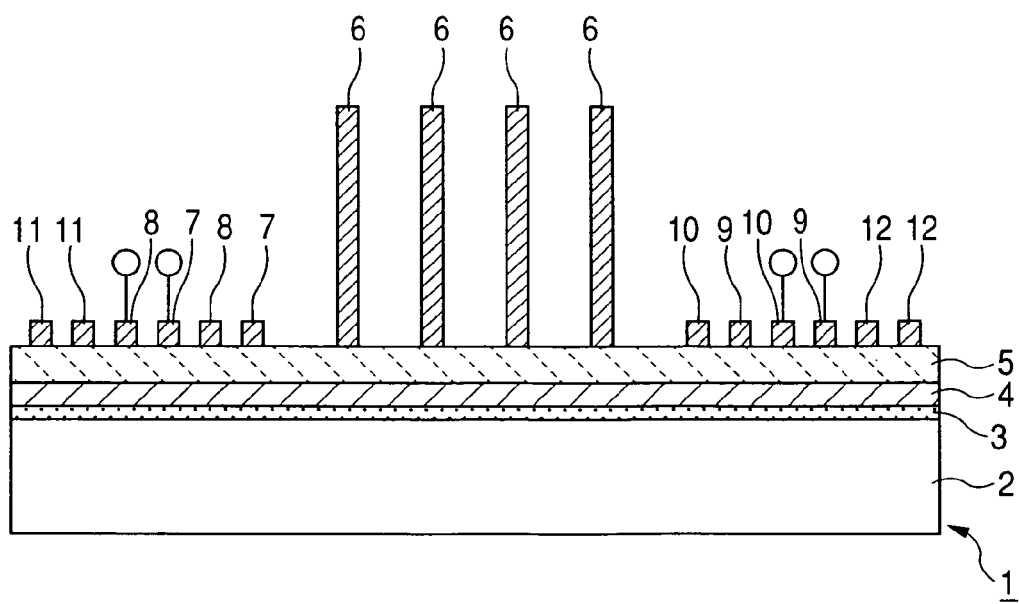
FIG. 24 shows a cross-sectional view of the angular rate sensor according to the sixth embodiment.

FIG. 24 shows a cross-sectional view of the angular rate sensor according to the sixth embodiment of the present invention. As shown in FIG. 24, the angular rate sensor according to this embodiment has perturbation masses 6 which are longer than those of the driving electrodes 7-10, the reflectors 11, 12, and the detecting electrodes 13-16 so as to obtain larger amplitude of the Coriolis force due to heavy mass of each perturbation mass 6. In FIG. 24, it is clarified the fact that the angular rate sensor according to this embodiment has the plurality of the needle-shaped perturbation masses 6.

The needle-shaped perturbation masses 6 contribute to high sensitivity of the angular rate sensor 1 since the Coriolis force is written in a form $\vec{F}=2m\vec{v}\times\vec{\Omega}$ where the velocity of each perturbation mass 6, $\vec{v}$, each perturbation mass 6 has a mass, m, and the angular rotation $\vec{\Omega}$ In this configuration of the perturbation masses 6 which is longer than those of the driving electrodes 7-10, the reflectors 11, 12, and the detecting electrodes 13-16, the magnitude of the Coriolis force is increased so that the propagating wave generated by the Coriolis force in the y-direction has larger amplitude.

In consequence, it is possible to realize an angular rate sensor having high sensitivity.

A method for fabricating the angular rate sensor 1 with production technology for very-large-scale integrated circuits (VLSIs) will be described.

Figure 25:
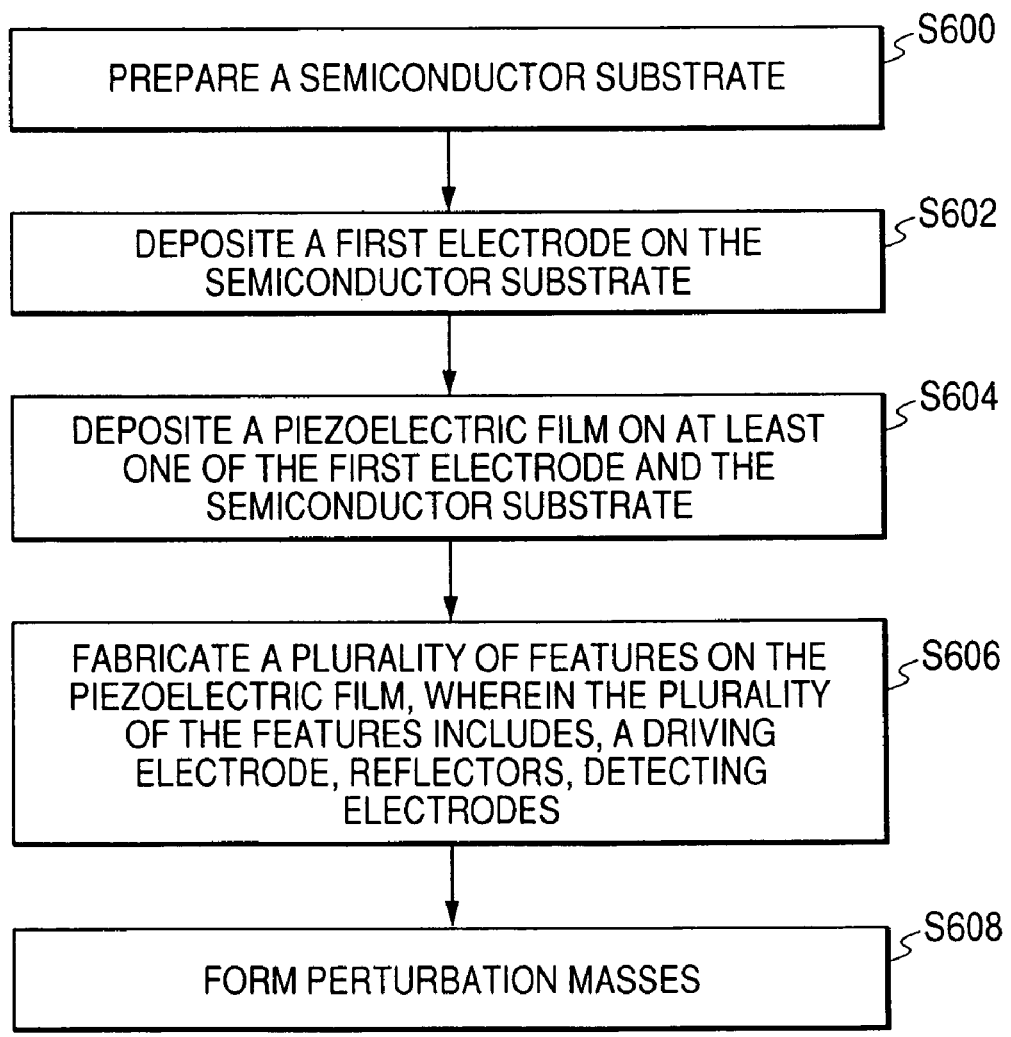
FIG. 25 is a flow chart of steps for manufacturing the angular rate sensor shown in FIG. 22A and FIG. 22B according to the sixth embodiment of the present invention.

FIG. 25 shows a flow chart of steps for manufacturing the angular rate sensor 1 according to the sixth embodiment includes a preparing step (S600) for preparing the semiconductor substrate 2, a first electrode forming step (S602) for depositing the first electrode 4 on the semiconductor substrate 2 at least over a square region above which perturbation masses 6 is formed, a piezoelectric film forming step (S604) for depositing the piezoelectric film 5 on at least one of the first electrode 4 and the semiconductor substrate 2, a first fabricating step (S606) for fabricating a plurality of features on the piezoelectric film 5 using a first material such as a metal and a metal alloy, wherein the plurality of features includes the driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave, a second fabricating step (S608) for fabricating the perturbation masses 6 which are longer than those of the driving electrodes 7-10, the reflectors 11, 12, and the detecting electrodes 13-16. In all steps mentioned above, production technology for very-large-scale integrated circuits (VLSIs) is applicable.

FIGS. 26A to 26E illustrate the steps performed in the method for manufacturing the angular rate sensor 1 according to this embodiment.

First, as in the method for manufacturing the angular rate sensor 1 according to the first embodiment, a (100)-oriented silicon substrate of 400 μm thickness is prepared (S600 in FIG. 25).

Figure 26A:
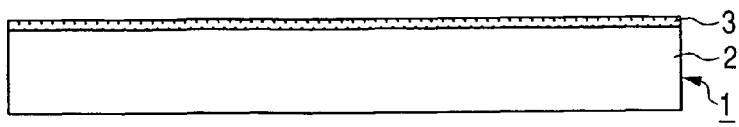
FIGS. 26A to 26E illustrate the steps performed in the method for manufacturing the angular rate sensor according to the sixth embodiment.

Next, as shown in FIG. 26A, a thin silicon dioxide film 3 which is thinner than 1 μm, is grown on the silicon substrate in the same way shown in FIG. 4A.

Figure 26B:
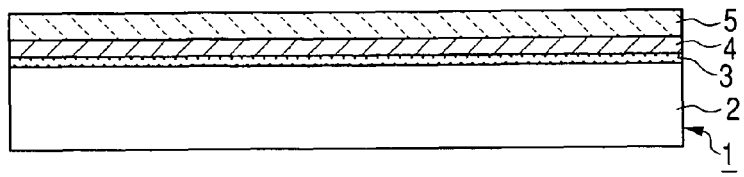

As shown in FIG. 26B, a thick film 4 which is of order of several hundreds nanometer of impurity-doped polycrystalline silicon is deposited in the same way shown in FIG. 4B. In this step, a first electrode 4 is formed (S602 in FIG. 25).

In the next step, a several micrometer thick film of a piezoelectric film such as aluminum nitride (AlN), zinc oxide (ZnO), zirconate titante (PZT), lead titanate (PT), lithium tantalite (LiTaO$_3$), and lithium tantalite (LT), is disposed so as to cover the whole region of an upper surface of the first electrode 4 (S604 in FIG. 25). If an aluminum nitride (AlN) film is used as the first electrode 4, the AlN film is patterned by a tetra methyl ammonium hydroxide-based solvent.

Figure 26C:
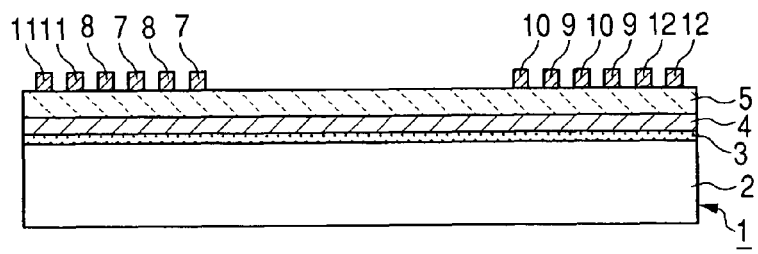

Next, as shown in FIG. 26C, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric (H$_3$PO$_4$)-based acid to form the driving electrodes 7-10, reflectors 11, 12, and the detecting electrodes 13-16 on an upper surface of the piezoelectric film 5 (S606 in FIG. 25), in the same way shown in FIG. 4C.

Figure 26D:
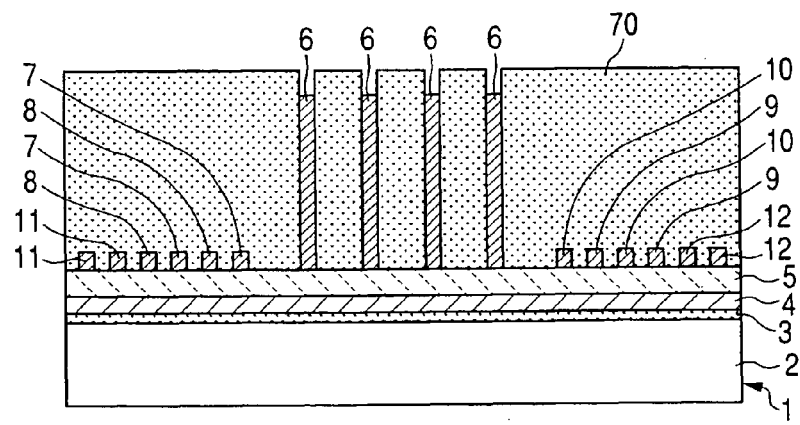
Figure 26E:
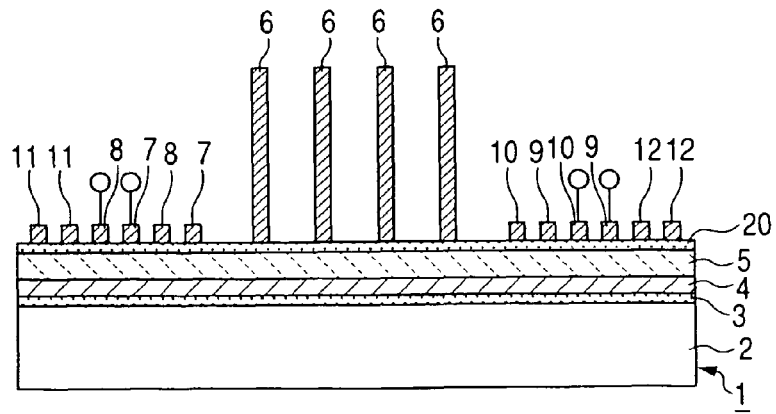
Figure 27:
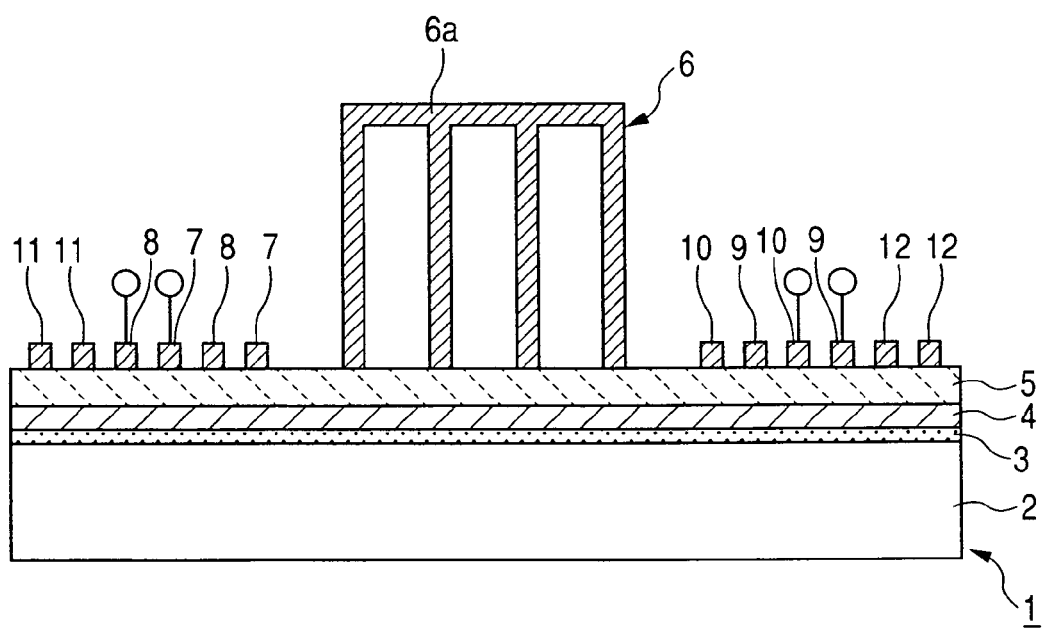
FIG. 27 shows a cross-sectional view of the angular rate sensor according to the modification of the sixth embodiment.

Next, as shown in FIG. 26D, a resist thick film 70 of 10 μm and more thickness which is to be masked is formed on the driving electrodes 7-10, reflectors 11, 12, and the detecting electrodes 13-16 which covers on the surface of the piezoelectric film 5, or on the surface of the piezoelectric film 5, and apertures in the shape of a pattern of which the perturbation masses 6 are arranged. Next, metal or conductive metallic alloy is deposited to form the needle-shaped perturbation masses 6 into the apertures of the resist thick film 70. Thus, the plurality of the needle-shaped perturbation masses 6 having high aspect ratio is formed. The aspect ratio of a two-dimensional shape is defined as the ratio of its longer dimension to its shorter dimension. Therefore, an aspect ratio of the perturbation masses 6 is defined as the ratio of the height to the width of the bottom thereof. Instead of a deposition method for fabricating the perturbation masses 6 mentioned above, electro plating and electroless plating is also applicable to form the perturbation masses 6. In the case of the electro plating using a shield film, the shield film is deposited and a resist thick film is formed. Then, the perturbation masses 6 are pattered.

Next, as shown in FIG. 20E, the resist thick film 70 and the film of metal or conductive metallic alloy formed on the resist thick film 70 are removed. So that the plurality of the needle-shaped perturbation masses 6 are formed (S608 in FIG. 25).

Finally, the supplying driving voltage lines and ground lines are formed and connected to the driving electrodes 7-10, reflectors 11, 12, and the detecting electrodes 13-16 by wire bonding.

Modification of Sixth Embodiment

In the angular rate sensor 1 according to the sixth embodiment, each perturbation mass 6 has high aspect ratio such as the needle-shaped.

In a modification of the angular rate sensor according to the sixth embodiment, the perturbation masses 6 are formed such that on the tops of all needle-shaped perturbation masses 6 a single plate is placed. If the needle-shaped perturbation masses 6 are considered as pillars of a house, the single plate can be considered as a roof.

This configuration of the perturbation masses 6 is realized by disposing metal or conductive metallic alloy to form the needle-shaped perturbation masses 6 into the opening of the resist thick film 70 and the roof of the perturbation masses 6. The roof of the perturbation masses 6 improves the stiffness thereof such that a resonant frequency of the standing wave can be increase to be higher. This leads to an expectation that the angular rate sensor is insensitive to external vibration noise.

In a method for fabricating the perturbation masses 6 having the roof, a resist thick film 70 of 10 μm and more thickness which is to be masked is formed on the driving electrodes 7-10, reflectors 11, 12, and the detecting electrodes 13-16 which covers on the surface of the piezoelectric film 5, or on the surface of the piezoelectric film 5, and apertures in the shape of a pattern of which the perturbation masses 6 and an opening in the shape of the roof are arranged. Next, metal or conductive metallic alloy is deposited to form the needle-shaped perturbation masses 6 with the roof into the apertures and the opening of the resist thick film 70. The shape of the roof is not only platy but also lattice-like. However, the former is preferable in the point of view of stiffness.

In the sixth embodiment described above in which the second electrode 30, the driving electrodes 7-10, the reflectors 11, 12, and the detecting electrodes 13-16 are disposed directly on the upper surface of the piezoelectric film 5, as shown in FIGS. 19 and 21.

Figure 28A:
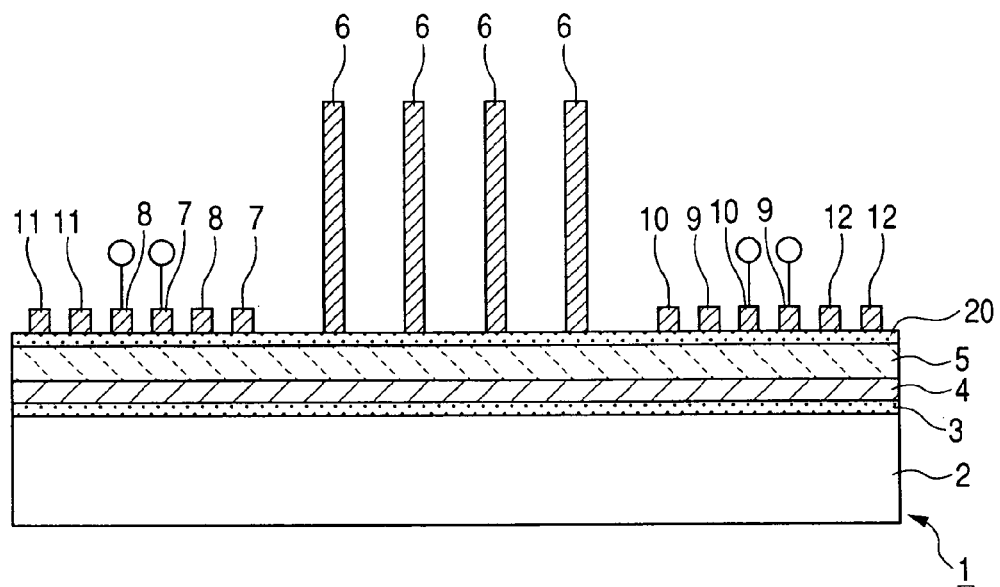
FIGS. 28A and 28B show angular rate sensors according to the modifications of the sixth embodiment.
Figure 28B:
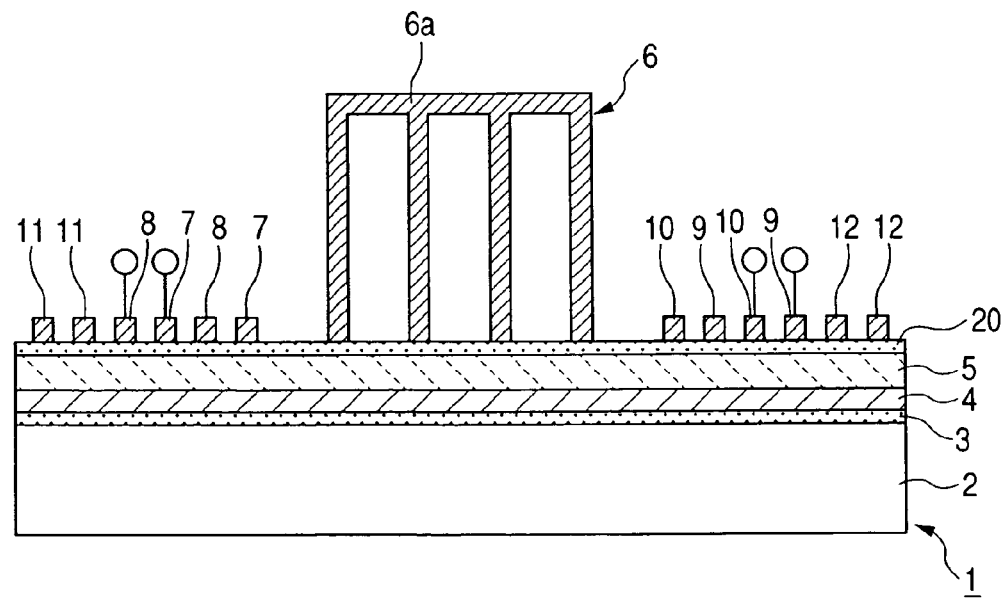

As shown in FIGS. 28A and 28B, if necessary, a thin insulator film 20 is formed and inserted between the upper surface of the piezoelectric film 5 and the features which include the perturbation masses 6, the driving electrodes 7-10, the reflectors 11, 12, and the detecting electrodes 13-16. Consequently, the second electrode 30, the driving electrodes 7-10, the reflectors 11, 12, and the detecting electrodes 13-16 are formed on the thin insulator film 20. In this configuration, the second electrode 30, the driving electrodes 7-10, the reflectors 11, 12, and the detecting electrodes 13-16 are disposed on the thin insulator film 20. In this configuration, it is possible to prevent etching the piezoelectric film 5 while the thin film of metal or conductive metallic alloy is patterned to form the second electrode 30, the perturbation masses 6, and the driving electrodes 7-10.

Further, even though the angular rate sensor according to the sixth embodiment in which the first electrode 4 is formed below the driving electrodes 7-10 and perturbation masses 6 is made of a metal or a metal alloy whose mass density is larger than that of driving electrodes 7-10, is disclosed, the first electrode 4 is not a crucial component for an angular rate sensor 1 having higher sensitivity if perturbation masses 6 of the angular rate sensor 1 is made of a metal or a metal alloy whose mass density is larger than that of driving electrodes 7-10.

Seventh Embodiment

Referring to FIGS. 29A-32, an angular rate sensor according to the seventh embodiment of the present invention will now be explained. In this embodiment, the identical components in structure to those in the previous embodiments are assigned to the same reference numerals for simplicity and the description of these components are omitted from the detailed explanations.

Figure 29A:
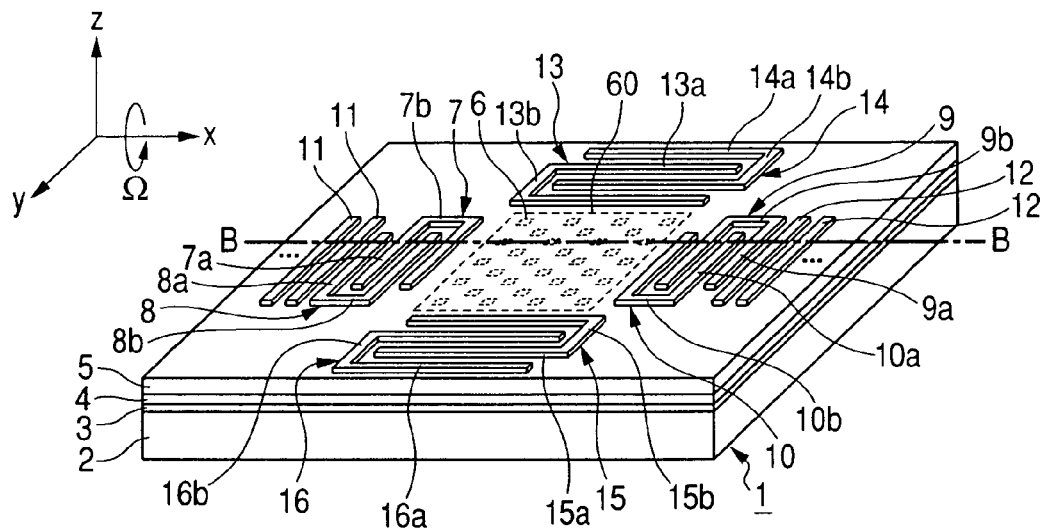
Figure 29B:
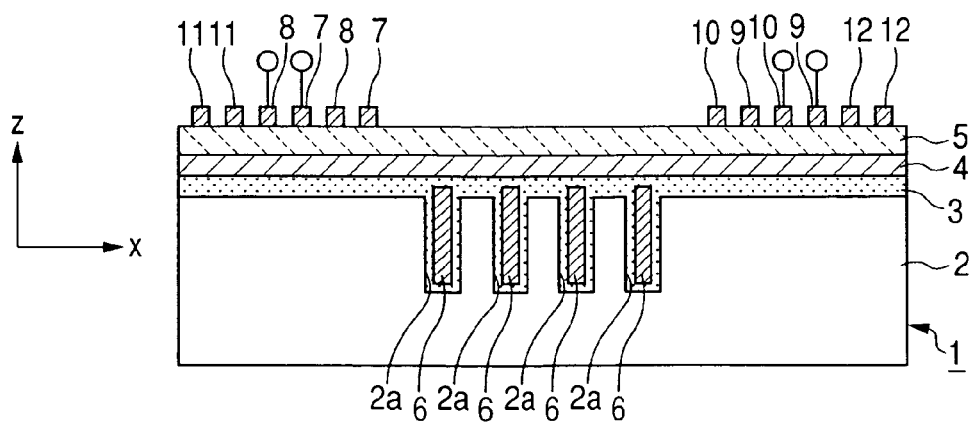

FIG. 29A and FIG. 29B show an angular rate sensor 1 according to the seventh embodiment. FIG. 29A shows a bird's-eye view of the angular rate sensor 1 and FIG. 29B shows a cross-sectional view taken along B-B line in FIG. 29A.

As shown in FIG. 29A, an angular rate sensor 1 in this embodiment having a plurality of trenches 2a in the semiconductor substrate 2 into which the perturbation masses 6 are accommodated. In this configuration, the perturbation masses 6 are located under the piezoelectric film 5. More concretely, the plurality of the trenches 2a whose number is the same with that of the perturbation masses 6 is formed in the semiconductor substrate 2. Each of the perturbation masses 6 is accommodated into the corresponding trench 2a. Then, the insulator film 3 such as silicon dioxide film is formed so as to cover the perturbation masses 6. On the insulator film 3, the first electrode 4 disposed on the first insulator film 3, the piezoelectric film 5 disposed on the first electrode 4, the perturbation masses 6 which emphasize the Coriolis force during the angular rate sensor rotating, the driving electrode 7-10 for causing a first elastic acoustic wave in the piezoelectric film 5, the reflectors 11, 12 for reflecting the elastic acoustic wave caused by the driving electrodes 7-10 to form a standing wave of the elastic acoustic wave in the piezoelectric film 5, the detecting electrodes 13-16 for detecting a second elastic wave generated by the Coriolis force acting on the perturbation masses 6, are formed. In this configuration, the perturbation masses 6 are made of a material such as platinum (Pt), gold (Au), and tungsten (W) which have higher mass density than that of the semiconductor substrate 3.

As shown in FIG. 29B, the angular rate sensor 1 having the perturbation masses 6 embedded into the semiconductor substrate 3 and made of a material having higher mass density than that of the semiconductor substrate 3, achieves higher sensitivity since the heavy perturbation masses 6 is obtained. As a result, a limitation of the displacement of the vibrating perturbation masses 6 accommodated into the openings in the z-direction is eliminated.

A method for fabricating the angular rate sensor 1 according to the seventh embodiment will be described.

FIG. 30 shows a flow chart of steps for manufacturing the angular rate sensor 1 according to the fourth embodiment includes a preparing step (S700) for preparing the semiconductor substrate 2, a trench forming step (S702) for forming a plurality of trenches 2a in the semiconductor substrate 2, a first insulator film forming step (S704) for disposing the insulator film 3 on an exposed surface of every trench 2a, a perturbation mass forming step (S706) for forming the perturbation masses 6 in the trenches 2a whose surfaces are coated by the insulator film 3, a second insulator film forming step (S708) for disposing the insulator film 3 on the top of the trenches 2a and the insulator film 3 formed in the first insulator film forming step, a piezoelectric film forming step (S710) for forming the piezoelectric film 5 so as to cover the plurality of the trenches, the perturbation masses and the semiconductor substrate, and a fabricating step (S712) for fabricating a plurality of features on the piezoelectric film 5, wherein the plurality of features includes the perturbation masses 6, a driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave.

FIGS. 31A-31G illustrate the steps performed in the method for manufacturing the angular rate sensor 1 according to this embodiment.

Figure 31A:
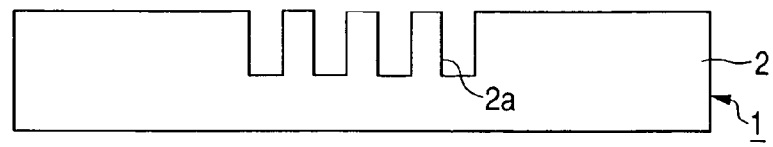
FIGS. 31A to 31G illustrate the steps performed in the method for manufacturing the angular rate sensor according to the seventh embodiment.

First, as shown in FIG. 31A in the method for manufacturing the angular rate sensor 1 according to the first embodiment, a (100)-oriented silicon substrate 2 of 400 μm thickness is prepared (S700 in FIG. 30).

Next, the trenches 2a are formed in the semiconductor substrate 2 such as silicon substrate using photolithography technique (S702 in FIG. 30). For example, if silicon substrate is used as the semiconductor substrate, an upper surface of the silicon substrate is cleaned by using acetone, isopropanol and trichloroethylene, in turn. The surface of the silicon substrate is then thoroughly rinsed in de-ionized water and subsequently heated on a hot plate to remove surface moisture. Upon cooling the substrate on a heat sinking plate, photoresist is then spin coated on the silicon substrate after soaking the hexamethyldisilazane, an adhesion agent. Then the soft-bake process is performed in which the substrate is heated. A negative-mask is set in place over the photoresist. The negative mask is a template defining the patterns of the substrate. The silicon substrate is then exposed to ultra-violet (UV) light such that the regions of the resist which are exposed become soluble to the developer. Thus, a pattern is formed having a plurality of apertures therethrough. The substrate is soaked in photoresist and developed until the sections which has been exposed to UV light, and are therefore soluble, are etched away.

For example, dry etching is applicable to etch the trenches 2a. A gas including fluorine, such as a CF-type gas including C4F8, or a SF-type gas including SF6, is used as etching gas for the dry etching. The etching gas is changed into plasma to produce fluorine radicals, and etching is performed by processing the silicon substrate with the fluorine radicals.

Figure 31B:
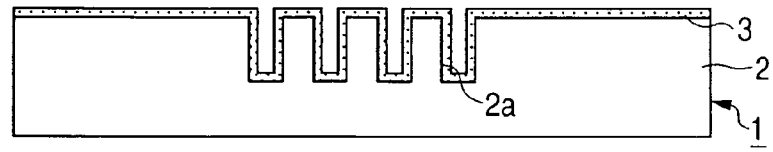

Next, as shown in FIG. 31B, a thin silicon dioxide film which is thinner than 1 μm, is thermally grown on the exposed surface of the trenches 2a and upper surface of the silicon substrate 2 (S704 in FIG. 30).

Figure 31C:
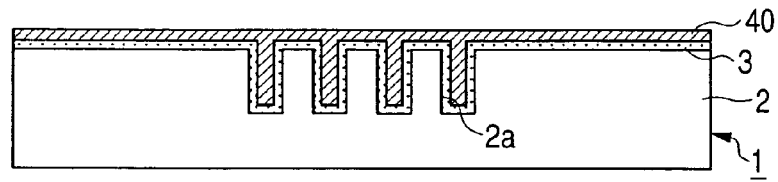

Next, as shown in FIG. 31C, a metal or conductive metallic alloy 40 including platinum (Pt), gold (Au), and tungsten (W) is deposited using an e-beam evaporator, and patterned by a phosphoric ($H_3PO_4$)-based acid on the exposed surface of the trenches 2a and upper surface of the silicon substrate 2 to form the perturbation masses 6 (S706 in FIG. 30).

Figure 31D:
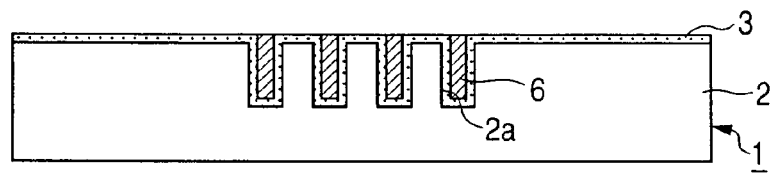

Next, as shown in FIG. 31D, the upper surface of the metal or conductive metallic alloy 40 is etched back until the surface of the silicon dioxide 3 is exposed (S708 in FIG. 30). In this step, not only dry etching technique but also chemical mechanical polishing (CMP) technique are applicable.

Figure 31E:
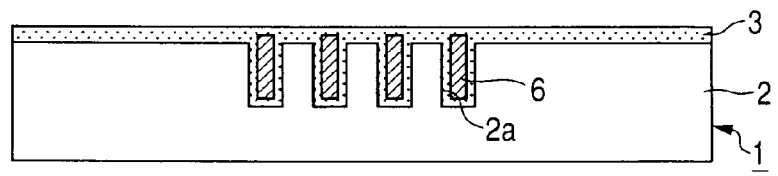

Next, as shown in FIG. 31E, a silicon dioxide film is thermally grown so as to cover the trenches 2a and from the perturbation masses 6 inside the silicon dioxide. 3

Figure 31F:
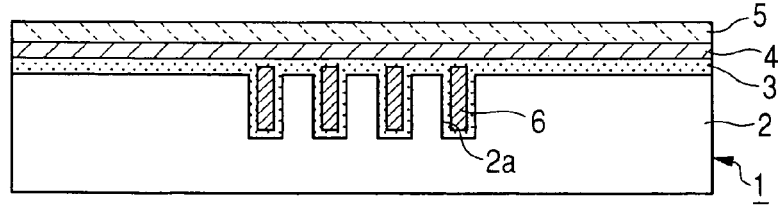

Next, as shown in FIG. 31F, a several micrometer thick film of a piezoelectric film such as aluminum nitride (AlN), zinc oxide (ZnO), zirconate titante (PZT), lead titanate (PT), lithium tantalate ($LiTaO_3$), and lithium tantalite (LT), is disposed so as to cover the whole region of an upper surface of the first electrode 4 (S710 in FIG. 30). If an aluminum nitride (AlN) film is used as the first electrode 4, the AlN film is patterned by a tetra methyl ammonium hydroxide-based solvent.

Figure 31G:
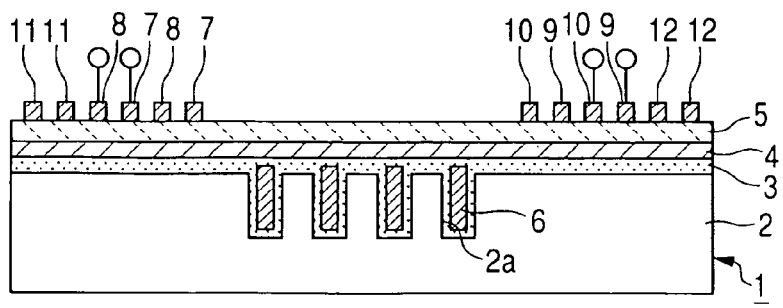

Next, as shown in FIG. 31G, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the driving electrodes 7-10, reflectors 11, 12, and the detecting electrodes 13-16 on an upper surface of the piezoelectric film 5, in the same way shown in FIG. 4C(S712 in FIG. 30).

Finally, the supplying driving voltage lines and ground lines are formed and connected to the driving electrodes 7-10, reflectors 11, 12, and the detecting electrodes 13-16 by wire bonding.

Modification of Seventh Embodiment

In the seventh embodiment described above in which the driving electrodes 7-10, the reflectors 11, 12, and the detecting electrodes 13-16 are disposed directly on the upper surface of the piezoelectric film 5.

Figure 32:
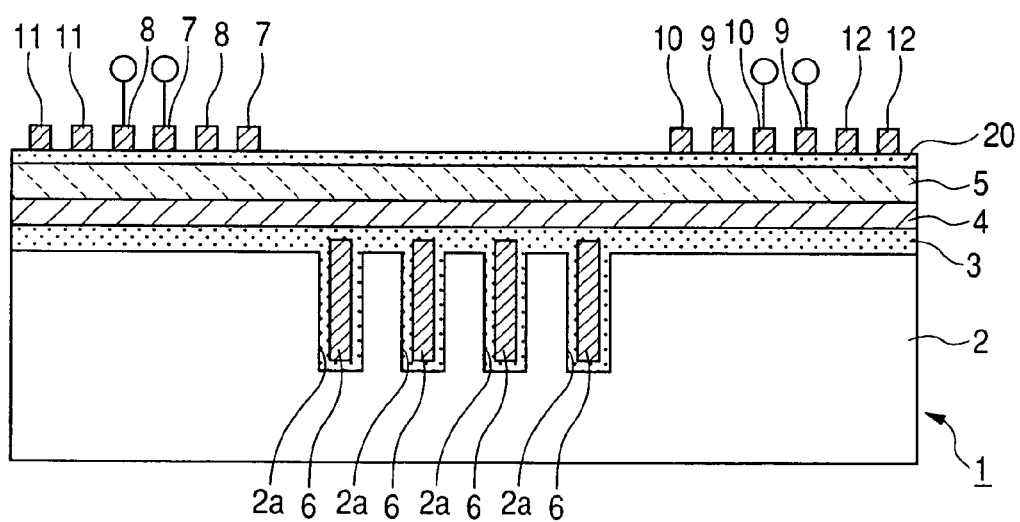
FIG. 32 shows a cross-sectional view of the angular rate sensor according to the modification of the seventh embodiment.

As shown in FIG. 32, if necessary, a thin insulator film 20 is formed and inserted between the upper surface of the piezoelectric film 5. Consequently, the second electrode 30, the driving electrodes 7-10, the reflectors 11, 12, and the detecting electrodes 13-16 are formed on the thin insulator film 20. In this configuration, the second electrode 30, the driving electrodes 7-10, the reflectors 11, 12, and the detecting electrodes 13-16 are disposed on the thin insulator film 20. In this configuration, it is possible to prevent etching the piezoelectric film 5 while the thin film of metal or conductive metallic alloy is patterned to form the second electrode 30, the perturbation masses 6, and the driving electrodes 7-10.

Further, even though the angular rate sensor according to the seventh embodiment in which the first electrode 4 is formed below the driving electrodes 7-10 and perturbation masses 6 is made of a metal or a metal alloy whose mass density is larger than that of driving electrodes 7-10, is disclosed, the first electrode 4 is not a crucial component for an angular rate sensor 1 having higher sensitivity if perturbation masses 6 of the angular rate sensor 1 is made of a metal or a metal alloy whose mass density is larger than that of driving electrodes 7-10.

Eighth Embodiment

Referring to FIGS. 33A-38, an angular rate sensor according to the eighth embodiment of the present invention will now be explained. In this embodiment, the identical components in structure to those in the previous embodiments are assigned to the same reference numerals for simplicity and the description of these components are omitted from the detailed explanations.

Figure 33A:
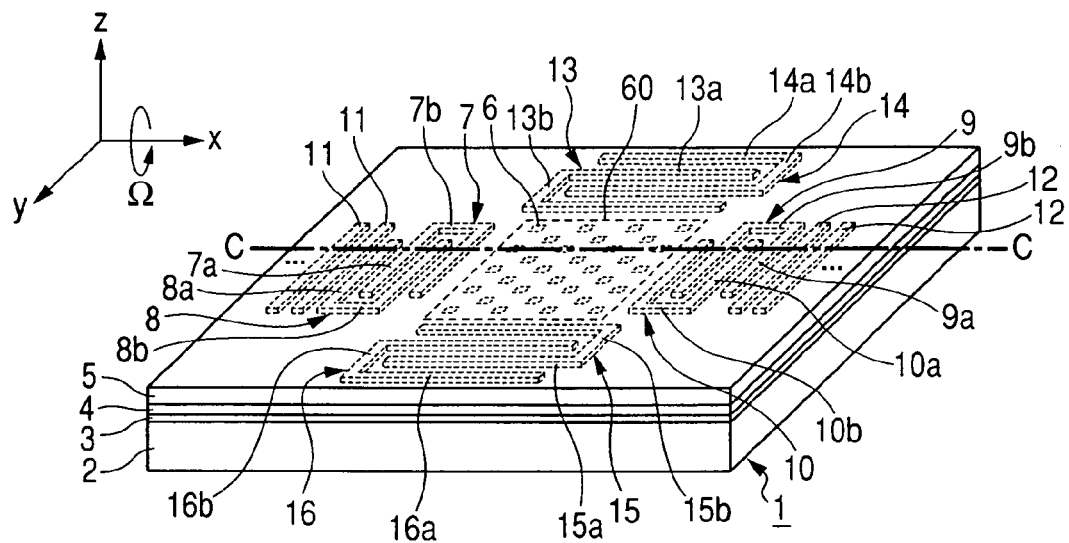
Figure 33B:
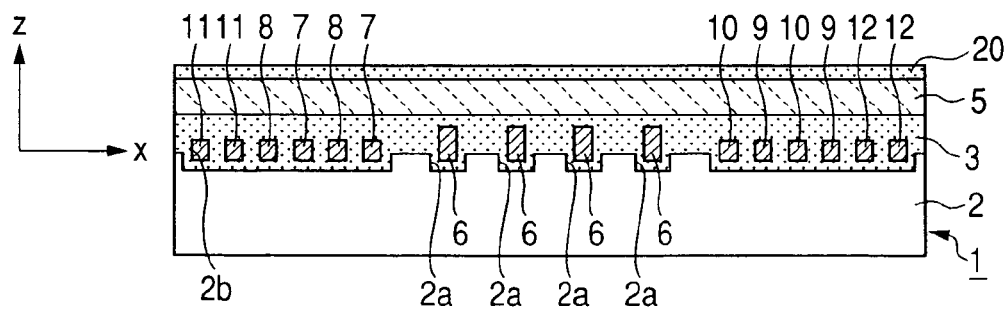

FIG. 33A and FIG. 33B show an angular rate sensor 1 according to the eighth embodiment. FIG. 33A shows a bird's-eye view of the angular rate sensor 1 and FIG. 33B shows a cross-sectional view taken along C-C line in FIG. 33A.

As shown in FIG. 33A, an angular rate sensor in this embodiment is arranged such that all of the driving electrodes 7-10, the reflectors 11, 12, and the detecting electrodes 13-16 are immersed into the semiconductor substrate 2 such as silicon substrate. Therefore, all of the driving electrodes 7-10, the reflectors 11, 12, and the detecting electrodes 13-16 are located under the piezoelectric film 5. An thin insulator film 20 is formed on the piezoelectric film 5. In this arrangement, the first electrode 4 is not needed for the neutralizing the polarization occurred in the z-direction of the piezoelectric film 5. In more detail, the angular rate sensor 1 has a plurality of trenches 2a in the semiconductor substrate 2 into which not only the perturbation masses 6 but also the driving electrodes 7-10, the reflectors 11, 12, and the detecting electrodes 13-16 are accommodated. The surfaces of the trenches 2a is coated by the thin insulator film 4 such as silicon dioxide film. The perturbation masses 6, the driving electrodes 7-10, the reflectors 11, 12, and the detecting electrodes 13-16 are formed on the thin insulator film 4 such that all of the perturbation masses 6, the driving electrodes 7-10, the reflectors 11, 12, and the detecting electrodes 13-16 are accommodated into the corresponding trench 2a. After the perturbation masses 6, the driving electrodes 7-10, the reflectors 11, 12, and the detecting electrodes 13-16 are disposed, the insulator film 3 is additionally grown so as to embed features 6-16 thereinto. On the insulator film 4, the piezoelectric film 5 and a further thin insulator film 20 are formed, in this order.

As shown in FIG. 33B, the angular rate sensor having the perturbation masses 6, the driving electrodes 7-10, the reflectors 11, 12, and the detecting electrodes 13-16, all embedded into the semiconductor substrate 3 and the perturbation masses 6 made of a material having higher mass density than that of the semiconductor substrate 3, achieves higher sensitivity since the heavy perturbation masses 6 is obtained. As a result, a limitation of the displacement of the vibrating perturbation masses 6 accommodated into the openings in the z-direction is eliminated.

In the angular rate sensor of this type, the driving electrodes 7-10 and the detecting electrodes 13-16 are electrically connected to the external driving and measuring circuit via contact holes (not shown in figures) formed in the further insulator film 20 and the piezoelectric film 5.

A method for fabricating the angular rate sensor 1 according to the eighth embodiment will be described.

Figure 34:
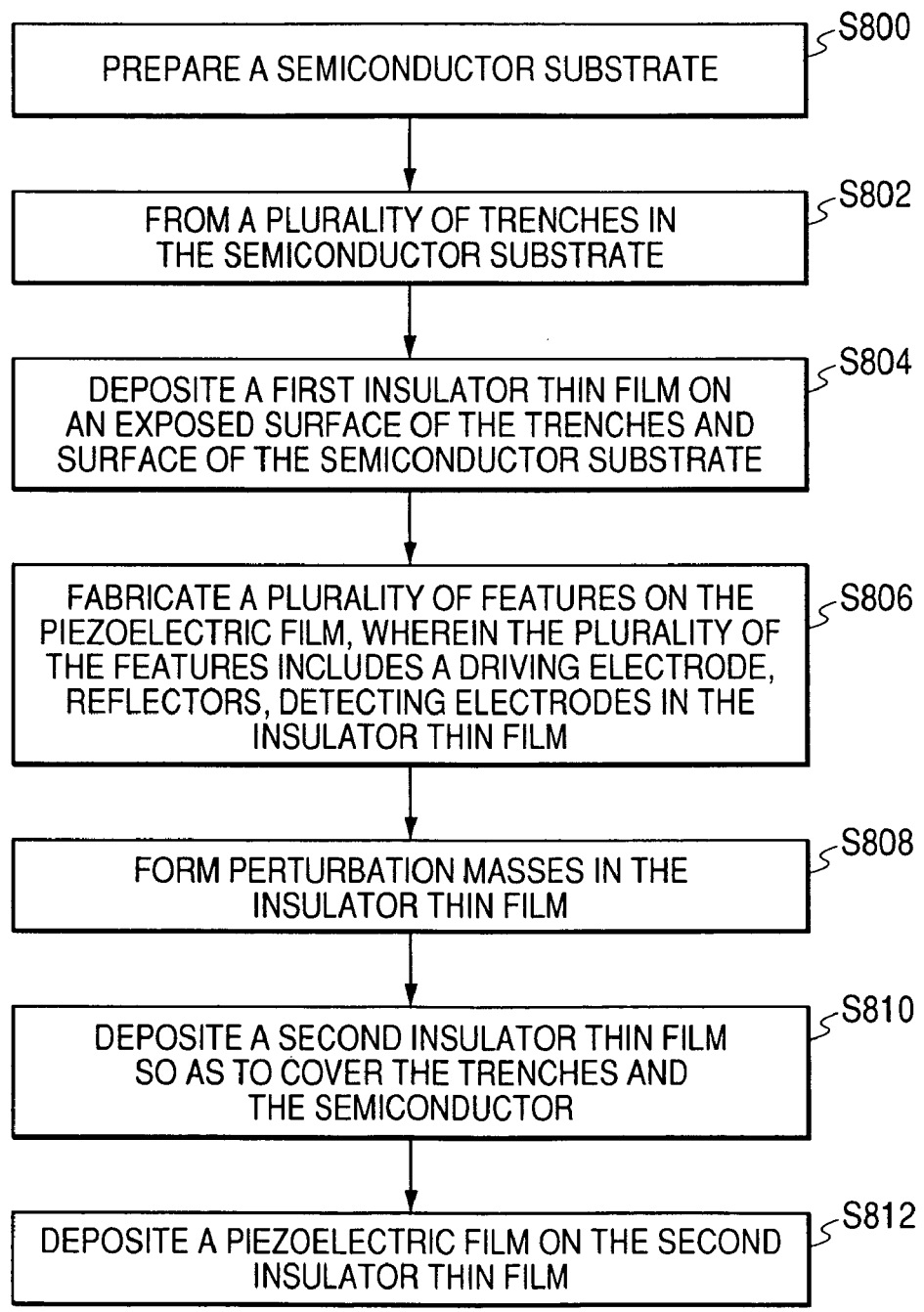
FIG. 34 is a flow chart of steps for manufacturing the angular rate sensor shown in FIG. 33A and FIG. 33B according to the eighth embodiment of the present invention.

FIG. 34 shows a flow chart of steps for manufacturing the angular rate sensor 1 according to the eighth embodiment includes a preparing step (S800) for preparing the semiconductor substrate 2, a trench forming step (S802) for forming a plurality of trenches 2a in the semiconductor substrate 2, a first insulator film forming step (S804) for disposing the insulator film 3 on an exposed surface of every trench 2a, a fabricating step (S806) for fabricating a plurality of features in the insulator film 3, wherein the plurality of features includes a driving electrode 7-10 for causing an elastic acoustic wave in the piezoelectric film 5, reflectors 11, 12 for reflecting the elastic acoustic wave so as to form a first and a second standing wave, and detecting electrodes 13-16 for detecting a second standing wave caused by the Coriolis force acting on the first standing wave, a perturbation mass forming step (S808) for forming the perturbation masses 6 in the trenches 2a whose surfaces are coated by the insulator film 3, a second insulator film forming step (S810) for disposing the insulator film 3 on the top of the trenches 2a and the insulator film 3 formed in the first insulator film forming step, and a piezoelectric film forming step (S812) for forming the piezoelectric film 5 so as to cover the plurality of trenches, the perturbation masses and the semiconductor substrate.

FIGS. 35A-35G illustrate the steps performed in the method for manufacturing the angular rate sensor 1 according to this embodiment.

Figure 35A:
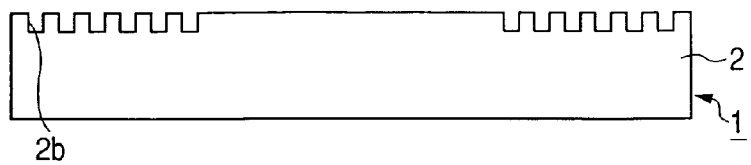
FIGS. 35A to 35G illustrate the steps performed in the method for manufacturing the angular rate sensor according to the eighth embodiment.

First, as shown in FIG. 35A in the method for manufacturing the angular rate sensor 1 according to the first embodiment, a (100)-oriented silicon substrate 2 of 400 µm thickness is prepared (S800 in FIG. 34).

Next, the trenches 2a are formed for forming the driving electrodes 7-10, the reflectors 11, 12, the detecting electrodes 13-16 in the semiconductor substrate 2 such as silicon substrate using photolithography technique (S802 in FIG. 34). For example, if silicon substrate is used as the semiconductor substrate, an upper surface of the silicon substrate is cleaned by using acetone, isopropanol and trichloroethylene, in turn. The surface of the silicon substrate is then thoroughly rinsed in de-ionized water and subsequently heated on a hot plate to remove surface moisture. Upon cooling the substrate on a heat sinking plate, photoresist is then spin coated on the silicon substrate after soaking the hexamethyldisilazane, an adhesion agent. Then the soft-bake process is performed in which the substrate is heated. A negative-mask is set in place over the photoresist. The negative mask is a template defining the patterns of the substrate. The silicon substrate is then exposed to ultra-violet (UV) light such that the regions of the resist which are exposed become soluble to the developer. Thus, a pattern is formed having a plurality of apertures therethrough. The substrate is soaked in photoresist and developed until the sections which has been exposed to UV light, and are therefore soluble, are etched away to form the driving electrodes 7-10, the reflectors 11, 12, the detecting electrodes 13-16.

For example, dry etching is applicable to etch the trenches 2a. A gas including fluorine, such as a CF-type gas including C4F8, or a SF-type gas including SF6, is used as etching gas for the dry etching. The etching gas is changed into plasma to produce fluorine radicals, and etching is performed by processing the silicon substrate with the fluorine radicals.

Figure 35B:
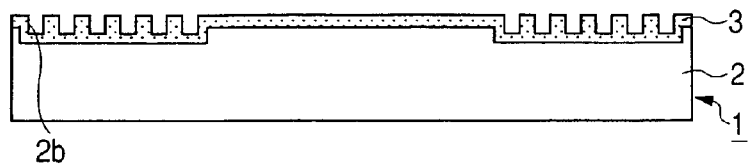

Next, as shown in FIG. 35B, a thin silicon dioxide film which is thinner than 1 µm, is thermally grown on the exposed surface of the trenches 2a and upper surface of the silicon substrate 2 (S804 in FIG. 34).

Figure 35C:
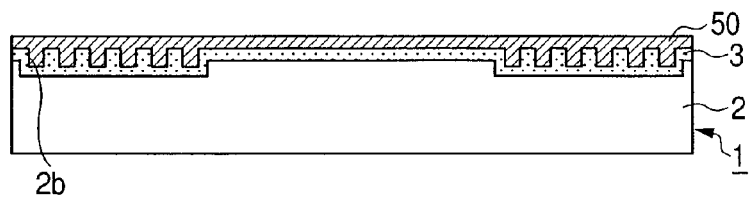

Next, as shown in FIG. 35C, a metal or conductive metallic alloy 50 including platinum (Pt), gold (Au), and tungsten (W) is deposited using an e-beam evaporator, and patterned by a phosphoric ($H_3PO_4$)-based acid on the exposed surface of the trenches 2a and upper surface of the silicon substrate 2 to form the driving electrodes 7-10, the reflectors 11, 12, the detecting electrodes 13-16.

Figure 35D:
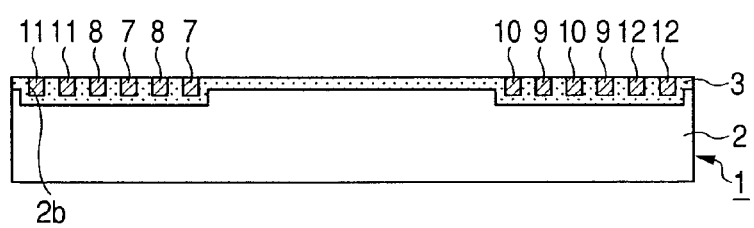

Next, as shown in FIG. 35D, the upper surface of the metal or conductive metallic alloy 50 is etched back until the surface of the silicon dioxide 3 is exposed. In this step, not only dry etching technique but also chemical mechanical polishing (CMP) technique are applicable.

Figure 35E:
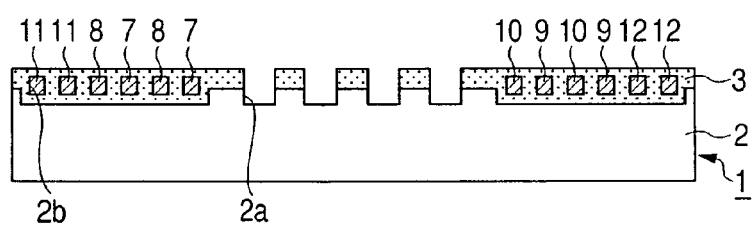
Figure 35F:
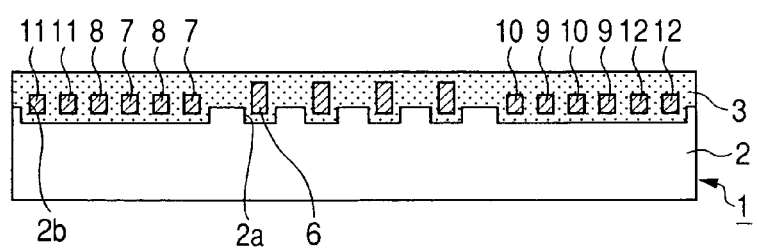

Next, as shown in FIG. 35E, a silicon dioxide film is thermally grown so as to cover the trenches 2a and from the driving electrodes 7-10, the reflectors 11, 12, the detecting electrodes 13-16 inside the silicon substrate 2. In this step, the driving electrodes 7-10, the reflectors 11, 12, the detecting electrodes 13-16 inside the silicon substrate 2 are finished to be formed (S806 in FIG. 34).

Next, the trenches 2a for forming the perturbation masses 6 are formed in the semiconductor substrate 2 such as silicon substrate using photolithography technique, in the similar method mentioned above. A metal or conductive metallic alloy is deposited using an e-beam evaporator, and patterned by a phosphoric ($H_3PO_4$)-based acid on the exposed surface of the trenches 2a and upper surface of the silicon substrate 2 to form the perturbation masses 6.

The perturbation masses 6a is formed by growing silicon dioxide film on the silicon dioxide 3 so as to cover the trenches 2a and from the perturbation masses 6 (S808 in FIG. 34).

Figure 35G:
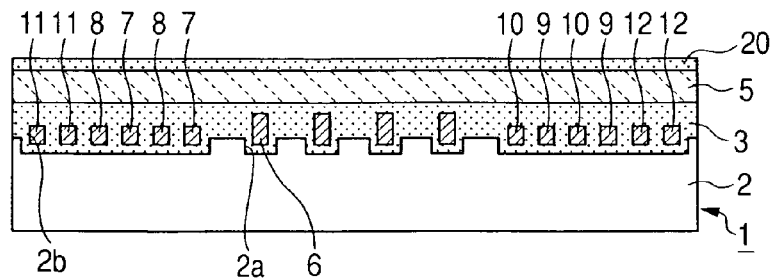

Next, as shown in FIG. 35G, a several micrometer thick film of a piezoelectric film such as aluminum nitride (AlN), zinc oxide (ZnO), zirconate titante (PZT), lead titanate (PT), lithium tantalite ($LiTaO_3$), and lithium tantalite (LT), is disposed so as to cover the whole region of an upper surface of the first electrode 4 (S812 in FIG. 34). If an aluminum nitride (AlN) film is used as the first electrode 4, the AlN film is patterned by a tetra methyl ammonium hydroxide-based solvent.

Next, a silicon dioxide film is thermally grown to form the thin insulator film 20 on the piezoelectric film 5.

Finally, the supplying driving voltage lines and ground lines are formed and connected to the driving electrodes 7-10, reflectors 11, 12, and the detecting electrodes 13-16 by wire bonding.

Modification of Eighth Embodiment

Figure 36:
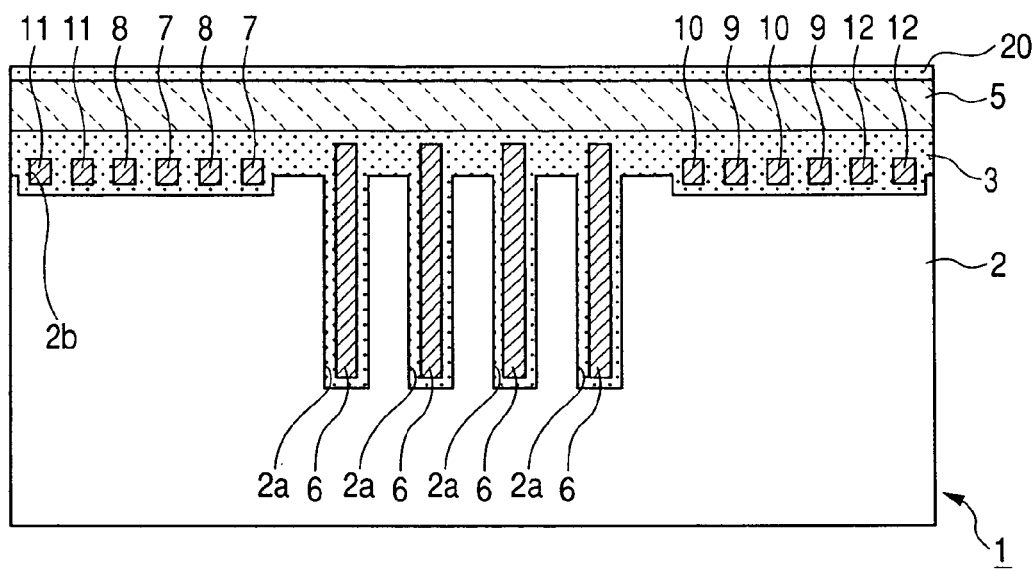
FIG. 36 shows a cross-sectional view of the angular rate sensor according to the first modification of the eighth embodiment.

As shown in FIG. 36, in order to fabricate the heavy perturbation masses 6, it is preferable that the depth of the perturbation masses 6 is large. In this modification of the eighth embodiment, each of the perturbation masses 6 are shaped like a needle.

Further, if the perturbation masses 6 is made of a metal or a metal alloy whose mass density is larger than that of driving electrodes 7-10, an angular rate sensor 1 having higher sensitivity is realized.

Figure 37:
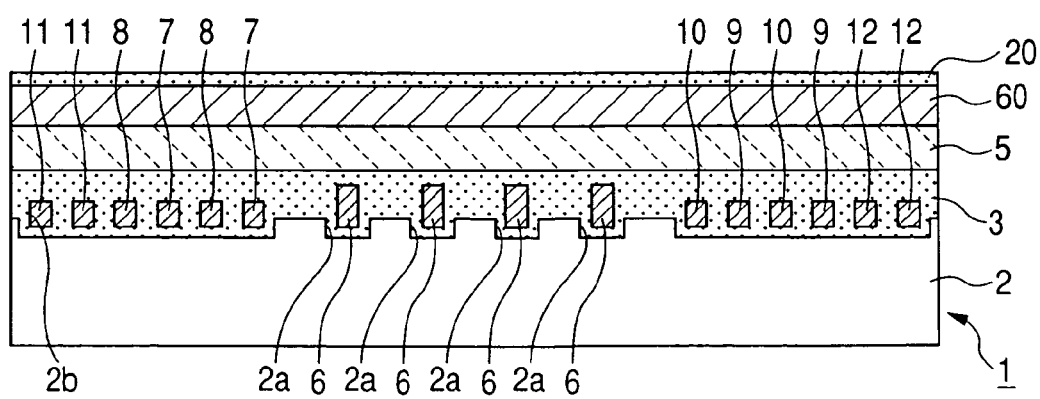
FIG. 37 shows a cross-sectional view of the angular rate sensor according to the second modification of the eighth embodiment.

Further, as shown in FIG. 37, it is preferable that a conductive film 60 is formed on the piezoelectric substrate 5. The angular rate sensor having the conductive film 60 formed on the piezoelectric film 5 becomes to be possible to generate and keep a predetermined voltage between the driving IDT and the conductive film such that electric power is efficiently inputted into the piezoelectric film since the electric potential level of the piezoelectric film 5 is capable to be kept constant. Further, if the conductive film 60 is connected to a ground, the conductive film acts as a shield. This fact leads to an expectation that the angular rate sensor 1 is insensitive to external electric noise. Therefore, it becomes possible that the angular rate sensor 1 has high sensitivity since the electric signal level is increased due to an electronic noise reduction effect of the conduction film. The conduction film is capable for making of one of impurity doped poly-silicon, aluminum (Al), aluminum-base alloy, titanium (Ti), titanium-base alloy, tungsten, tungsten-base alloy, molybdenum, and molybdenum-base alloy.

Figure 38:
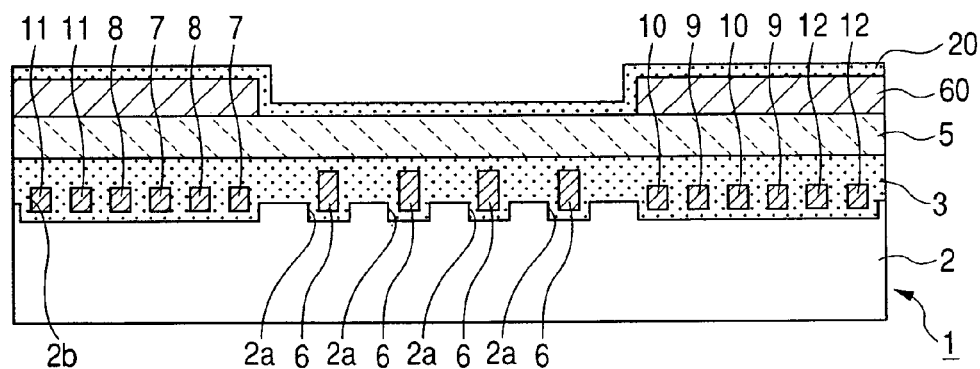
FIG. 38 shows a cross-sectional view of the angular rate sensor according to the third modification of the eighth embodiment.

Further, as shown in FIG. 38, in the angular rate sensor having a conductive film 60 formed on the piezoelectric substrate 5 and an opening over the predetermined region 60 below which the perturbation masses 6 is formed, the piezoelectric material composing the piezoelectric film 5 is expelled from the openings. The opening is formed using photolithography technique.

Modification of Fifth to Eighth Embodiments

Further, in the angular rate sensors according to the fifth to eighth embodiments, the driving IDTs and detecting IDTs consists of the comb-shaped electrode 7-10, 13-16. However, the driving IDTs and detecting IDTs are limited to these configurations but other shaped electrodes can be used for the components of the driving IDTs and the detecting IDTs.

Further, in the angular rate sensors according to the fifth to eighth embodiment, the driving electrodes 7-10 are located such that the driving electrodes 7-8 are disposed at one side of the predetermined region 60 and the driving electrodes 9-10 are disposed at another side of the predetermined region 60.

However, it is not necessary to form the driving electrodes 7-10 at both sides of the predetermined region 60. In a modification of the angular rate sensor according to the first to third embodiments, at least one pairs of the driving electrodes 7-8 and the driving electrodes 9-10 is formed.

Further, it is preferable that in the method for manufacturing the angular rate sensor 1 according to the sixth embodiment, a selective etching technique having the proper etching ratio of one material of the driving electrode 7-10 to another material of the perturbation masses 6 is used. If it is not possible to use the selective etching technique, the liftoff technique is applicable for forming the perturbation masses 6.

Ninth Embodiment

Referring to FIGS. 39A to 44B, an angular rate sensor according to the ninth embodiment of the present invention will now be explained. In this embodiment, the identical components in structure to those in the previous embodiments are assigned to the same reference numerals for simplicity and the description of these components are omitted from the detailed explanations.

Figure 39A:
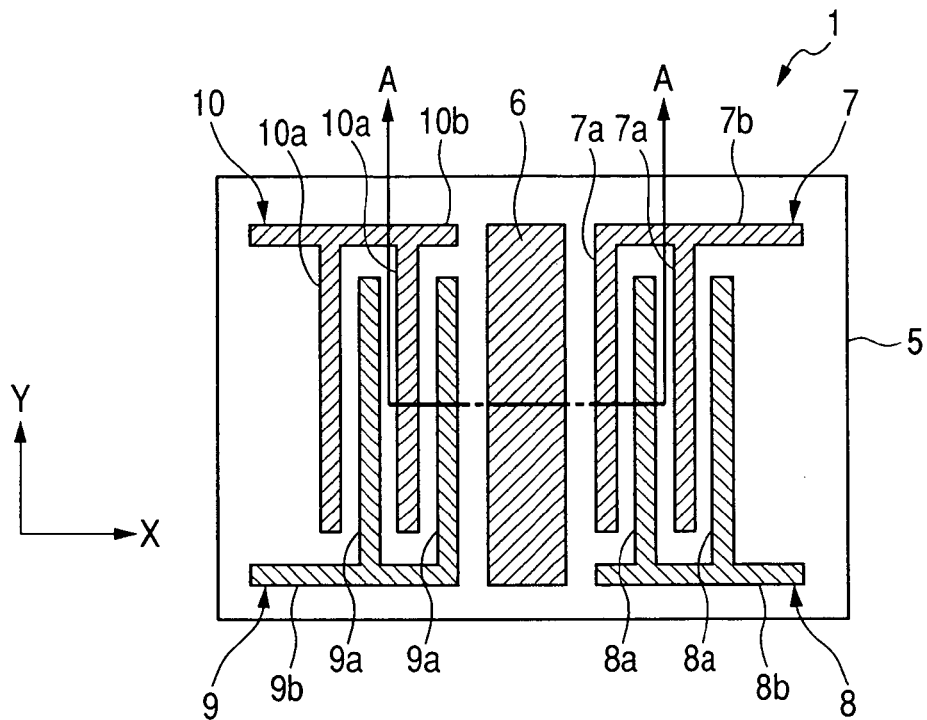
Figure 39B:
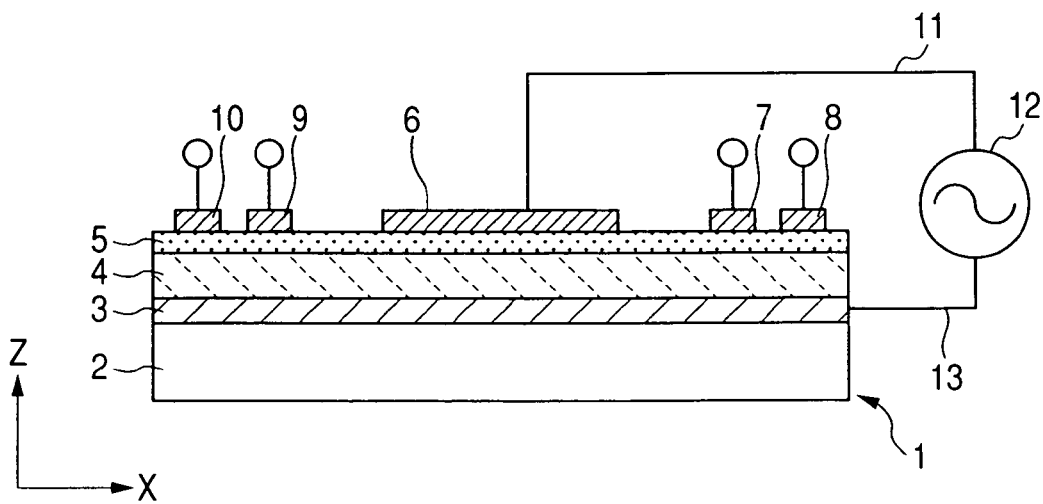

FIG. 39A and FIG. 39B show a structure of an angular rate sensor 1 according to a ninth embodiment of the present invention. FIG. 39A is a bird's-eye view of the angular rate sensor 1 and FIG. 39B is a cross-sectional view thereof taken along line A-A in FIG. 39A.

As shown in FIG. 39B, the angular rate sensor 1 according to a ninth embodiment comprising a supporting member 2 made of an insulating substrate or a semiconductor substrate having a high resistivity. The angular rate sensor 1 further comprises sensing components disposed on the upper surface of the supporting member 2.

A thin insulator film 3 is formed on the upper surface of the semiconductor substrate 2 so as to cover a whole surface of the semiconductor substrate 2. The thin insulator film is made of silicon oxide ($SiO_2$), for example. The thickness of the thin insulator film is order of 1 μm.

On the thin insulator film 3, a first electrode 3 which is several hundreds nanometer is formed. The first electrode 3 is composed of one of aluminum (Al), aluminum (Al)-silicon (Si) alloy, aluminum (Al)-silicon (Si)-copper (Cu) alloy, and impurity-doped poly-silicon with the semiconductor production technology for very-large-scale integrated circuits (VLSIs) by taking account of an environmental metal pollution.

A piezoelectric film 4 is disposed on the first electrode 3 so as to cover the whole surface of the first electrode 3. The thickness of the piezoelectric film 4 is about several micrometers. For example, the piezoelectric film 4 is made of aluminum nitride (AlN) or zinc oxide (ZnO), but also of a piezoelectric and ferroelectric film such as PTZ:$Pb(ZrTi)O_3$, PT:$PbTiO_3$, and the like. In the case where the piezoelectric film is made of aluminum nitride (AlN), an integration of the other functional device, such as complementary metal-oxide-semiconductors (CMOS), into the angular rate sensor is possible to achieve without taking into account of an environmental metal pollution.

A thin insulator film 5 is formed on the piezoelectric film 4. It is especially preferable in the case where the piezoelectric film 4 is made of AlN that the thin insulator film 5 is formed on the upper surface of the piezoelectric film 4 in order to suppress a leakage electric current flowing along the z-direction in the piezoelectric film 4.

Further, perturbation masses 6 also serving as a second electrode, and detecting electrodes 7-10 are disposed on the piezoelectric film 4. A plurality of the detecting electrodes constructs a detecting inter-digital transducers (hereinafter, "detecting IDTs").

If the perturbation masses 6 also serving as the second electrode and detecting electrodes 7-10 are made of any one of impurity doped poly-silicon, aluminum (Al), and Al—Si—Cu with the semiconductor production technology for VLSIs, it is not necessary to take into account of the environmental metal pollution during manufacturing the angular rate sensor.

Further, if the perturbation masses 6 also serving as the second electrode and detecting electrodes 7-10 are made of one of aluminum (Al), platinum (Pt), tungsten (W), and rubidium (Ru), mass density of the first electrodes is increased so that total weight of the first electrodes is increased.

As shown in FIG. 39A, the perturbation mass also serving the second electrodes 6 is formed in shape of rectangular. The detecting electrodes 7-10 are divided into the first group including the detecting electrodes 7-8 of which a first IDT consists, and the second group including the detecting electrodes 9-10 of which a second IDT consists. The second electrodes 7-10 formed in a comb-shape. The first IDT and the second IDT are positioned such that the perturbation mass also serving the second electrodes 6 is sandwiched between the first IDT and the second IDT in a direction perpendicular to the longer edge of the rectangular shaped perturbation mass 6.

As shown in FIG. 39B, in the angular rate sensor 1 according to this embodiment, the electric power supply 12 connects to the perturbation mass also serving the second electrodes 6 and the first electrode 3 via the supplying driving voltage line 11 and the ground line 13, respectively. For example, an alternating current (AC) voltage +B[V] is supplied to the perturbation mass also serving the second electrodes 6, whereas an alternating current (AC) voltage −B[V] is applied to the first electrode 3. The perturbation mass also serving the second electrodes 6 is excited to vibrate in the z-direction by the alternating current (AC) voltage.

The driving electrodes 7-8 are used to excite a first elastic acoustic wave in order to cause a standing wave on which a Coriolis force acts when the angular rate sensor is rotated. The driving electrodes 7, 8 are coupled for constituting a first driving inter-digital transducer (driving IDT). Each driving electrodes 7, 8 is formed in a comb-shape, that is, the driving electrodes 7, 8 include tooth components 7a, 8a, which are disposed to be parallel to the y-axis and connecting components 7b, 8b, which are disposed to be perpendicular to the y-direction and serves as connectors of a plurality of the tooth components 7a, 8a. In the driving electrodes 7, 8, the tooth components 7a, 8a, are arranged to be interlaid with each other. The connecting components 7b, 8b, are located face to face across the tooth components 7a, 8a. A spacing of tooth components 7a, 8a, of the driving electrodes 7, 8, in the x-direction determines a wavelength of an elastic acoustic wave generated by the perturbation mass 6, themselves.

Similarly to the driving electrodes 7, 8, the driving electrodes 9, 10 are coupled for constituting a second driving inter-digital transducer (driving IDT). The second driving IDT composed of detecting electrodes 9, 10, is positioned on an opposite side of the predetermined region 60 to the first driving IDT composed of the detecting electrodes 7, 8. Each driving electrodes 9, 10 is formed in a comb-shape. The driving electrodes 9, 10 include tooth components 9a, 10a, which are disposed to be parallel to the y-axis and connecting components 9b, 10b, which are perpendicular to the y-direction. The connecting components 9b, 10b bridge the tooth components 9a, 10a, thereby. As is the case of the driving electrodes 7, 8, the tooth components 9a, 10a, are arranged to be interlaid with each other and located to be spaced apart with a periodicity of one half the wavelength of the elastic acoustic wave generated by the driving IDTs 7-10 themselves.

The detecting electrodes 7-10 are made of one of impurity doped poly-silicon, aluminum (Al), aluminum-base alloy, titanium (Ti), titanium-base alloy, tungsten, tungsten-base alloy, molybdenum, and molybdenum-base alloy. If the detecting electrodes 7-10 are made of any one of impurity doped poly-silicon, aluminum (Al), and Al—Si—Cu with the semiconductor production technology for VLSIs, it is not necessary to take into account of the environmental metal pollution during manufacturing the angular rate sensor. If the perturbation mass also serving the second electrodes 6 is made of metals or metallic alloys including platinum (Pt), tungsten (W), and gold (Au). In such a configuration of the perturbation masses 6, the Coriolis force acting on the perturbation masses 6 is emphasized so as to increase the displacement of the perturbation masses 6. In consequence, it is possible to realize an angular rate sensor having high sensitivity.

In the following, the operations of the angular rate sensor 1 according to the ninth embodiment of the present invention will be described.

In the angular rate sensor 1 according to this embodiment, the sensing unit is driven by applying a driving voltage to the perturbation masses 6. For example, an alternating current (AC) voltage +B[V] is supplied to the perturbation masses 6, whereas an alternating current (AC) voltage −B[V] is applied to the first electrodes 3 from the electric power supply 12 via the supplying driving voltage line 11 and the ground line 13. So that, a voltage difference between the perturbation mass 6 and the first electrodes 4 is generated. By the piezoelectric effect, the perturbation mass 6 is vibrated in the z-direction so that elastic acoustic waves are caused and propagated along the x-direction.

If each perturbation mass 6 has a mass, m, and a velocity of each perturbation mass 6 $\vec{v}$, when the angular rate sensor 1 undergoes a rotary motion with an angular rotation $\vec{\Omega}$ perpendicular to the direction of the velocity of each perturbation mass 6 $\vec{v}$, causes the Coriolis force $\vec{F}$ perpendicular to the directions of both the vibrating motion $\vec{v}$, and the angular rotation $\vec{\Omega}$ Where the velocity of each perturbation mass 6, $\vec{v}$, and the angular rotation $\vec{\Omega}$ That is, if the angular rate sensor 1 rotates about the y-direction in FIGS. 39A and 39B, the Coriolis force is generated in the x-direction with amplitude $\vec{F}=|2m\vec{v}\times\vec{\Omega}|$ This Coriolis force causes a propagating elastic acoustic wave in the x-direction. This propagating elastic acoustic wave arrives at the detecting electrodes 7-10 and generates a change in electric potential of the detecting electrodes 7-10. Therefore, the angular rotation $\vec{\Omega}$ can be obtained.

In the angular rate sensor 1 having the above mentioned arrangement, rotation rate is measured based on the difference between a measured electric power detected by the comb-shaped detecting electrodes 7-8 and that by the comb-shaped detecting electrodes 9-10 so that effects of external noise in elastic acoustic waves are removed from final results of the measurement. The reason of this is if one of the output voltages detected by the detecting electrodes 7-8 and by the detecting electrodes 9-10, the measured voltage sometimes contains external noises. However, using the difference between a measured electric power detected by the comb-shaped detecting electrodes 7-8 and that by the comb-shaped detecting electrodes 9-10 leads a cancellation of the external noises during the measurement.

In the following, the operations of the angular rate sensor 1 according to the first embodiment of the present invention will be described.

The method for manufacturing the angular rate sensor 1 according to this embodiment includes a preparing step for preparing the semiconductor substrate 2, a first electrode forming step for depositing the first electrode 4 on the semiconductor substrate 2 at least over a region above which perturbation masses 6 is formed, a piezoelectric film forming step for depositing the piezoelectric film 5 on at least one of the first electrode 3 and the semiconductor substrate 2, an insulator film forming step for forming the insulator film 20 on the piezoelectric film 5, and a fabricating step for fabricating a plurality of features on the piezoelectric film 5, wherein the plurality of features includes the perturbation masses also serving the driving electrode 6 for causing a first elastic acoustic wave in the piezoelectric film 5, a detecting electrode 7-10 for detecting a second elastic acoustic wave caused by the Coriolis force acting on the first elastic acoustic wave.

In more detail, first, a (100)-oriented silicon substrate 2 of 400 μm thickness is prepared. In this arrangement, an integration of the other functional device, such as complementary metal-oxide-semiconductors (CMOS), into the angular rate sensor is possible to achieve without any future technology.

Then, a thin film of metal or conductive metallic alloy including aluminum (Al), aluminum-base alloy, Al—Si—Cu, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the first electrode 4. The thickness of the first electrodes 3 is order of 1.0 to 1.5 μm. Sputtering technique is also applicable to perform this step.

A piezoelectric film 5 is disposed on the first electrode 3 so as to cover the whole surface of the first electrode 3. The thickness of the piezoelectric film 5 is about several micrometers. For example, the piezoelectric film 5 is made of aluminum nitride (AlN) or zinc oxide (ZnO), but also of a piezoelectric and ferroelectric film such as PTZ:Pb(ZrTi)$O_3$, PT:PbTi$O_3$, and the like. In the case where the piezoelectric film is made of aluminum nitride (AlN), an integration of the other functional device, such as complementary metal-oxide-semiconductors (CMOS), into the angular rate sensor is possible to achieve without taking into account of an environmental metal pollution.

Further, perturbation masses 6 also serving as a second electrode, and detecting electrodes 7-10 are disposed on the piezoelectric film 5. A plurality of the detecting electrodes constructs a detecting inter-digital transducers (hereinafter, "detecting IDTs")

If the perturbation masses 6 also serving as a second electrode and detecting electrodes 7-10 are made of any one of impurity doped poly-silicon, aluminum (Al), and Al—Si—Cu with the semiconductor production technology for VLSIs, it is not necessary to take into account of the environmental metal pollution during manufacturing the angular rate sensor.

Next, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the detecting electrodes 7-10 on an upper surface of the piezoelectric film 5, in the same way shown in FIG. 4C.

Finally, the supplying driving voltage lines 11 and ground lines 12 are formed and connected to the detecting electrodes 7-10 by wire bonding.

In the angular rate sensor 1 having the second electrode 6 configured to serve as the perturbation mass, the second electrode 6 vibrate in a z-direction defined as a perpendicular direction to the upper surface of the piezoelectric substrate 5 due to the piezoelectric effect if alternative current (AC) voltage is applied between the first and second electrodes 3, 6. Thus, it becomes possible that information of rotation of the piezoelectric substrate 5 is obtained via the vibration of the second electrode 6 formed on the upper surface of the piezoelectric substrate 5. On of advantages of the angular rate sensor 1 of the above described type is that a necessary area for a perturbation mass 6 becomes to be smaller than that for metallic dots according to the previous embodiments serving as perturbation masses on which the Coriolis force acts when an elastic acoustic wave is excited along a parallel direction to the upper surface of the piezoelectric substrate since elastic acoustic wave is generated in the z-direction, i.e., in the perpendicular direction to the upper surface of the piezoelectric substrate 5. Another advantage of the angular rate sensor 1 of the above described type is that there is not necessary for a driving electrode and reflectors. Only detecting electrodes 7-10 are necessary. It is not needed to arrange the driving electrodes and reflectors such that all of the driving electrodes, reflectors, and a region wherein metallic dots serving as perturbation masses on a straight line such that the region wherein metallic dots and the driving IDT are sandwiched between reflectors. Therefore, downsizing of angular rate sensors and integrating an angular rate sensor and an external driving circuit thereof into a small size integrated device are simultaneously achieved.

In the angular rate sensor 1 according to this embodiment, the driving AC voltage is directly applied to the perturbation mass 6 which also serves as the second electrode so as to generate vibration of the perturbation mass 6 in the z-direction. Therefore, higher resonant frequency is achieved so that higher efficiency of causing elastic acoustic wave is obtained. In more detail, in the angular rate sensor having perturbation mass, driving electrodes, and reflectors wherein driving electrodes and perturbation masses are separately fabricated, a standing wave is generated by the driving electrodes and is rectified to a standing wave by reflectors. Thus, velocity of the perturbation mass undergoing oscillatory motion is not large and amplitude of the vibration of the perturbation mass in the z-direction is not so large. An advantage of the present embodiment is that since the second electrode 6 is directly driven by an external driving circuit, limitations to the velocity and the amplitude of the second electrode are removed. Since the Coriolis force is proportional to the particle velocity, the measured voltage generated by an elastic acoustic wave caused by the Coriolis force due to the piezoelectric effect detected by the detecting electrodes 7-10 is increased. In consequence, it is possible to realize an angular rate sensor having high sensitivity.

Especially, in the angular rate sensor according to this embodiment, a larger and heavy electrode 6 can be arranged. Since the Coriolis force is proportional to the particle mass, it is possible to realize an angular rate sensor having high sensitivity.

First Modification of the Ninth Embodiment

Figure 40:
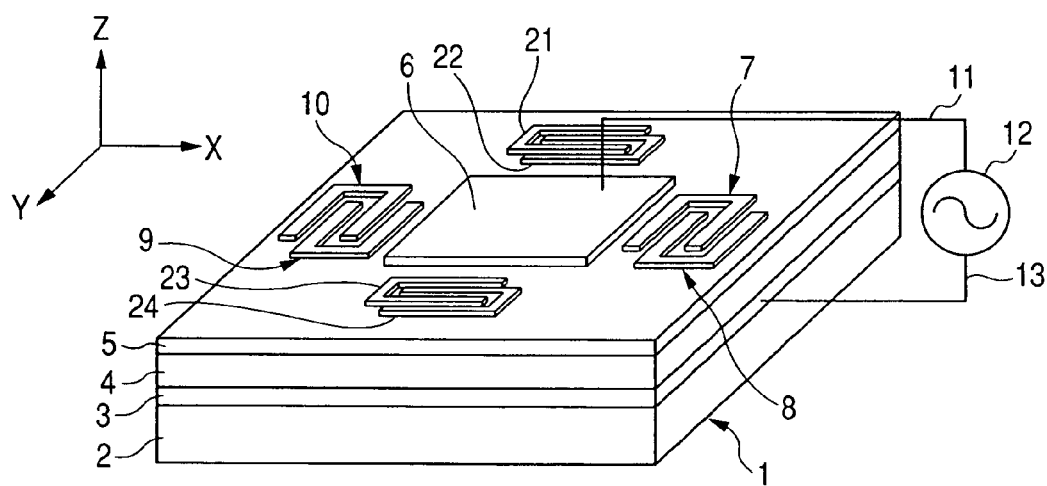
FIG. 40 shows a bird's-eye view of the first modification of the ninth embodiment.

Referring to FIG. 40, an angular rate sensor according to the first modification of the ninth embodiment will now be explained. In this modification of the ninth embodiment, the identical components in structure to those in the previous embodiments are assigned to the same reference numerals for simplicity and the description of these components are omitted from the detailed explanations.

FIG. 40 shows a bird's-eye view of the angular rate sensor 1 according to the first modification of the ninth embodiment. The angular rate sensor 1 has the second electrode 6 configured to serve as the perturbation mass, the detecting IDT further comprises a third detecting IDT and a fourth detecting IDT. Each of the third and the fourth IDTs are composed of a plurality of electrodes, 21-22 and 23-24, respectively. The third and the fourth IDT is located such that the second electrode serving as the perturbation mass is sandwiched therebetween and the first and the second IDTs are orthogonally arranged on the upper surface of the piezoelectric substrate.

This configuration of the first, second, third, and fourth detecting IDTs leads to the possibility of detecting rotation rate about multiple orthogonal axes. Thus, this configuration is capable of reducing effects of direct elastic acoustic waves generated by applying external AC voltages on measuring voltage relating to elastic acoustic waves generated by the Coriolis force.

Further, the above configuration of the first, second, third, and fourth detecting IDTs is capable of reducing an unnecessary contribution from the direct elastic acoustic waves which are not experienced of the scattering by the Coriolis force if angular rate is obtained by at least of a differences between output voltages between the first and second detecting IDTs and a differences between output voltages between the third and fourth detecting IDTs.

Second Modification of the Ninth Embodiment

Figure 41A:
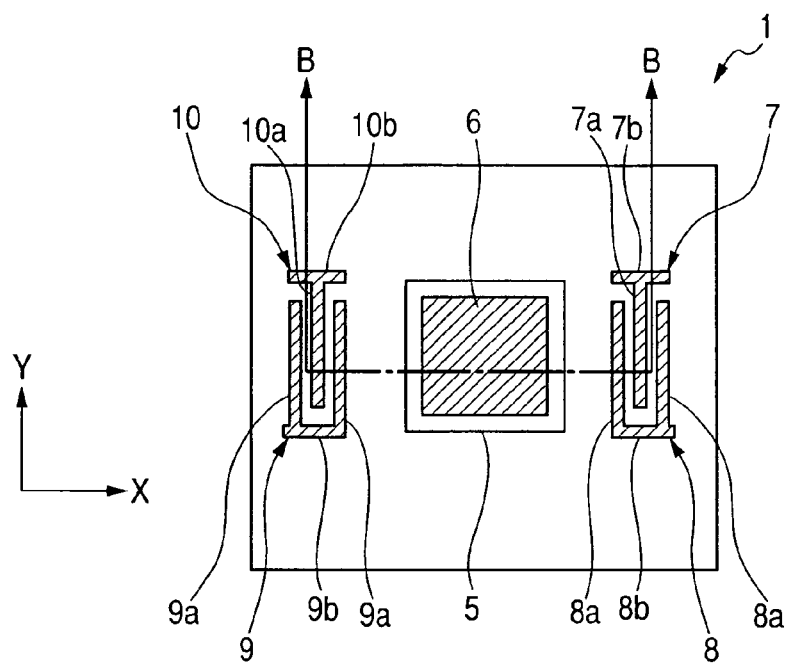
Figure 41B:
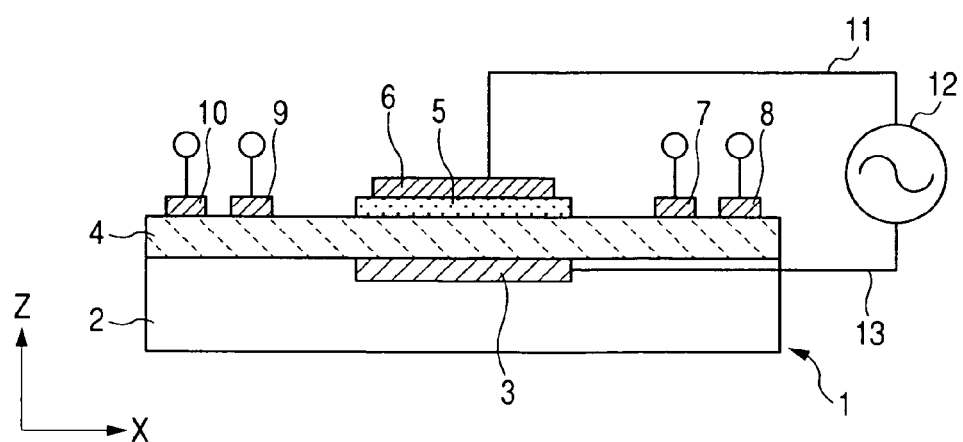

Referring to FIGS. 41A and 41B, an angular rate sensor according to the second modification of the ninth embodiment will now be explained.

The angular rate sensor according to the second modification of the ninth embodiment has a different structure of the first electrode 4 and the thin insulator film 5 relative to those of the ninth embodiment.

As shown in FIGS. 41A and 41B, the angular rate sensor 1 has the first electrode 3 and the thin insulator film 5, both of which are only formed below a region 60 on which the perturbation mass 6 is disposed.

In this arrangement of the first electrode 3 and the thin insulator film 5, the weight of the thin insulator film contributes that of the perturbation mass 6 so that the Coriolis force proportional to the particle mass is increased. Therefore, the angular rate sensor 1 obtains high sensitivity.

In more detail, in the case where the thin insulator film 5 is formed over the whole area where the piezoelectric film 4 is formed, the perturbation mass 6 which is configured to serve as the second electrode and the thin insulator film simultaneously vibrate in the z-direction when the driving AC voltage is applied between the second electrode 6 and the first electrode 3. While the thin insulator film 5 is vibrating with the perturbation mass 6, the inner stretching stress is generated in the thin insulator film 5. From this reason, the weight of the thin insulator film 5 does not effectively contribute to the weight of the perturbation mass 6. In contrast to the former case, if the first electrode 3 and the thin insulator film 5, both of which are only formed below a region 60 on which the perturbation mass 6 is disposed, the inner stretching stress generated in the thin insulator film 5 is suppressed. Therefore, the effective weight of the perturbation mass 6 is increased by the weight of the thin insulator film 5.

Further, if the first electrode 3 is only formed over the predetermined region 60 on which the perturbation mass 6 is formed, the first electrode is not disposed over a region above which the detecting electrodes 7-10 is formed. This arrangement of the first electrode 3 and the thin insulator film 5 enables to reduce an electric current leakage between the first and second electrodes.

The method for manufacturing the angular rate sensor 1 according to this embodiment includes a preparing step for preparing the semiconductor substrate 2, an opening forming step for forming the opening in the semiconductor substrate 2, a first electrode forming step for disposing the first electrode 3 in the opening, a piezoelectric film forming step for forming the piezoelectric film 4 so as to cover the opening and the semiconductor substrate 2, a fabricating step for fabricating a detecting electrodes 7-10 on the piezoelectric film 4, a insulator film forming step for disposing the insulator film 20 on the piezoelectric film 4, and a perturbation mass forming step for forming the perturbation masses 6 on the thin insulator film 5.

First, in the method for manufacturing the angular rate sensor 1, a (100)-oriented silicon substrate 2 of 400 μm thickness is prepared.

Next, the opening for which the first electrode 4 is accommodated, is formed in the semiconductor substrate 2 such as silicon substrate using photolithography technique. For example, if silicon substrate is used as the semiconductor substrate, an upper surface of the silicon substrate is cleaned by using acetone, isopropanol and trichloroethylene, in turn. The surface of the silicon substrate is then thoroughly rinsed in de-ionized water and subsequently heated on a hot plate to remove surface moisture. Upon cooling the substrate on a heat sinking plate, photoresist is then spin coated on the silicon substrate after soaking the hexamethyldisilazane, an adhesion agent. Then the soft-bake process is performed in which the substrate is heated. A negative-mask is set in place over the photoresist. The negative mask is a template defining the patterns of the substrate. The silicon substrate is then exposed to ultra-violet (UV) light such that the regions of the resist which are exposed become soluble to the developer. Thus, a pattern is formed having a plurality of apertures therethrough. The substrate is soaked in photoresist and developed until the sections which has been exposed to UV light, and are therefore soluble, are etched away.

For example, dry etching is applicable to etch the opening. A gas including fluorine, such as a CF-type gas including C4F8, or a SF-type gas including SF6, is used as etching gas for the dry etching. The etching gas is changed into plasma to produce fluorine radicals, and etching is performed by processing the silicon substrate with the fluorine radicals.

Next, a metal or conductive metallic alloy 40 including platinum (Pt), gold (Au), and tungsten (W) is deposited using an e-beam evaporator, and patterned by a phosphoric ($H_3PO_4$)-based acid on the exposed surface of the opening and upper surface of the silicon substrate 2 to form the first electrode 3.

Next, a several micrometer thick film of a piezoelectric film such as aluminum nitride (AlN), zinc oxide (ZnO), zirconate titante (PZT), lead titanate (PT), lithium tantalite ($LiTaO_3$), and lithium tantalite (LT), is disposed so as to cover the whole region of an upper surface of the first electrode 3. If an aluminum nitride (AlN) film is used as the first electrode 3, the AlN film is patterned by a tetra methyl ammonium hydroxide-based solvent.

Next, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the detecting electrodes 7-10 on an upper surface of the piezoelectric film 4, in the same way shown in FIG. 4C.

Next, a thin silicon dioxide film which is thinner than 1 μm is grown on the piezoelectric film 4. The silicon dioxide film is formed, for example by sputtering.

Next, a thin film of metal or conductive metallic alloy including aluminum (Al), aluminum-base alloy, titanium (Ti), titanium-base alloy, tungsten, tungsten-base alloy, molybdenum, and molybdenum-base alloy, is deposited using an e-beam evaporator, and patterned by a phosphoric ($H_3PO_4$)-based acid to form the perturbation mass 6 on an upper surface of the thin insulator film 5.

Third Modification of the Ninth Embodiment

Figure 42A:
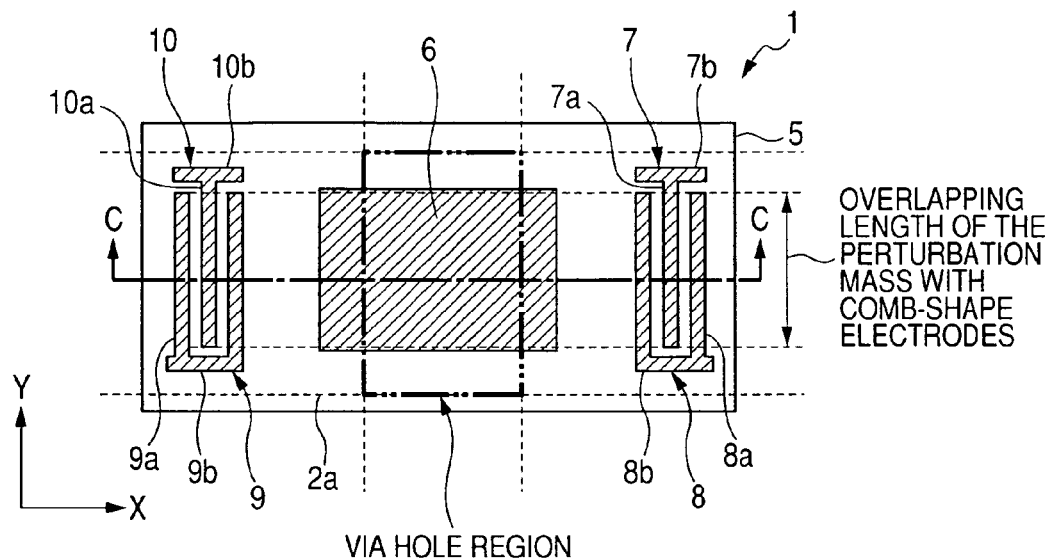
Figure 42B:
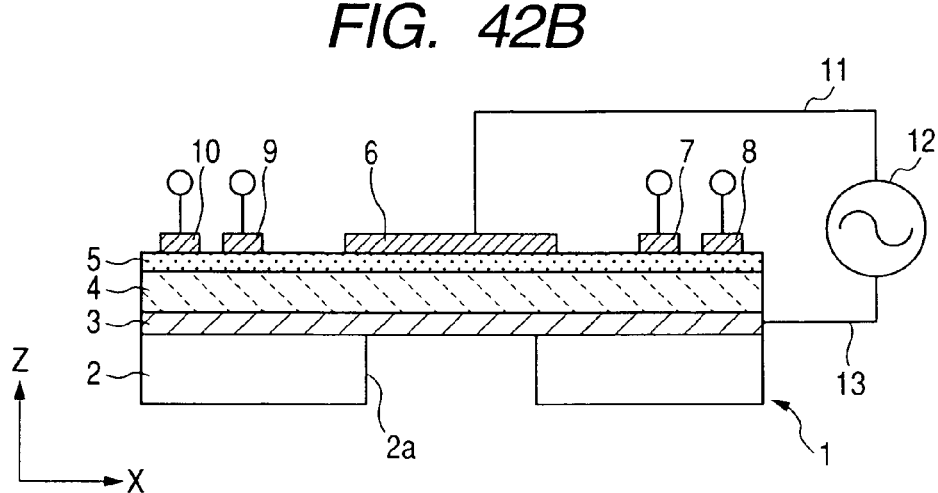

Referring to FIGS. 42A and 42B, an angular rate sensor according to the third modification of the ninth embodiment will now be explained.

The angular rate sensor according to the third modification of the ninth embodiment has a via hole 2a formed from the semiconductor substrate 2 so as to obtain a structure in which the lower surface of the first electrode is exposed to the air.

FIG. 42A and FIG. 42B show an angular rate sensor 1 according to this embodiment. FIG. 42A shows a bird's-eye view of the angular rate sensor 1 and FIG. 42B shows a cross-sectional view taken along C-C line in FIG. 42A.

As shown in FIGS. 42A and 42B, the angular rate sensor has the via hole formed from the semiconductor substrate 2 over a region below the predetermined region 60 on which the perturbation mass 6 is formed so as to obtain a structure in which the lower surface of the first electrode is exposed to the air.

In this configuration, an unnecessary vibration of the perturbation mass is generated if the via hole has an excess size. Thus, it is preferable that a length of the via hole along a x-direction, that is defined by a direction in which the first and second detecting IDTs are in alignment with each other, is shorter than a spacing between the first and second IDTs and the ends of the perturbation mass lie off the via hole along the x-direction, so that the unnecessary vibration of the perturbation mass is suppressed.

In contrary to the case in the x-direction, a longer length of the via hole overlapping edges of the first and second IDTs along the y-direction, which is defined by a direction orthogonal to the x-direction on the surface of the thin piezoelectric film, is preferable. In such a configuration of the via hole, the first and second IDTs becomes to be possible to output a higher lever of electric signals proportional to the Coriolis force acting on the perturbation mass when the thin piezoelectric film rotates about the x-axis. Thus, it is preferable that the ends of the via hole lie off the perturbation mass along the y-direction, so that the unnecessary vibration of the perturbation mass is suppressed.

Dry etching is applicable to etch the via hole 2a. A gas including fluorine, such as a CF-type gas including C4F8, or a SF-type gas including SF6, is used as etching gas for the dry etching. The etching gas is changed into plasma to produce fluorine radicals, and etching is performed by processing the silicon substrate with the fluorine radicals.

Fourth Modification of the Ninth Embodiment

Figure 43:
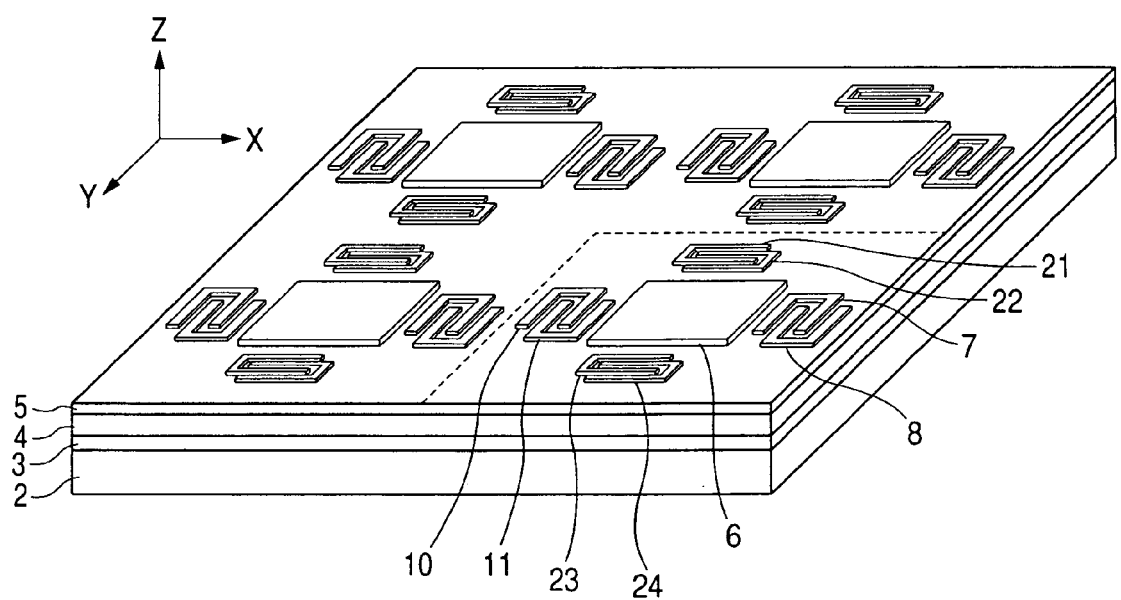
FIG. 43 shows an angular rate sensor according to the third modification of the ninth embodiment.

Referring to FIG. 43, an angular rate sensor according to the fourth modification of the ninth embodiment will now be explained.

As shown in FIG. 43, the angular rate sensor 1 is arranged to have the first, second, third, and fourth detecting IDTs so as to detect rotation rate about multiple orthogonal axes, the ends of the perturbation mass both along the x-direction and the y-direction preferably lie off the via hole. In this arrangement, the unnecessary vibration of the perturbation mass is suppressed.

The second electrode 6 also serving as the perturbation mass preferably consists of a single electrode so that a mass density of a region where the second electrode is formed is increased. Therefore, still preferably the second electrode is formed in rectangular shaped in order to increase the mass density of the region where the second electrode is formed. The fact that the mass density of the region where the second electrode is formed is large brings the second electrode to vibrate with large amplitude in a z-direction defined as a piezoelectric film thickness direction. When the thin piezoelectric film rotate, electric current relating to the Coriolis force acting on the second electrode vibrating along the z-direction whose amplitude is proportional to vibrating velocity thereof is generated. Therefore, the larger the amplitude of the vibrating velocity of the second electrode is, the higher the sensitivity of the angular rate sensor is, since the second electrode vibrates in the z-direction with a larger amplitude.

In a modification of the angular rate sensor of this type, a first electrode is formed on the lower surface of the thin piezoelectric film in a region above which the second electrode is disposed.

In this configuration, the first electrode is only formed on the other region above which the detecting IDTs are disposed. Therefore, a region below the detecting IDTs in the thin piezoelectric film escaped from an existence of electric fields and elastic acoustic waves because of nonexistence of the first electrode below the detecting IDTs.

In a further modification of the angular rate sensor having the second electrode also serving as the perturbation mass, an thin insulator film is formed so as to cover the upper surface of the thin piezoelectric film on which the second electrode is disposed.

Preferably, the thin insulator film is disposed on the upper surface of the thin piezoelectric film over a region on which the second electrode also serving as the perturbation mass is disposed. This arrangement of the thin insulator film enables to reduce a electric current leakage between the first and second electrodes. There is a further advantage of the angular rate sensor of this type where weight of a part of the thin insulator film located below the second electrode contribute to the perturbation mass in addition to the weight of the second electrode so that a high sensitivity of the angular rate sensor is achieved.

Still further, the angular rate sensor according to the present invention, the piezoelectric substrate and the thin piezoelectric film is made of one of aluminum nitride (AlN), zinc oxide (ZnO), zirconate titante (PZT), lead titanate (PT), lithium tantalate (LiTaO$_3$), and lithium tantalite (LT). If the thin piezoelectric film is made of AlN, an integration of the other functional device, such as complementary metal-oxide-semiconductors (CMOS), into the angular rate sensor is possible to achieve without taking account of an environmental metal pollution.

Still further, the angular rate sensor according to the present invention, if at least one of the first electrode or the second electrode also serving as the perturbation mass is made of one of aluminum (Al), aluminum (Al)-silicon (Si) alloy, aluminum (Al)-silicon (Si)-copper (Cu) alloy, and impurity-doped poly-silicon, the first electrode is possible to be formed by a semiconductor production processing technology with contributing prevention of environmental metal pollution.

Still further, the angular rate sensor according to the present invention, at least one of the first electrode and the second electrode also serving as the perturbation mass is made of one of aluminum (Al), platinum (Pt), tungsten (W), and rubidium (Ru), mass density of the first and second electrodes is increased so that total weight of the first and second electrodes is grown.

Fifth Modification of the Ninth Embodiment

Figure 44A:
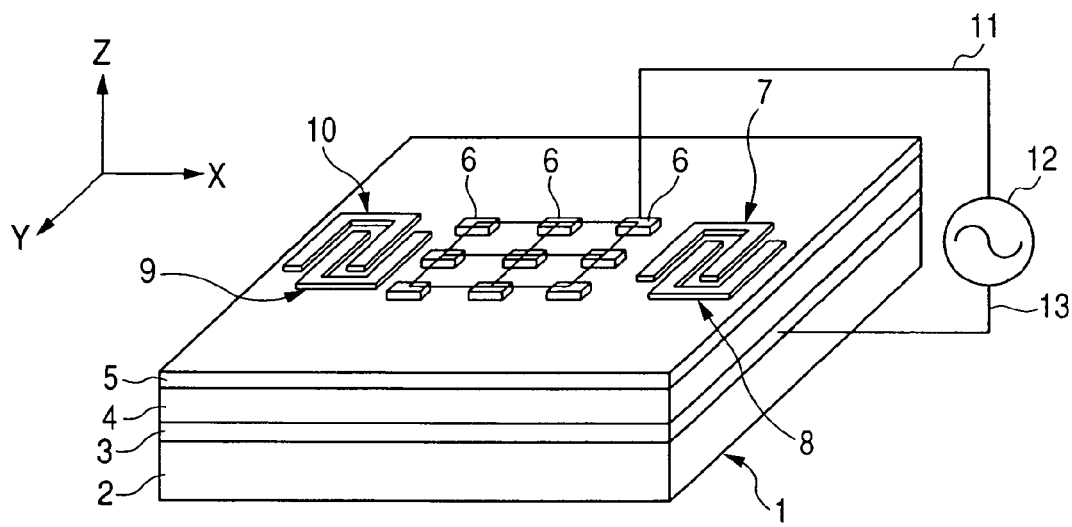
Figure 44B:
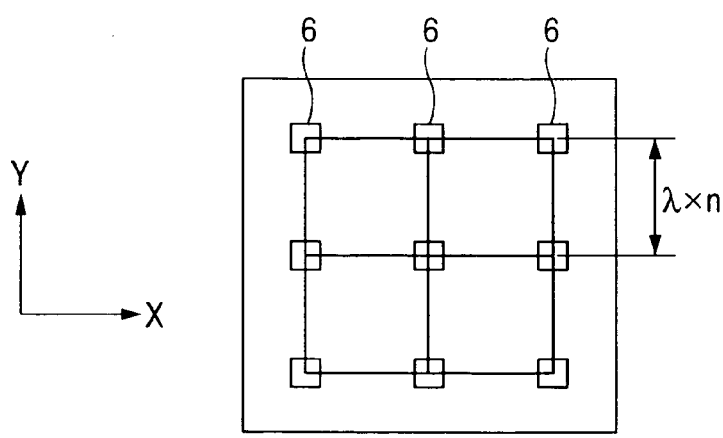
Figure 45:
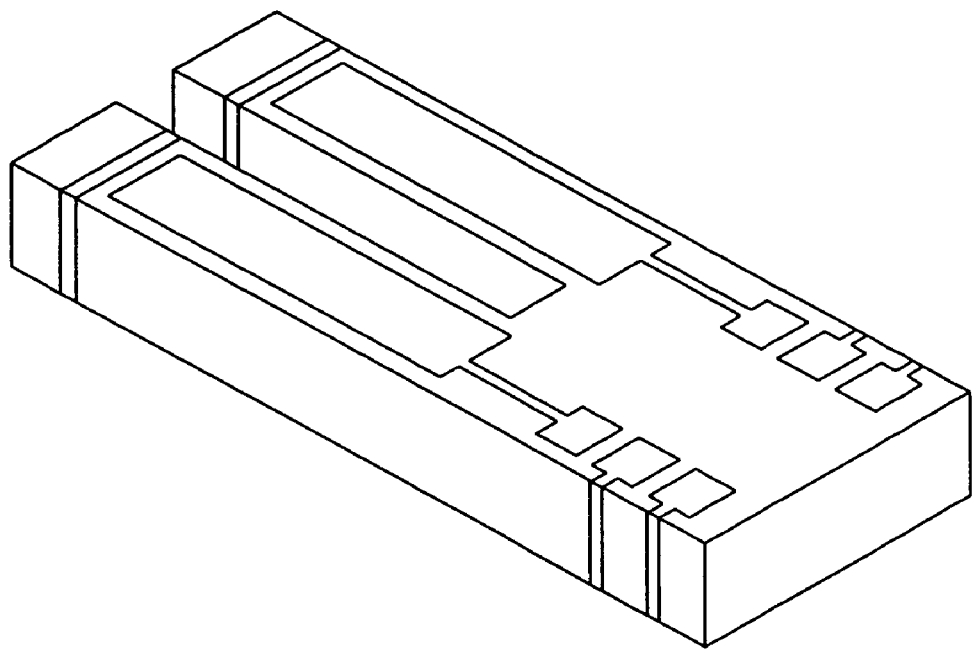
FIG. 45 shows a known prior art embodiment of an angular rate sensor utilizing a single crystalline piezoelectric element.
Figure 46A:
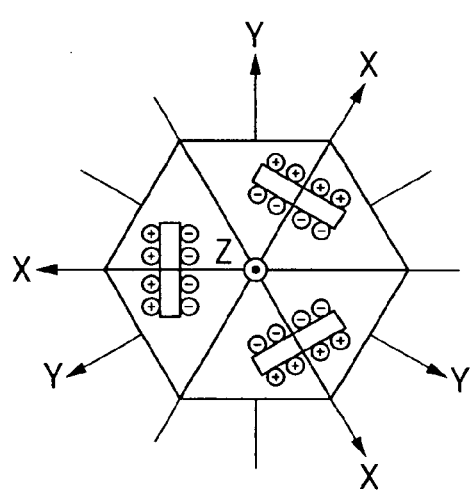
FIG. 46A and FIG. 46B show the individual axes of a quartz crystal.
Figure 46B:
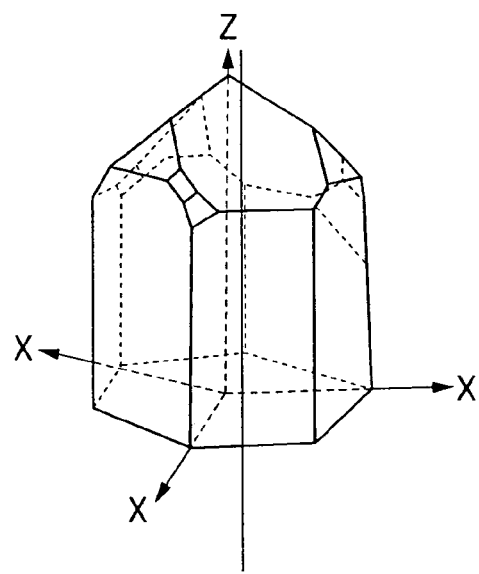
Figure 47:
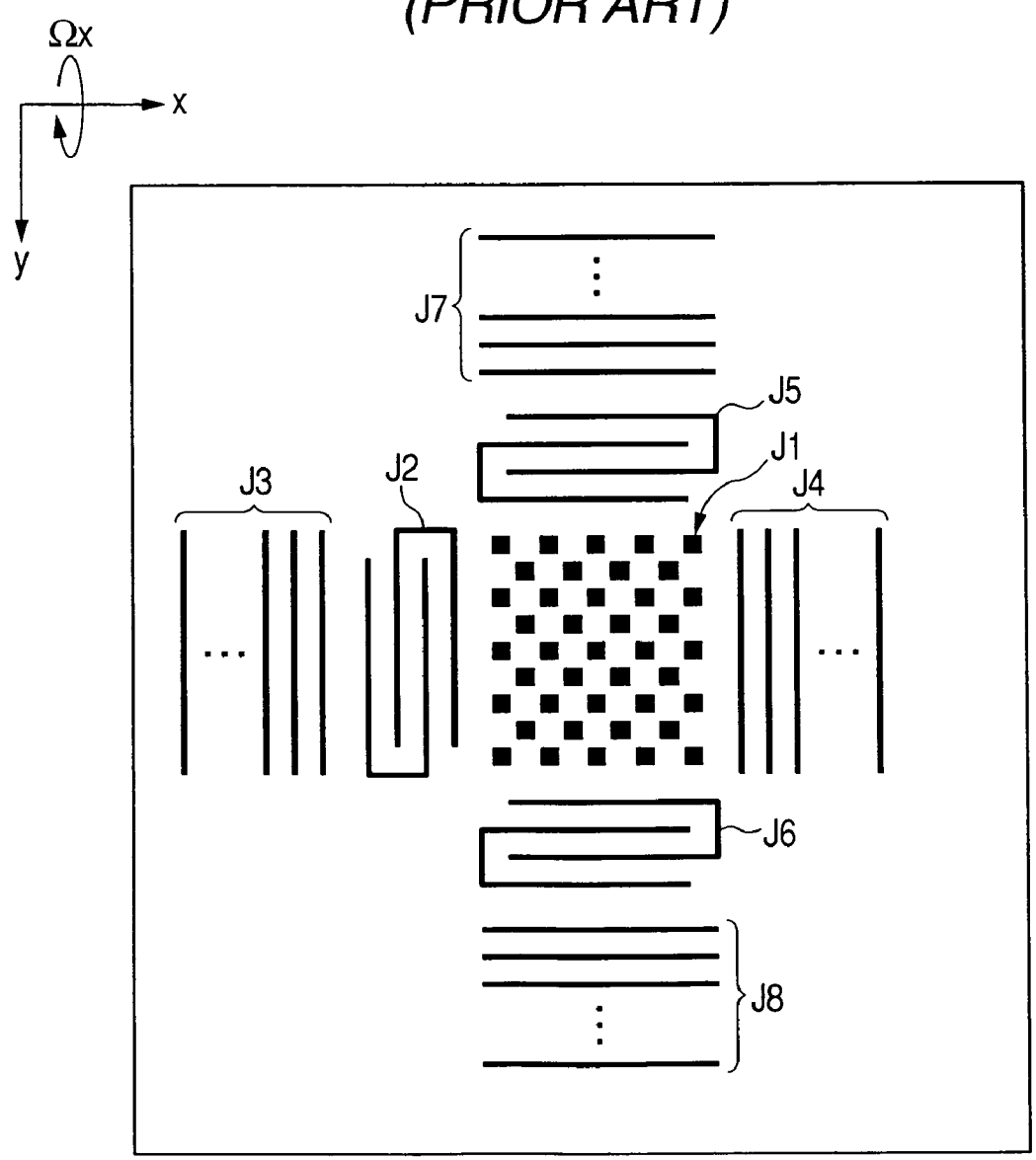
FIG. 47 is a diagram of a prior art embodiment of an angular rate sensor.
Figure 48:
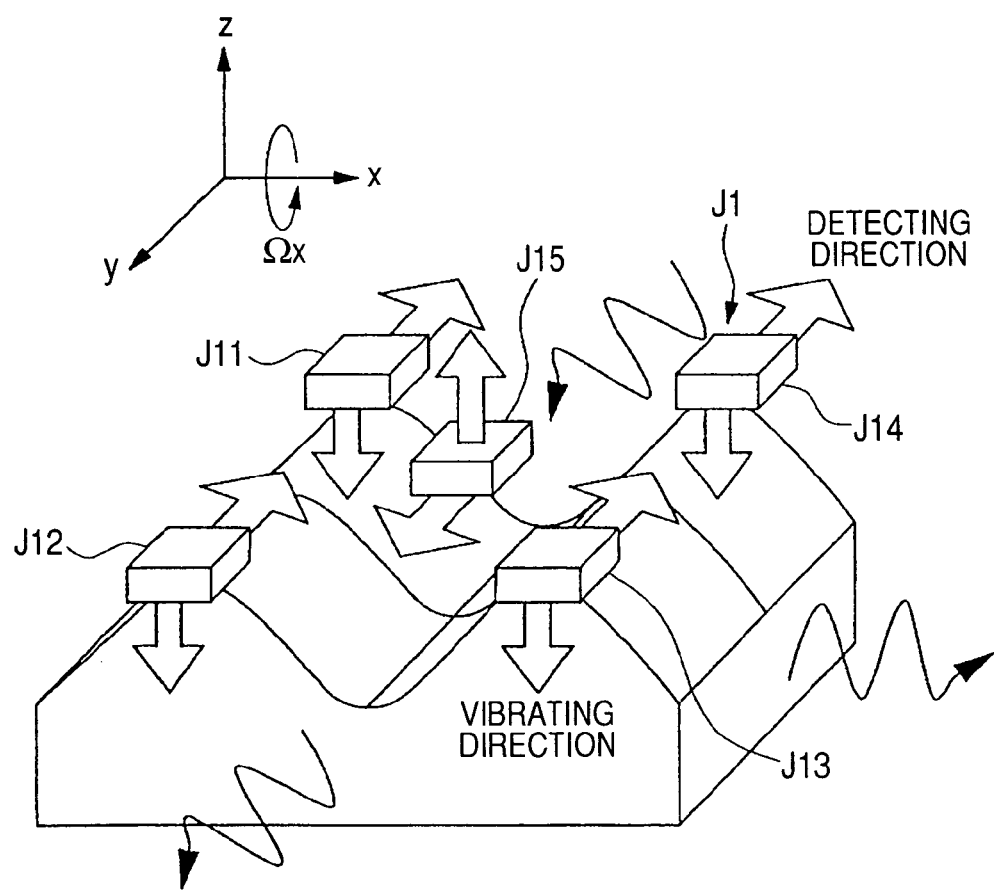
FIG. 48 shows a simplified operating principle of the above-mentioned angular rate sensor shown in FIG. 47.
Figure 49:
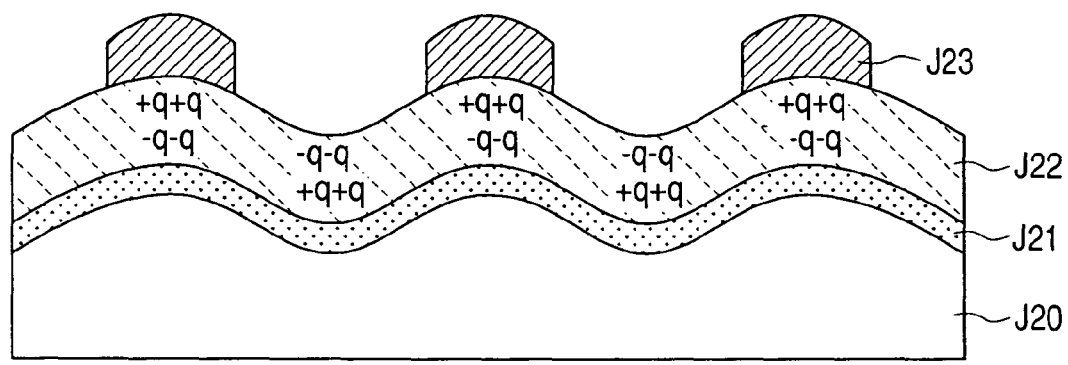
FIG. 49 shows a cross sectional view illustrating a snap shot of vibrating components of the angular rate sensor according to the prior art.

Referring to FIG. 44A and FIG. 44B, an angular rate sensor according to the fifth modification of the ninth embodiment will now be explained.

The angular rate sensor according to the present invention, it is preferable that the second electrode is composed of a plurality of metallic island films which are connected electrically each others and are driven simultaneously by an external electric supply.

FIG. 44A shows a bird's-eye view of the angular rate sensor 1 and FIG. 44B shows a top-view of the predetermined region 60 on which the second electrodes 6 are formed. In the angular rate sensor 1 according to this embodiment, the second electrodes 6 is composed of a plurality of metallic island films which are located at lattice points of a regular lattice. The regular lattice is, for example, 3×3 square lattice having nine lattice points expanded on the x-y plane. Each second electrode 6 are supplied driving voltage from the electric power supply 12 via the supplying driving voltage lines 11. Each second electrode 6 start to vibrate in the z-direction due to the piezoelectric effect coherently since all second electrode 6 are connected each other. In order to amplify an elastic acoustic wave caused at the every lattice point where the second electrode 6 is formed, the spacing between the neighboring electrodes 6 is fixed by the integer multiple of the wave length of the elastic acoustic wave.

In this arrangement of the angular rate sensor, elastic acoustic waves generated at individual electrodes composing the second electrode by the Coriolis force are synchronously emphasized. Therefore, high sensitivity of the angular rate sensor is achieved.

Still further, an angular rate sensing device is provided by integrating a plurality of an angular rate sensors into a single device such that a final result of measured angular rate is obtained based on electric signals outputted from the plurality of the angular rate sensors. Therefore, an angular rate sensing device producing an accurate measured result and having high sensitivity is provided.

What is claimed is:

1. An angular rate sensor, of which operations are in a three-dimensional coordinate system consisting of x, y, and z-orthogonal directions, based on a first and a second elastic acoustic wave propagating generated in an elastic material along the x and y-directions, respectively, in an elastic material on which a Coriolis force acts in response to a rotary motion of the angular rate sensor about the x-direction, comprising:
   a supporting member having a surface extending on an x-y plane created by an x and a y-direction which define the x and y directions, respectively, in the coordinate system;
   a plurality of perturbation masses located at anti-nodes of the first elastic acoustic wave and accommodated into the trench of the supporting member so as to vibrate in the z-direction coherently with the first elastic acoustic wave and to be displaced by the Coriolis force for generating a second elastic acoustic wave;

a film disposed on the supporting member so as to enclose a predetermined area below which the plurality of the perturbation masses are formed, the film having an upper and a lower surfaces and being comprised of piezoelectric material, and having a surface portion at least including the surface of the supporting member for serving as the elastic material;

a driving transducer disposed on the film comprised of piezoelectric material, for generating a first elastic acoustic wave having a predetermined wavelength, the driving transducer being in alignment with the predetermined area on which the plurality of the perturbation masses is formed; and a detecting transducer disposed on the upper surface of the film comprised of piezoelectric material, for detecting the second elastic acoustic wave so as to be adjacent to the predetermined area below which the plurality of the perturbation masses is formed and to be orthogonal to the driving transducer, for detecting the second elastic acoustic wave, and for providing an output indicative of the second elastic acoustic wave generated by the Coriolis force as a function of an angular rate of the rotary motion of the angular rate sensor itself.

2. The angular rate sensor according to claim 1, further comprising:
a pair of reflectors disposed on the upper surface of either a first or second part of the film and separated along the x-direction in the x-y plane so as to sandwich a specified region below which the plurality of the perturbation masses is formed, for reflecting and rectifying the first elastic acoustic wave to form a standing elastic acoustic wave at least within a specified region enclosed by the driving transducer, the detecting transducer, and the reflectors.

3. The angular rate sensor according to claim 2,
wherein the plurality of the perturbation masses are made of a material whose mass density is larger than that comprising the driving transducer and the detecting transducer in order to vibrate the plurality of the perturbation masses in the perpendicular direction to the surface of the supporting member with larger amplitude.

4. The angular rate sensor according to claim 3,
wherein the plurality of the perturbation masses are thicker than that comprising the driving transducer and the detecting transducer in order to vibrate the plurality of the perturbation masses in the perpendicular direction to the surface of the supporting member with larger amplitude.

5. The angular rate sensor according to claim 1,
wherein the plurality of the perturbation masses are arranged with a periodicity of one half of a wavelength of the first elastic acoustic wave generated by the driving transducer.

6. The angular rate sensor according to claim 5, further comprising:
a pair of reflectors disposed on the upper surface of either a first or second part of the film and separated along the x-direction in the x-y plane so as to sandwich a specified region below which the plurality of the perturbation masses is formed, for reflecting and rectifying the first elastic acoustic wave to form a standing elastic acoustic wave at least within a specified region enclosed by the driving transducer, the detecting transducer, and the reflectors.

7. The angular rate sensor according to claim 6,
wherein the plurality of the perturbation masses are made of a material whose mass density is larger than that comprising the driving transducer and detecting transducer in order to vibrate the plurality of the perturbation masses in the perpendicular direction to the surface of the supporting member with larger amplitude.

8. An angular rate sensor, of which operations are in a three-dimensional coordinate system consisting of x, y, and z-orthogonal directions, based on a first and a second elastic acoustic wave propagating generated in an elastic material along the x and y-directions, respectively, on which a Coriolis force acts in response to a rotary motion of the angular rate sensor about the x-direction, comprising:
a supporting member having a surface extending on an x-y plane created by an x and a y-direction which define the x and y directions, respectively, in the coordinate system and having a trench by which the supporting member is opened along a z-direction perpendicular to the x-y plane;

a plurality of perturbation masses located at anti-nodes of the first elastic acoustic wave and accommodated into the trench of the supporting member so as to vibrate in the z-direction coherently with the first elastic acoustic wave and to be displaced by the Coriolis force for generating a second elastic acoustic wave;

a film having an upper and a lower surfaces, the film being consisted of a first and second part thereof, wherein the first part of the film is comprised of piezoelectric material and encloses the second part of the film below which the plurality of the perturbation masses are located in the x-y plane, the second part of the film being not necessary to be made of piezoelectric material, and having a surface portion at least including the upper surface of the film for serving as the elastic material;

a driving transducer disposed on the upper surface of the first part of the film comprised of piezoelectric material, for generating a first elastic acoustic wave having a predetermined wavelength along the x-direction in the surface of the film;

a detecting transducer disposed on the upper surface of the first part of the film comprised of piezoelectric material so as to be orthogonal to the driving transducer, for detecting the second elastic acoustic wave, and for providing an output indicative of the second elastic acoustic wave generated by the Coriolis force proportional to an angular rate of the rotary motion of the angular rate sensor itself.

9. The angular rate sensor according to claim 8,
further comprising: a pair of reflectors disposed on the upper surface of either the first or second part of the film and separated along the x-direction on the x-y plane so as to sandwich the plurality of the perturbation masses, for reflecting and rectifying the first elastic acoustic wave to form a standing elastic acoustic wave at least within a specified region enclosed by the driving transducer, the detecting transducer, and the reflectors.

10. The angular rate sensor according to claim 9,
wherein the plurality of the perturbation masses are arranged with a periodicity of one half of a wavelength of the first elastic acoustic wave generated by the driving transducer.

11. An angular rate sensor, of which operations are in a three-dimensional coordinate system consisting of x, y, and z-orthogonal directions, based on a first and a second elastic acoustic wave propagating generated in an elastic material along the x and y-directions, respectively, on which a Coriolis force acts in response to a rotary motion of the angular rate sensor about the x-direction, comprising:

- a supporting member having an upper surface with an x-y plane created by the x and y directions in the coordinate system and having a trench by which the supporting member is opened along a z-direction perpendicular to the x-y plane;
- a plurality of perturbation masses located at anti-nodes of the first elastic acoustic wave and accommodated into the trench of the supporting member so as to vibrate in the z-direction coherently with the first elastic acoustic wave and to be displaced by the Coriolis force for generating a second elastic acoustic wave;
- a film having an upper and a lower surfaces, the film being consisted of a first and second part thereof, wherein the first part of the film is comprised of piezoelectric material and encloses the second part of the film below which the plurality of the perturbation masses is located, the second part of the film being not necessary to be made of piezoelectric material, and having a surface portion at least including the upper surface of the film for serving as the elastic material;
- a driving transducer accommodated into another part of the plurality of trenches of the supporting member, for generating a first elastic acoustic wave having a predetermined wavelength along the x-direction in the elastic material including the film made of the piezoelectric material and the surface of the supporting member;
- a detecting transducer accommodated into further another part of the plurality of trenches of the supporting member so as to be orthogonal to the driving transducer, for detecting the second elastic acoustic wave, and for providing an output indicative of the second elastic acoustic wave generated by the Coriolis force proportional to an angular rate of the rotary motion of the angular rate sensor itself.

12. The angular rate sensor according to claim 11, further comprising:
- a pair of reflectors accommodated into further another part of the plurality of trenches of the supporting member below the lower surface of either the first or second part of the film and separated along the x-direction so as to sandwich the plurality of the perturbation masses, for reflecting and rectifying the first elastic acoustic wave to form a standing elastic acoustic wave at least within a specified region enclosed by the driving transducer, the detecting transducer, and the reflectors.

13. The angular rate sensor according to claim 12,
wherein the plurality of the perturbation masses are arranged with a periodicity of one half of a wavelength of the first elastic acoustic wave generated by the driving transducer.

14. The angular rate sensor according to claim 13,
wherein the plurality of the perturbation masses are made of a material whose mass density is larger than that comprising the driving transducer and the detecting transducer in order to vibrate the plurality of the perturbation masses in the perpendicular direction to the surface of the supporting member with larger amplitude.

15. The angular rate sensor according to claim 14,
wherein the plurality of the perturbation masses are thicker than the driving transducer and the detecting transducer in order to vibrate the plurality of the perturbation masses in the perpendicular direction to the surface of the supporting member with larger amplitude.

* * * * *